United States Patent
Ghuman

(10) Patent No.: US 10,993,003 B2
(45) Date of Patent: *Apr. 27, 2021

(54) FORTY CHANNEL OPTICAL COMMUNICATIONS MODULE LINK EXTENDER RELATED SYSTEMS AND METHODS

(71) Applicant: Cox Communications, Inc., Atlanta, GA (US)

(72) Inventor: Harjinder S. Ghuman, Alpharetta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/268,239

(22) Filed: Feb. 5, 2019

(65) Prior Publication Data
US 2020/0252699 A1 Aug. 6, 2020

(51) Int. Cl.
*H04J 14/02* (2006.01)
*H04Q 11/00* (2006.01)
(Continued)

(52) U.S. Cl.
CPC ......... *H04Q 11/0005* (2013.01); *H04B 10/25* (2013.01); *H04B 10/27* (2013.01);
(Continued)

(58) Field of Classification Search
CPC ....... H04Q 11/0005; H04Q 2011/0013; H04Q 2011/0016; H04Q 11/0067; H04B 10/27;
(Continued)

(56) References Cited

U.S. PATENT DOCUMENTS

| 5,663,818 A | 9/1997 | Yamamoto et al. |
| 5,742,416 A | 4/1998 | Mizrahi |

(Continued)

OTHER PUBLICATIONS

Harj et al, Coherent Access Applications for MSOs, Oct. 2018, SCTE•ISBE, All Document. (Year: 2018).*
(Continued)

*Primary Examiner* — Dibson J Sanchez
(74) *Attorney, Agent, or Firm* — Eversheds Sutherland (US) LLP

(57) ABSTRACT

This disclosure describes devices related to multiplexing optical data signals. A system may be disclosed for multiplexing one or more optical data signals. The system may comprise a forty channel dense wave division multiplexer (DWDM) configured combine one or more optical data signals. The system may comprise a booster optical amplifier configured to amplify the combined one or more optical data signals and output a first amplified optical data signal. The system may comprise a variable optical amplifier (VOA) communicatively configured to receive the amplified first optical data signal, adjust the power of the amplified first optical data signal to a first level, and output a second optical data signal. The system may comprise a WDM communicatively coupled to the VOA, the WDM configured to output a combined second optical data signal and one or more third signals to a primary fiber.

12 Claims, 23 Drawing Sheets

(51) Int. Cl.
*H04B 10/25* (2013.01)
*H04B 10/27* (2013.01)
*H04B 10/297* (2013.01)

(52) U.S. Cl.
CPC ............ *H04J 14/02* (2013.01); *H04B 10/297* (2013.01); *H04Q 2011/0013* (2013.01); *H04Q 2011/0016* (2013.01)

(58) Field of Classification Search
CPC ....... H04B 10/25; H04B 10/297; H04J 14/02; H04J 14/0221
USPC .......................................... 398/1–8, 43–103
See application file for complete search history.

(56) References Cited

U.S. PATENT DOCUMENTS

| | | | |
|---|---|---|---|
| 5,995,256 A | 11/1999 | Fee | |
| 5,995,259 A | 11/1999 | Meli et al. | |
| 6,323,994 B1* | 11/2001 | Li | H04B 10/2941 359/341.1 |
| 6,392,790 B1 | 5/2002 | Lauder et al. | |
| 6,414,769 B1 | 7/2002 | Meli et al. | |
| 6,493,133 B1 | 12/2002 | Liang et al. | |
| 6,519,060 B1 | 2/2003 | Liu | |
| 6,570,703 B2* | 5/2003 | Murakami | H01S 3/06758 359/341.1 |
| 6,606,427 B1 | 8/2003 | Graves et al. | |
| 6,961,522 B1* | 11/2005 | Castagnetti | H04B 10/2916 398/157 |
| 7,106,969 B1 | 9/2006 | Lichtman et al. | |
| 7,239,772 B2 | 7/2007 | Wang et al. | |
| 7,505,687 B2 | 3/2009 | Jaggi et al. | |
| 7,509,048 B2 | 3/2009 | Turpin et al. | |
| 7,565,081 B1 | 7/2009 | Britz et al. | |
| 7,773,838 B2* | 8/2010 | Lee | H04J 14/0226 385/15 |
| 7,796,886 B2 | 9/2010 | Jaggi et al. | |
| 7,805,073 B2* | 9/2010 | Sabat, Jr. | H04B 10/25752 398/5 |
| 8,116,629 B2 | 2/2012 | Boduch et al. | |
| RE43,403 E | 5/2012 | Jaggi et al. | |
| 8,238,751 B1* | 8/2012 | Iannone | H04J 14/0232 398/82 |
| 8,320,759 B2 | 11/2012 | Boduch | |
| 8,873,963 B2 | 10/2014 | Handelman | |
| 8,897,639 B2 | 11/2014 | Trojer et al. | |
| 9,014,557 B2 | 4/2015 | Graves et al. | |
| 9,172,492 B2* | 10/2015 | Lee | H04J 14/0265 |
| 10,211,920 B1* | 2/2019 | Khaleghi | H04B 10/0793 |
| 10,541,774 B1* | 1/2020 | Dai | H04B 10/272 |
| 2001/0015843 A1* | 8/2001 | Miyauchi | H04B 10/25133 398/147 |
| 2001/0019449 A1 | 9/2001 | Krummrich | |
| 2002/0000346 A1 | 1/2002 | Baranda et al. | |
| 2002/0003646 A1 | 1/2002 | Ishikawa | |
| 2002/0024706 A1* | 2/2002 | Meli | H01S 3/06754 398/141 |
| 2002/0048066 A1 | 4/2002 | Antoniades et al. | |
| 2002/0089719 A1* | 7/2002 | Joo | H04J 14/0206 398/83 |
| 2002/0141046 A1 | 10/2002 | Joo et al. | |
| 2002/0163691 A1 | 11/2002 | Wong et al. | |
| 2002/0181048 A1 | 12/2002 | Kuykendall et al. | |
| 2003/0076560 A1 | 4/2003 | Pratt et al. | |
| 2003/0142978 A1* | 7/2003 | Lee | H04B 10/032 398/34 |
| 2003/0194242 A1 | 10/2003 | Miyauchi et al. | |
| 2004/0184804 A1 | 9/2004 | Shahar | |
| 2004/0252996 A1 | 12/2004 | McNicol | |
| 2005/0141892 A1* | 6/2005 | Park | H04J 14/0291 398/71 |
| 2005/0158049 A1* | 7/2005 | Lee | H04J 14/0221 398/71 |
| 2005/0286896 A1 | 12/2005 | Kinoshita et al. | |
| 2006/0045528 A1 | 3/2006 | Gumaste et al. | |
| 2006/0104638 A1* | 5/2006 | Chung | H04J 14/0226 398/71 |
| 2006/0165412 A1* | 7/2006 | Jung | H04J 14/0246 398/71 |
| 2007/0019956 A1 | 1/2007 | Sorin et al. | |
| 2007/0212072 A1* | 9/2007 | Iannone | H04J 14/0226 398/72 |
| 2008/0089684 A1 | 4/2008 | Smith et al. | |
| 2009/0010648 A1 | 1/2009 | Zuhdi | |
| 2009/0074417 A1* | 3/2009 | Vassilieva | H04B 10/25253 398/81 |
| 2009/0129774 A1 | 5/2009 | Jaggi et al. | |
| 2009/0208212 A1* | 8/2009 | Lee | H04J 14/025 398/72 |
| 2009/0220231 A1 | 9/2009 | Zimmel et al. | |
| 2009/0297152 A1* | 12/2009 | Bainbridge | H04J 14/0282 398/79 |
| 2010/0046946 A1* | 2/2010 | Cao | H04J 14/0226 398/72 |
| 2010/0054740 A1 | 3/2010 | Lee et al. | |
| 2010/0119223 A1* | 5/2010 | Ferrari | H04B 10/0773 398/4 |
| 2010/0189442 A1* | 7/2010 | Grobe | H04J 3/085 398/79 |
| 2010/0239257 A1* | 9/2010 | Grossman | H04J 14/0282 398/68 |
| 2010/0266283 A1* | 10/2010 | Beckett | G04J 14/02 398/68 |
| 2010/0278535 A1* | 11/2010 | Kim | H04B 10/272 398/72 |
| 2010/0316386 A1* | 12/2010 | Luk | H04B 10/2587 398/93 |
| 2011/0158650 A1* | 6/2011 | Cavaliere | H04J 14/0226 398/79 |
| 2011/0299858 A1 | 12/2011 | Mazzini et al. | |
| 2012/0020668 A1 | 1/2012 | Trojer et al. | |
| 2012/0087648 A1* | 4/2012 | Gao | H04J 14/028 398/1 |
| 2012/0148245 A1 | 6/2012 | Bowler et al. | |
| 2012/0315047 A1* | 12/2012 | Iannone | H04B 10/2589 398/72 |
| 2013/0039656 A1* | 2/2013 | Lam | H04J 14/0235 398/47 |
| 2013/0057948 A1* | 3/2013 | Simonneau | H04B 10/2972 359/341.2 |
| 2013/0084064 A1* | 4/2013 | Akasaka | H04B 10/0795 398/34 |
| 2013/0266318 A1* | 10/2013 | Abdul Manaf | H04J 14/0293 398/48 |
| 2014/0099117 A1 | 4/2014 | Way | |
| 2014/0161446 A1* | 6/2014 | Lee | H04J 14/08 398/34 |
| 2014/0233954 A1* | 8/2014 | Lee | H04J 14/0246 398/72 |
| 2015/0043919 A1 | 2/2015 | Handelman | |
| 2015/0139654 A1 | 5/2015 | Mandelbaum et al. | |
| 2015/0249314 A1* | 9/2015 | Onaka | H04B 10/2918 359/337.1 |
| 2015/0249520 A1 | 9/2015 | Badar et al. | |
| 2015/0304033 A1* | 10/2015 | Giorgi | H04J 14/0221 398/72 |
| 2016/0087747 A1* | 3/2016 | Way | H04J 14/0221 398/81 |
| 2016/0192043 A1* | 6/2016 | Shukunami | H04Q 11/0005 398/45 |
| 2017/0134113 A1 | 5/2017 | Lam et al. | |
| 2017/0237483 A1 | 8/2017 | Barnard et al. | |
| 2018/0212706 A1 | 7/2018 | Ghuman | |
| 2019/0036802 A1 | 1/2019 | Jeyaram | |
| 2019/0132049 A1 | 5/2019 | Cai et al. | |
| 2019/0140765 A1 | 5/2019 | Ghuman | |
| 2019/0181952 A1 | 6/2019 | Jia et al. | |

(56) References Cited

U.S. PATENT DOCUMENTS

2019/0215091 A1* 7/2019 Johansson ........... H04J 14/0221
2020/0099546 A1   3/2020 Haag et al.

OTHER PUBLICATIONS

Bindhaiq et al, Recent development on time and wavelength-division multiplexed passive optical network, Jan. 2015, Optical Switching and Networking, vol. 15, All Document. (Year: 2015).*
Ghuman, H. "DWDM Access for Remote PHY Networks Integrated Optical Communications Module (OCML)", SCTE/IBSE, 2017. (19 Pages).

* cited by examiner

| 20 & 40 CH OCML (96 CH AWG) Loss Budgets, 60Km | | | |
|---|---|---|---|
| | 20 CH | 40 CH | |
| 10G Txcvr Output Power | 1 | 1 | dBm |
| DS EDFA Gain used (dB) | 15 | 15.5 | dB |
| Max. DS EDFA Saturated Output Power | 20 | 23.5 | dBm |
| OCML loss from DS EDFA to output port | 3.5 | 3.5 | dB |
| Total Power into fiber (10G+GPON+10GEPON) | 17.2 | 20.3 | dBm |
| DS Output/wavelength into fiber (10G) | 3.5 | 4 | dBm |
| Fiber Loss (60Km) | 13.2 | 13.2 | dB |
| MDM Loss (DWDM + Interleaver) | 7.5 | 9.5 | dB |
| Misc: Margin, Connectors | 3.6 | 3.6 | dB |
| Total Loss | 24.3 | 26.3 | dB |
| SFP+ DS Rx Power | -20.8 | -22.3 | dBm |
| SFP+ UP Rx Power | -17.8 | -19.8 | dBm |
| UP OSNR | 25.7 | 23.7 | dB |

FIG. 10

| 20 & 40 CH OCML (96 CH AWG) Loss Budgets, 40Km | | | |
|---|---|---|---|
| | 20 CH | 40 CH | |
| 10G Txcvr Output Power | 1 | 1 | dBm |
| DS EDFA Gain used (dB) | 10 | 10.5 | dB |
| Max. DS EDFA Saturated Output Power | 18 | 21.5 | dBm |
| OCML loss from DS EDFA to output port | 3.5 | 3.5 | dB |
| Total Power into fiber (10G+GPON+10GEPON) | 15.5 | 18.5 | dBm |
| DS Output/wavelength into fiber (10G) | 1.5 | 2 | dBm |
| Fiber Loss (40Km) | 8.8 | 8.8 | dB |
| MDM Loss | 7.5 | 9.5 | dB |
| Misc: Margin, Connectors | 3.6 | 3.6 | dB |
| Total Loss | 19.9 | 21.9 | dB |
| SFP+ DS Rx Power | -18.4 | -19.9 | dBm |
| SFP+ UP Rx Power | -12.4 | -14.4 | dBm |
| UP OSNR | 30.1 | 28.1 | dB |

FIG. 11

FORTY CHANNEL OPTICAL COMMUNICATIONS MODULE LINK EXTENDER RELATED SYSTEMS AND METHODS

FIELD OF INVENTION

This disclosure relates generally to the field of optical telecommunications.

BACKGROUND

To understand the importance of optical networking, the capabilities of this technology have to be discussed in the context of the challenges faced by the telecommunications industry, and, in particular, service providers. Most U.S. networks were built using estimates that calculated bandwidth use by employing concentration ratios derived from classical engineering formulas for modeling network usage such as the Poisson process. Consequently, forecasts of the amount of bandwidth capacity needed for data networks were calculated on the presumption that a given individual would only use network bandwidth six minutes of each hour. These formulas did not factor in the amount of traffic generated by different devices accessing the Internet. With the advent of the Internet and the ever increasing number of devices (e.g., facsimile machines, multiple phone lines, modems, teleconferencing equipment, mobile devices including smartphones, tablets, laptops, wearable devices, and Internet of Things (IoT) devices, etc.) accessing the Internet, there has been an average increase in Internet traffic of 300 percent year over year. Had these factors been included, a far different estimate would have emerged.

As a result of this growth of devices, an large amount of bandwidth capacity is needed to provide the services required by these devices. In the 1990s, some long-distance carriers increased their capacity (bandwidth) to 1.2 Gbps over a single optical fiber pair, which was a considerable upgrade at the time. At a transmission speed of one Gbps, one thousand books can be transmitted per second. However, today, if one million families in a city decided to view a video on a Website (e.g., YouTube, Home Box Office (HBO) on the go, DirectTV, etc.) then network transmission rates on the order of terabits are required. With a transmission rate of one terabit, it is possible to transmit 200 million simultaneous full-duplex phone calls or transmit the text from 300 years-worth of daily newspapers per second.

BRIEF DESCRIPTION OF THE FIGURES

FIG. 10 depicts an access link loss budget of a 20 CH OCML passive circuit and a 40 CH OCML passive circuit, in accordance with the disclosure.

FIG. 11 depicts an access link loss budget of a 20 CH OCML passive circuit and a 40 CH OCML passive circuit, in accordance with the disclosure.

DETAILED DESCRIPTION

Figure 1:
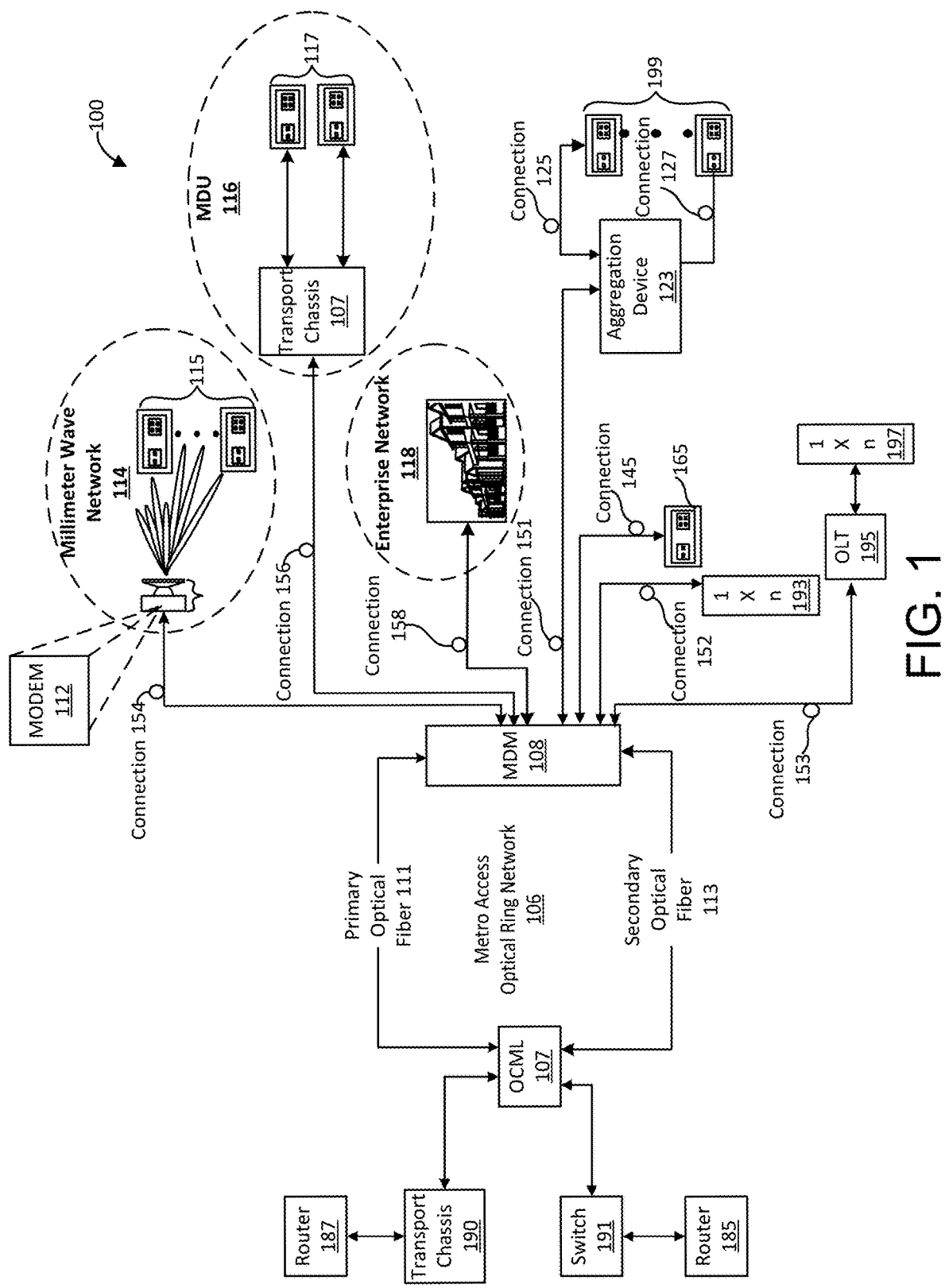
FIG. 1 depicts a network architecture, in accordance with the disclosure.

When largescale data networks providing residential, commercial, and enterprise customers with Internet access were first deployed, the unprecedented growth in the number of devices accessing the network could not have been imagined. As a result, the network growth requirements needed to meet the demand of the devices were not considered at that time either. For example, from 1994 to 1998, it is estimated that the demand on the U.S. interexchange carriers' (IXC's) network would increase sevenfold, and for the U.S. local exchange carriers' (LEC's) network, the demand would increase fourfold. For instance, some cable companies indicated that their network growth was 32 times the previous year, while other cable companies have indicated that the size of their networks have doubled every six months in a four-year period.

In addition to this explosion in consumer demand for bandwidth, many service provider are coping with optical fiber exhaust in their network. For example, in 1995 alone many (ISP) companies indicated that the amount of embedded optical fibers already in use at the time was between 70 percent and 80 percent (i.e., 70 to 80 percent of the capacity of their networks were used most of the time to provide service to customers). Today, many cable companies are nearing one hundred percent capacity utilization across significant portions of their networks. Another problem for cable companies is the challenge of deploying and integrating diverse technologies in on physical infrastructure. Customer demands and competitive pressures mandate that carriers offer diverse services economically and deploy them over the embedded network. One potential technology that meets these requirements is based on multiplexing a large and diverse number of data, regardless of the type of data, onto a beam of light that may be attenuated to propagate at different wavelengths. The different types of data may comprise facsimile sources, landline voice sources, voice over Internet Protocol (VOIP) sources, video sources, web browser sources, mobile device sources including voice application sources, short messaging service (SMS) application sources, multimedia messaging service (MMS) application sources, mobile phone third-party application (app) sources, and/or wearable device sources. When a large and diverse number of data sources, such as the ones mentioned in the previous sentence, are multiplexed together over light beams transmitted on an optical fiber, it may be referred to as a dense wave division multiplexing (DWDM).

The use of an optical communications module link extender (OCML) (e.g., 40 CH OCML) circuit as described herein allows cable companies to offer these services regardless of the open systems interconnection (OSI) model network layer (layer 3) protocols or media access control (MAC) (layer 2) protocols that are used by the different sources to transmit data. For example, email, video, and/or multimedia data such as web based content data, may generate IP (layer 3) data packets that are transmitted in asynchronous transfer mode (ATM) (layer 2) frames. Voice (telephony) data may be transmitted over synchronous optical networking (SONET)/synchronous digital hierarchy (SDH). Therefore regardless of which layer is generating data (e.g., IP, ATM, and/or SONET/SDH) a DWDM passive circuit provides unique bandwidth management by treating all data the same. This unifying capability allows cable companies with the flexibility to meet customer demands over a self-contained network.

A platform that can unify and interface with these technologies and position the cable company with the ability to integrate current and next-generation technologies is critical for a cable company's success.

Cable companies faced with the multifaceted challenge of increased service needs, optical fiber exhaust, and layered bandwidth management, need options to provide economical and scalable technologies. One way to alleviate optical fiber exhaust is to lay more optical fiber, and, for those networks where the costs of laying new optical fiber is minimal, the best solution may be to lay more optical fiber. This solution may work in more rural, where there may be no considerable population growth. However, in urban or suburban areas laying new optical fiber may be costly. Even if it was not costly, the mere fact that more cable is being laid does not necessarily enable a cable company to provide new services or utilize the bandwidth management capabilities of the unifying optical transmission mechanism such as DWDM.

Another solution may be to increase the bit rate using time division multiplexing (TDM). TDM increases the capacity of an optical fiber by slicing time into smaller time intervals so that more bits of data can be transmitted per second. Traditionally, this solution has been the method of choice, and cable companies have continuously upgraded their networks using different types of digital signaling technologies to multiplex data over SONET/SDH networks. For example, Digital Signal (DS) DS-1, DS-2, DS-3, DS-4, and DS-5, commonly referred to as T1, T2, T3, T4, or T5 lines, are different carrier signals, that are transmitted over SONET/SDH networks that can carry any of the sources of data mentioned above, whose data rates increase with the number assigned to the DS. That is DS-1 was the earliest carrier signal used to transmit data over SONET/SDH networks, and has the lowest data rate and DS-5 is the most recent carrier signal use to transmit data over SONET/SDH networks with the highest data rate. Cable company networks, especially SONET/SDH networks have evolved over time to increase the number of bits of data that can be transmitted per second by using carrier signals with higher data rates. However, when cable companies use this approach, they must purchase capacity based on what the SONET/SDH standard dictates will be the next increase in capacity. For example, cable companies can purchase a capacity of 10 Gbps for TDM, but should the capacity not be enough the cable companies will have to purchase a capacity of 40 Gbps for TDM, because there are no intermediate amounts of capacity for purchase. In such a situation, a cable company may purchase a significant amount of capacity that they may not use, and that could potentially cost them more than they are willing to pay to meet the needs of their customers. Furthermore, with TDM based SONET/SDH networks, the time intervals can only be reduced to a certain size beyond which it is no longer possible to increase the capacity of a SONET/SDH network. For instance, increasing the capacity of SONET/SDH networks to 40 Gbps using TDM technology may prove to be extremely difficult to achieve in the future.

DWDM passive circuits can be used in combination with one or more other optical communications devices to develop novel signal extension circuits that increase the range with which light beams are propagated and the number of signals that can be combined and transmitted from a cable company to customers. The circuits disclosed herein may be referred to as 40 channel optical communications module link (40 CH OCML). The 40 CH OCML passive circuits, disclosed herein, increase the capacity of embedded optical fibers by first assigning incoming optical signals to specific frequencies (wavelength, denoted by lambda) within a designated frequency band and then multiplexing the resulting signals out onto one optical fiber. Because incoming signals are never terminated in the optical layer, the interface can be bit-rate and format independent, thereby allowing the service provider to integrate DWDM passive circuits easily into a passive circuit, such as a 40 CH OCML passive circuit, with existing equipment in the network while gaining access to the untapped capacity in the embedded optical fibers.

In one or more embodiments, a DWDM passive circuit combines multiple optical signals for transportation over a single optical fiber, thereby increasing the capacity of a service provider's network. Each signal carried can be at a different rate (e.g., optical carrier transmission rate OC-3, OC-12, OC-24 etc.) and in a different format (e.g., SONET, ATM, data, etc.). For example, the networks disclosed herein comprise DWDM passive circuits that transmit and receive a mix of SONET signals with different data rates (e.g., OC-48 signals with a data rate of 2.5 Gbps or OC-192 signals with a data rate of 10 Gbps) can achieve data rates (capacities) of over 40 Gbps. The 40 CH OCML passive circuits disclosed herein can achieve that while maintaining the same degree of system performance, reliability, and robustness as current transport systems—or even surpassing it. The 40 CH OCML passive circuits may be a smart platform, integrated into a network headend or a network cabinet, and may connect a metro area network that provides internet and telecommunications services to end users (e.g., enterprise multi dwelling unit (MDU) customers, residential customers, commercial customers, and industrial customers) through one or more optical fiber links. The 40 CH OCML passive circuits may also be referred to as 40 CH OCML headends. The 40 CH OCML headend enables a plurality of signals to be cost effectively transported over long optical fiber distances between 5 km and 60 km without having to put any optical amplifiers or other active devices, like an optical switch, (normally used to provide path redundancy in case of an optical fiber cut) in the field.

In one or more embodiments, the 40 CH OCML headend is intended to transport a mix of multi-wavelength coherent 10 Gigabit non-return-to-zero (10 GNRZ), coherent 100 Gigabit Ethernet (100 GbE), 200 GbE, and/or 400 GbE, gigabit passive optical network (GPON), and/or 10 Gigabit PON (XGPON)/10 Gigabit Ethernet PON (10 GEPON) signals over the same optical fiber without having active devices such as optical amplifiers in the field. The 40 CH OCML headend is also configured to support the same wavelengths over a secondary optical fiber through an optical switch in case the primary optical fiber experiences a cut. In one embodiment, a 40 CH OCML headend, systems, and methods include various subsystems integrated into a single module including an integrated DWDM passive circuit that combines and separates bi-directional wavelengths in optical fibers propagating in a conventional wavelength window, such as the c band dispersive region of the optical fibers. The 40 CH OCML headend may comprise a three port or four port wave division multiplexer (WDM) or circulator to combine and separate 10 GNRZ, coherent 100 GbE, 200 GbE, and/or 400 GbE downstream and upstream signals of different wavelengths. The 40 CH OCML headend may also comprise a four port WDM to combine GPON, EPON, and 10 GNRZ, coherent 100 GbE, 200 GbE, and/or 400 GbE optical signals of different wavelengths, while the DWDM combines SONSET/SDH and/or ATM signals. The 40 CH OCML headend may also comprise a five port WDM to combine and separate upstream and downstream signals comprising GPON, XGPON/10 GEPON, and 10 GNRZ, coherent 100 GbE, 200 GbE, and/or 400 GbE optical data signals of different wavelengths. Although the term multiplexer is used to describe the WDMs as disclosed herein, the WDMs do not exclusively multiplex (combine) one or more downstream signals into a single downstream signal, but they also demultiplex (separate) a single upstream signal into one or more upstream signals.

In one or more embodiments, the WDM may comprise one or more thin film filters (TFFs) or array waveguide gratings (AWGs) that combine one or more downstream signals into a single downstream signal and separate a single upstream signal into one or more upstream signals. The WDM may comprise one or more wavelength-converting transponders, where each of the wavelength-converting transponders receives an optical data signal (e.g., a 10 G NRZ, coherent 100 GbE, 200 GbE, and/or 400 GbE optical data signal) from a client-layer optical network such as a Synchronous optical network (SONET)/synchronous digital hierarchy (SDH), Internet protocol (IP), and/or asynchronous transfer mode (ATM) optical network. Each of the wavelength-converting transponders converts the optical data signal into an electrical data signal, and then converts the electrical data signal into a second optical data signal to be emitted by a laser, where the second optical data signal is carried by one or more packets of light oscillating with wavelengths in the c band. More specifically, each of the wavelength-converting transponders may include a laser that emits the second optical data signal. That is each of the second optical data signals may be emitted by a laser with a unique wavelength. In some embodiments, the wavelength-converting transponders may comprise two adjacent transceivers. That is, each of the wavelength-converting transponders may comprise a first transceiver that converts the optical data signal into an electrical data signal, and may comprise second transceiver that converts the electrical data signal into the second optical data signal. The second transceiver converts the electrical signal to the second optical data signal such that the second optical data signal is transmitted with the correct wavelength.

In one or more embodiments, a first wavelength-converting transponder, of the two wavelength-converting transponders, may emit a second optical data signal with a 1550 nm wavelength. A second wavelength-converting transponder, of the two wavelength-converting transponders, may emit a second optical data signal with a 1533 nm wavelength. For example, there may be two wavelength-converting transponders, and each of the two wavelength-converting transponders may include a laser emitting a second optical data signal with a unique wavelength. Thus, each of the wavelength-converting transponders converts the electrical data signal into an optical data signal, and each of the wavelength-converting transponders emits, or transmits, the optical data signal, with a wavelength in the c band, to a TFF or AWG. The TFF or AWG, may combine or multiplex the optical data signals, emitted by each of the wavelength-converting transponders, into a multi-wavelength optical data signal where each of the wavelengths in the multi-wavelength optical data signal coincide with the wavelengths associated with each of the optical data signals. Returning to the example above of the two wavelength-converting transponders, the first and second wavelength-converting transponders, may each receive an optical signal from a SONET/SDH client layer network. The first and second wavelength-converting transponders may each respectively convert the optical signal they received from the SONET/SDH client layer network into an electrical data signal. The first wavelength-converting transponder may convert the electrical data signal that it receives into a second optical data signal with a first wavelength. The first wavelength-converting transponder may emit, via a first laser, the second optical data signal, with the first wavelength, to the TFF or AWG. The second wavelength-converting transponder may convert the electrical data signal that it receives into a second optical data signal with a second wavelength. The second wavelength-converting transponder may emit, via a second laser, the second optical signal, with the second wavelength, to the TFF or AWG. The TFF or AWG may combine or multiplex the second optical data signal, with the first wavelength, and the second optical data signal, with the second wavelength, onto a multi-wavelength optical signal. The TFF or AWG may be referred to as an optical multiplexer.

In one or more embodiments, the DWDM passive circuits disclosed herein may include wavelength-converting transponders and corresponding WDMs that combine or multiplex optical data signals similar to the WDMs described above. The DWDM passive circuits may also include wavelength-converting transponders and corresponding WDMs that separate optical data signals. In some embodiments, the same WDM may combine optical data signals and separate optical data signals. That is, the WDM may separate one or more optical data signals from a multi-wavelength optical data signal, or demultiplex the one or more optical data signals from the multi-wavelength optical data signal. The WDM may separate the one or more optical data signals from a multi-wavelength optical data signal using a process that is the exact opposite of the process used to combine one or more optical data signals into a multi-wavelength signal. The WDM may separate one or more optical data signals from a multi-wavelength optical data signal that may correspond to an upstream signal received from a remote DWDM passive circuit.

In one or more embodiments, the WDM may receive the multi-wavelength optical data signal and one or more TTF or AWGs may separate the one or more optical data signals, from the multi-wavelength optical data signal, using filters or waveguide gratings with properties that separate optical data signals, with different wavelengths, from a multi-wavelength optical data signal. After the WDM has separated the optical data signals, with different wavelengths, from the multi-wavelength optical data signal, the WDM may convert each of the separated optical data signals to a corresponding electrical data signal. The WDM may then convert the corresponding electrical data signal to a second optical data signal, where the second optical data signal may be an optical data signal with signal characteristics commensurate for use with a SONET/SDH, IP, or ATM client-layer optical network.

As mentioned above, the WDM may also be a circulator, or function as a circulator. The circulator in the WDM may be an optical circulator comprised of a fiber-optic component that can be used to separate upstream signals and downstream signals. The optical circulator may be a three-port or four-port device in which an optical data signal entering one port will exit the next port. The optical circulator may be in the shape of a square, with a first port on the left side of the square, a second port on the right side of the square, and a third port on the bottom side of the square. A first optical data signal (e.g., a downstream signal) entering the first port may exit the second port. A second optical data signal (e.g., an upstream signal) entering the third port may exit the first port.

In one or more embodiments, an upstream signal, as referred to herein, may be a flow one or more packets of light, oscillating with a predetermined wavelength, along one or more optical fibers in a direction toward the 40 CH OCML headend from a field hub or outside plant. A downstream signal, as referred to herein, may be a flow of one or more packets of light, oscillating with a predetermined wavelength, along one or more optical fibers in a direction away from the 40 CH OCML headend and toward the field hub or outside plant. The one or more packets of light may correspond to one or more bits of data. Both downstream and upstream signals propagate along the same optical fiber, but in opposite directions. In some embodiments, the downstream and upstream signals may propagate along the same fiber simultaneously using one or more wavelength multiplexing techniques as explained below. This bidirectional simultaneous communication between the 40 CH OCML headend and the outside plant may be referred to as a full duplex connection. Field hub and outside plant may be used interchangeably.

In some embodiments, the 40 CH OCML headend may also comprise a booster optical amplifier, that amplifies downstream signals based on the length of a fiber between the 40 CH OCML headend and the outside plant. The booster optical amplifier may be an Erbium Doped Fiber Amplifier (EDFA). The core of the EDFA may be an erbium-doped optical fiber, which may be a single-mode fiber. The fiber may be pumped, by a laser, with one or more packets of light in a forward or backward direction (co-directional and coutner-directional pumping). The one or more packets of light pumped into the fiber, may have a wavelength of 980 nm. In some embodiments the wavelength may be 1480 nm. As the one or more packets of light are pumped into the fiber erbium ions ($Er^{3+}$) are excited and transition into a state where the ions can amplify the one or more packets of light with a wavelength within the 1.55 micrometers range. The EDFA may also comprise two or more optical isolators. The isolators may prevent light pumped into the fiber that leaves the EDFA from returning to the EDFA or from damaging any other electrical components connected to the EDFA. In some embodiments, the EDFA may comprise fiber couplers and photodetectors to monitor optical power levels. In other embodiments, the EDFA may also comprise pump laser diodes with control electronics and gain flattening filters. The EDFA could amplify each of the one or more optical data signals, while they are combined in a multi-wavelength optical data signal, without introducing any effects of gain narrowing. In particular, the EDFA may simultaneously amplify the one or more optical data signals, each of which have a different wavelength, within a gain region of the EDFA. A gain of the booster optical amplifier may be based at least in part on the length of the fiber. In some embodiments, the length of the fiber may be between 5 and 60 kilometers.

In one or more embodiments, the 40 CH OCML headend may also comprise an optical pre-amplifier that may amplify upstream signals. The optical pre-amplifier may also be an EDFA. The optical pre-amplifier may amplify upstream signals based on the length of the fiber between the outside plant and the 40 CH OCML headend to account for any loses in the strength of the upstream signals propagating along the fiber. The gain of the optical pre-amplifier may be based at least in part on a required signal strength of the upstream signals at an input to the DWDM passive circuit, in order for the DWDM to demultiplex the upstream signals. The optical pre-amplifier could amplify a multi-wavelength optical data signal, so that the one or more optical data signals in the multi-wavelength optical data signal, each of which have different respective wavelengths, have a certain received power level at a DWDM passive circuit upstream input port.

In one or more embodiments, the optical signal to noise ratio (OSNR) of the EDFA may be based at least in part on an input power to the EDFA, a noise figure. In some embodiments the OSNR of the EDFA may be determined by the expression OSNR=58 dB−NF−$P_{in}$, where NF is the noise floor, $P_{in}$ is the input power to the EDFA. 58 dB is constant based on Planck's constant, the speed of light, the bandwidth of the EDFA, and the wavelength of the one or more packets of light. In some embodiments, the OSNR of the EDFAs disclosed herein may be as high as 40 dB, for one or more packets of light that are transmitted downstream from 40 CH OCML headend. The OSNR of the transceivers disclosed herein may be as low as 23 dB, and there may be a plurality of bit error rate (BER) values associated with this 23 dB OSNR. The BER may be determined based at least in part on the energy detected per bit, noise power spectral density, and a complementary error function. More specifically the BER may be $$\frac{1}{2}\text{erfc}\left(\sqrt{\frac{E_b}{N_0}}\right),$$

wherein $E_b$ is the energy detected per bit, $N_0$ is the noise power spectral density, and erfc is the complementary error function. For instance, the transceivers disclosed herein may be able to achieve a BER of $10^{-12}$ when the common logarithm ratio of received power to 1 milliwatt (mW) is −23 dBm. For example, a transceiver in the 40 CH OCML headend may receive an upstream flow or one or more packets of light, from a transceiver in the field hub or outside plant, that has a common logarithm ratio of received power per mW of −23 dBm. The BER may be greater for common logarithm ratios of received power per mW, meaning that the BER may decrease with the higher common logarithm ratios of received power per mW. The transceivers may be configured to have greater OSNRs, and therefore lower BERs for the same value of a common logarithm ratio of received power per mW. For example, a first transceiver configured to have an OSNR of 24 dB with a common logarithm ratio of received power per mW of −28 dBm may have an approximate BER of $10^{-5}$ and a second transceiver configured to have an OSNR of 26 dB with a common logarithm ratio of received power per mW of −28 dBm may have an approximate BER of $10^{-7}$. Thus, transceivers configured to have a higher OSNR results in the transceiver having a lower BER for the same common logarithm ratio of received power per mW.

In one or more embodiments, the 40 CH OCML headend may also comprise an optical switch that may connect a WDM to a primary optical fiber connecting the 40 CH OCML passive circuit to the outside plant. The optical switch may also connect the WDM to a secondary optical fiber connecting the 40 CH OCML passive circuit to the outside plant. The optical switch may be in a first position that connects the WDM to the primary optical fiber, and may be in a second position that connects the WDM to the secondary optical fiber. The optical switch may be in the second position when the primary optical fiber is disconnected or unresponsive.

Figure 9A:
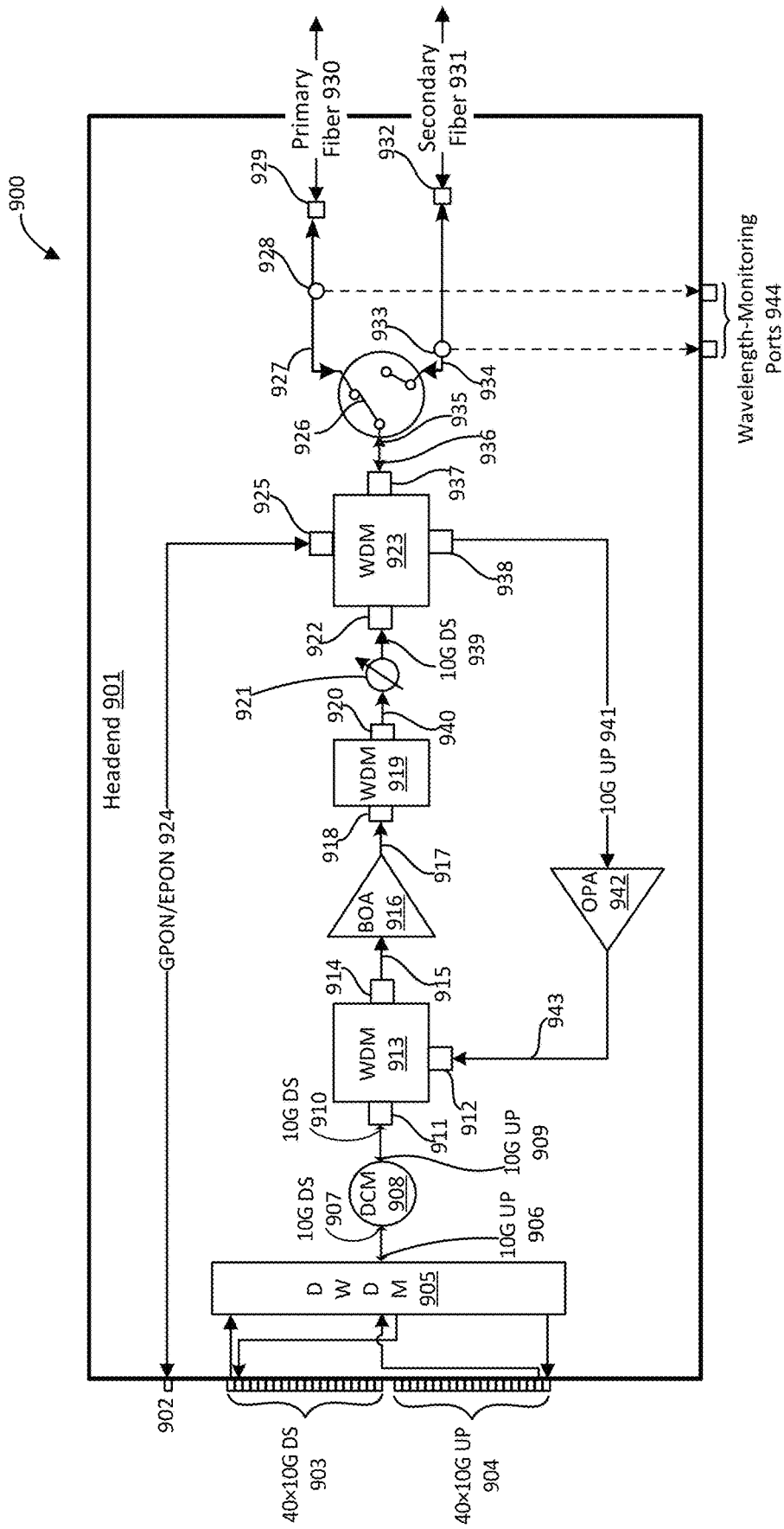
FIG. 9A depicts an access network diagram of a 40 CH OCML headend, in accordance with the disclosure.

In one or more embodiments, because the 40 CH OCML headend, field hub or outside plant, and fiber connecting the 40 CH OCML headend and field hub or outside plant mainly comprise passive optical components, in comparison to other optical ring networks that primarily have active components, one or more devices may be needed to control for dispersion of light as it goes through different optical components. In particular, as packets of light traverse the different optical components in the 40 CH OCML headend (e.g., WDMs and/or optical amplifiers including booster amplifiers or pre-optical amplifiers), an optical data signal being carried by the packets of light may begin to experience temporal broadening which is a form of optical data signal distortion. Because the 40 CH OCML systems disclosed herein transmit high data rate optical data signals, about 10 Gbps, there may be some strong dispersive temporal broadening effects introduced by one or more of the optical components in the 40 CH OCML headend. The optical data signals disclosed herein may carry digital symbols, which are a series of binary digits (1 or 0), and each binary digit may be represented by a pulse of light (one or more packets of light) of a certain amplitude, that lasts a certain period. For example, an optical data signal may be carrying a plurality of digital symbols, wherein a pulse of light that has a certain amplitude and certain pulse width (certain period) represents each binary digit in a digital symbol of the plurality of digital symbols. The pulse widths of each of the pulses of light may begin to broaden as each of the pulses of light traverses different optical components. As a result, the symbol may begin to broaden. Consequently, as each of the symbols begins to broaden in time, and may become indistinguishable from an adjacent symbol. This may be referred to as intersymbol interference (ISI), and can make it difficult for a fiber-optic sensor or photodetector receiving the optical data signal to distinguish adjacent symbols from one another. In order to compensate for this phenomenon, a dispersion compensation module (DCM) may be inserted between one or more optical components in the 40 CH OCML headend. For example, a DCM may be receive an optical data signal output from a WDM to compensate for any potential ISI that may be introduced as a result of different optical data signals, carried over pulses of light, that have been combined, multiplexed, or circulated in the WDM. The DCM can also compensate for dispersion characteristics of the fiber between the 40 CH OCML headend and the field hub or outside plant. In particular, the fiber may comprise certain optical elements or material impurities that can be compensated for in the DCM, wherein the DCM comprises long pieces of dispersion-shifted fibers or chirped fiber Bragg gratings. The dispersion-shifted fibers or chirped fiber Bragg gratings can reduce ISI introduced by the fiber. In some embodiments, the 40 CH OCML headend may comprise one or more DCMs to compensate for ISI that may be introduced by one or more optical components in the 40 CH OCML headend or fiber that is either upstream or downstream from the one or more DCMs. For example, in one embodiment, a first DCM may be positioned upstream from a first WDM, a second WDM, and third WDM. This embodiment is illustrated in FIG. 9A, and further explained below.

It should be noted that the DCMs may cause negative dispersion for shorter lengths of fiber (e.g., lengths of fiber less than 5 kilometers). Negative dispersion may occur when a flow of one or more packets of light, forming a wave, propagate along a distance of the fiber with a negative rate of change. The wave propagates along the fiber, and the wave has an electric field associated with it that is normal to the direction of propagation of the wave, and a magnetic field associated with it that is normal to the electric field and the direction of propagation of the wave. The wave propagates along the fiber with an angular frequency, w, which may be a function of a propagation constant $\beta$. The electric and magnetic fields may both oscillate in accordance with sinusoidal function $e^{i(\beta z-\omega t)}$, wherein z is a distance that the wave has traveled in the fiber, and t is the time elapsed after the wave has been transmitted by the DCM. That is the electric and magnetic field may oscillate in accordance with a sinusoidal function equal to $\cos(\beta z-\omega t)+i\sin(\beta z-\omega t)$, wherein the oscillation of the wave is based at least in part on the propagation constant, and angular frequency, and the amount of time that has elapsed since the wave has been transmitted by the DCM. The angular frequency may be reciprocal of the amount of time that the electric and magnetic fields oscillate an entire cycle or period. The propagation constant may be a complex quantity, wherein the real part of the propagation constant is a measure of a change in the attenuation of the wave as it propagates along the fiber. The real part of the propagation constant may be referred to as an attenuation constant. The imaginary part of the propagation constant is a measure of a change in the phase of the wave as it propagates along the fiber. Because the angular frequency may be based at least in part on the propagation constant, the angular frequency of the wave may change as the attenuation and phase of the wave change. Accordingly, the velocity of the wave may change as it propagates along the fiber and may begin to experience dispersion. The velocity of the wave may be the rate at which the angular frequency changes as the propagation constant changes while the wave propagates along the fiber. That is the velocity of the wave may be expressed as $$v = \frac{d\omega}{d\beta}.$$

The wavelength of the wave may be expressed as $$\lambda = 2\pi \frac{c}{\omega},$$

wherein c is the speed of light. The dispersion of the wave may be based at least in part on the speed of light, wavelength of the wave, velocity of the wave, and the rate of change of the velocity of the wave with respect to the angular frequency. The dispersion of the wave may be expressed as $$D = \frac{2\pi c}{v^2 \lambda^2} \frac{dv}{d\omega}.$$

is a dispersion parameter of the wave and is based on the speed of light (c), the velocity of the wave (v), the wavelength of the wave (λ), and the rate of change or first derivative of the velocity of the wave with respect to the angular frequency of the wave $$\left(\frac{dv}{d\omega}\right).$$

The dispersion parameter indicates whether the wave experiences positive dispersion (temporal broadening) or negative dispersion (temporal contraction) as the wave propagates along the fiber. Negative dispersion may occur when the rate of change or derivative of the velocity of the wave, with respect to the angular frequency is negative. When $$\left(\frac{dv}{d\omega}\right)$$

is negative, the wave is said to be experiencing negative dispersion. Thus when the rate of change of the velocity of the wave with respect to the angular frequency is negative, the wave may experience temporal contraction. Accordingly, transceivers in the transponders of the DWDM of the field hub or outside plant must be capable of detecting waves subject to negative dispersion. Negative dispersion is the opposite of positive dispersion in that ISI may not occur when a wave is detected at the transceivers in the transponders of the DWDM of the field hub or outside plant. However, temporal contraction of the wave may make it difficult for a fiber-optic sensor or photodetector to detect an optical data signal carrying digital symbols, because the digital symbols in the optical data signal may begin to overlap with one another. This may happen because each of the digital symbols are a series of binary digits, and the binary digits are represented by a pulse of light (one or more packets of light in the wave), and as the wave begins to experience negative dispersion, each of the binary digits may begin to overlap with one another. The transceivers disclosed herein are equipped with fiber-optic sensors or photodetectors that are capable of correctly detecting the one or more packets of light in the wave, when the wave is subject to positive and/or negative dispersion. The DCMs disclosed herein may transmit a signal a distance of 30 kilometers.

In one or more embodiments, the 40 CH OCML headend may also comprise a non-optical switch that switches due to a loss of light or on demand.

In one or more embodiments, the 40 CH OCML headend may also comprise wavelength-monitoring ports that connect to the primary and secondary optical fibers to monitor the wavelength of upstream signals comprising 10 G NRZ, coherent 100 GbE, 200 GbE, and/or 400 GbE, and/or XGPON/10 GEPON signals and/or to monitor the wavelength of downstream signals comprising 10 G NRZ, coherent 100 GbE, 200 GbE, and/or 400 GbE, GPON, and/or XGPON/10 GEPON signals.

Certain embodiments of the disclosure are directed to a 40 CH OCML, systems, and methods. Embodiments of the disclosure now will be described more fully hereinafter with reference to the accompanying drawings, in which certain embodiments are shown. This disclosure may, however, be embodied in many different forms and should not be construed as limited to the embodiments set forth herein. Instead, these embodiments are provided so that this disclosure will be thorough and complete, and will fully convey the scope of the disclosure to those skilled in the art. Like numbers refer to like elements throughout.

It should be noted that the 40 CH OCML headend may also be referred to as a terminal or Master Terminal Center (MTC). In some embodiments, the 40 CH OCML headend may be collocated within the MTC. In other embodiments, the 40 CH OCML headend may be located at a secondary transport center (STC) that may be connected to the MTC via a network. In some embodiments, an outside plant may also be referred to as a field hub or remote physical device (RPD). In some embodiments, the outside plant may be collocated with the RPD. In other embodiments, the outside plant and RPD may not be collocated and connected via a 10 Gigabit transceiver. The outside plant may comprise one or more passive optical network devices. The RPD leverages existing IP technologies such as Ethernet PON (EPON), Gigabit-capable Passive Optical Networks (GPON), and Metro Ethernet (MetroE) equipment, in order to provide Data Over Cable Systems Interface Standard (DOCSIS) services in MDUs over digital fiber to enable two-way services over cable.

FIG. 1 depicts an network architecture (network architecture 100), in accordance with the disclosure. The network architecture may comprise routers (for example router 187 and router 185) that may be capable of routing one or more packets from backbone network (not illustrated) to an 40 CH OCML terminal (for example 40 CH OCML terminal 107).

Router 187 may be a router that aggregates one or more first ingress packets received from the backbone network to a transport chassis (for example transport chassis 190). Router 187 may also receive one or more first egress packets from transport chassis 190 and route the one or more first egress packets to the backbone network. The backbone network may be a network connecting one or more service provider networks across a large geographic area such as a content (for example North America). The one or more first ingress packets and the one or more first egress packets may be transmitted between router 187 and transport chassis 190 via a plurality of coherent 100 GbE, 200 GbE, and/or 400

GbE links. The plurality of coherent 100 GbE, 200 GbE, and/or 400 GbE links may be SONET/SDH optical data signal links.

Transport chassis 190 may be a physical platform that accommodates a plurality of optical devices including a coherent transceiver. Transport chassis 190 may create a coherent optical data signal, which may be, for example an optical data signal comprising coherent 100 GbE, 200 GbE, and/or 400 GbE optical data signals. Transport chassis 190 may send coherent optical data signals to 40 CH OCML terminal 107, and transport chassis 190 may receive coherent optical data signals from 40 CH OCML terminal 107.

Switch 191 may be an optical switch that receives one or more second ingress packets from router 185 and may transmit one or more second ingress frames, corresponding to the one or more second ingress packets, out of a port in switch 191 to 40 CH OCML terminal 107. The one or more second ingress packets may be received via a plurality of coherent 100 GbE, 200 GbE, and/or 400 GbE links. And the one or more second ingress frames may be switched out of the port in switch 191 to 40 CH OCML terminal 107 as an optical data signal via a coherent 100 GbE, 200 GbE, and/or 400 GbE optical data signal switch. Switch 191 may receive one or more second egress frames from 40 CH OCML terminal 107, create one or more second egress packets, and transmit the one or more egress packets to router 185.

40 CH OCML terminal 107 may connect a cable company to the Internet through the backbone network. 40 CH OCML terminal 107, Primary Optical Fiber 111, Secondary Optical Fiber 113, and MDM 108 form a network that may be referred to as the Metro Access Optical Ring Network (for example Metro Access Optical Ring Network 106). Millimeter Wave Network 114 may be connected to MDM 108 via connection 154. Multi-dwelling unit (MDU) 116 may be connected to MDM 108 via connection 156 and transport chassis 107. Enterprise Network 118 may be connected to MDM 108 via connection 158. Devices 199 are connected to MDM 108 via connections 125 . . . 127, aggregation device 123, and connection 151.

Millimeter Wave Network 114 may comprise one or more cellular or Wi-Fi masts with one or more modems (for example Modem 112) that provide mobile devices (for example devices 115) with access to content hosted by the one or more servers at a MTC Master Terminal Facility (not illustrated).

MDU 116 may comprise a remote physical (PHY) node comprising a transport chassis (for example transport chassis 107) that may comprise an optical communications interface that connects to connection 156 and a cable interface that connects to one or more cable devices (for example devices 117) via cable. The one or more cable devices may be devices connecting cable set-top boxes in one or more residential, commercial, or industrial buildings to a tap at devices 117. Devices 117 is connected to connection 156 via transport chassis 107.

Enterprise Network 118 may comprise one or more offices requiring high-speed access to the Internet via Backbone Network 102 for example. Enterprise Network 118 may connect to the Internet via connection 158.

Device 165 may be a cable device connected to MDM 108 via connection 145. 1×n 193 may be an optical splitter or a beam splitter. The optical splitter or beam splitter may split one optical data signal into n different optical data signals. 1×n 193 may comprise one or more quartz substrates of an integrated waveguide optical power distribution device. 1×n 193 may be a passive optical network device. It may be an optical fiber tandem device comprising one or more input terminals and one or more output terminals. 1×n 139 may be Fused Biconical Taper (FBT) splitter or Planar Lightwave Circuit (PLC) splitter. 1×n 193 may be a balanced splitter wherein 1×n 193 comprises two input fibers and one or more output fibers over which the ingress optical data signal may be spread proportionally. In some embodiments, the ingress optical data signal may not be spread proportionally across the output fibers of an optical splitter. In some embodiments, the optical splitter may comprise two input fibers and 2 output fibers. A first input fiber of the optical splitter may be connected to primary fiber and a second input fiber of the optical splitter may be connected to secondary fiber. 1×n 193 may be connected to MDM 108 via connection 152. 1×n 197 may be a . . . 1×n 197 may be connected to MDM 108 via optical link terminal (OLT) 195 and connection 153. Devices 115, device 117, devices 199, device 165, 1×n 193, 1×n 197, and the one or more devices in enterprise network 118 may be connected to the backbone network via Metro Access Optical Ring Network 106.

Aggregation device 123 may comprise one or more of a muxponder (MUX), ethernet switch or a router. Aggregation device 123 may multiplex one or more 10 GNRz, coherent 100 GbE, 200 GbE, and/or 400 GbE optical data signals. Aggregation device 123 may comprise a 10 GNRZ, coherent 100 GbE, 200 GbE, and/or 400 GbE transceiver, that receives one or more optical data signals comprising a multiplexed 10 GNRz, coherent 100 GbE, 200 GbE, and/or 400 GbE optical data signals. The 10 GNRZ, coherent 100 GbE, 200 GbE, and/or 400 GbE transceiver may receive these one or more optical data signals from a MDM (e.g., MDM 108) and may output one or more 10 GNRZ or 40 GNRZ optical data signals. For example, aggregation device 123 may transmit streaming video footage, that it received from one or more video servers at a 40 CH OCML headend (e.g., 40 CH OCML 107), over a 10 GNRZ optical data signal. In another example, aggregation device 123 may transmit one or more high bandwidth packets, corresponding to several movie files, to a node over a 40 GNRZ optical data signal.

Figure 2:
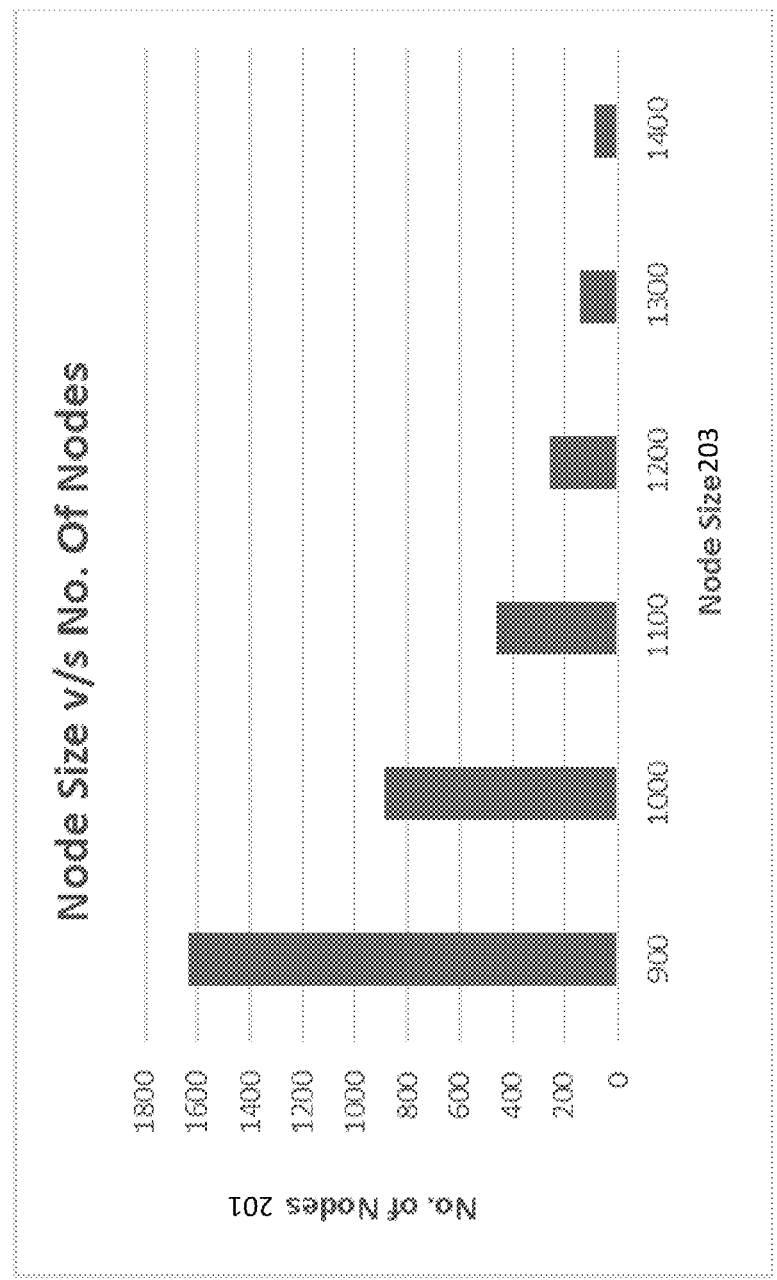
FIG. 2 depicts an illustrative diagram of a relationship between the size of a node network node and the number of network nodes, in accordance with the disclosure.

FIG. 2 depicts an illustrative diagram of a relationship between network node size and number of network nodes, in accordance with the disclosure. The diagram may be a bar chart (i.e., bar chart 200) illustrating an inverse relationship between the network node size and number of network nodes. The network node size may be the number of endpoints in a node that are connected to a MDM via a connection. For example, devices 117 may be a plurality of homes (e.g., 50 homes) within a MDU (e.g., MDU 116) that are connected to an MDM (e.g., MDM 108) via a RPD connected to the MDM at a connection point (e.g., connection 156). In this example, the MDU may be a node.

In some embodiments, the 40 CH OCML may transmit 18 downstream optical data signals, each of which have a unique wavelength, to the MDM connecting the RPD to the OCML in order to transport downstream data destined for the plurality of homes. The MDM may transmit 18 upstream optical data signals, each of which have a unique wavelength, to the OCML which connects the OCML to the RPD in order to transport upstream data destined for the service provider via a router (e.g., router 187 or router 185).

In another example, devices 115 may be a plurality of devices connected to a $5^{th}$ generation millimeter wave network (e.g., millimeter wave network 114), that is connected to the MDM via a RPD connected to the MDM at a connection point (e.g., connection 154). A 1×n optical splitter or beam splitter (e.g., 1×n 197) may split an optical data signal into n different optical data signals that are transmitted to one or more devices. The 1×n optical splitter or beam splitter is connected to the MDM via an OLT (e.g., OLT 195) connected to the MDM at a connection point (e.g., connection 153). In this example, the millimeter wave network and 1×n optical splitter or beam splitter may each be a node.

In some embodiments, the 40 CH OCML may transmit two downstream optical data signals, each of which have a unique wavelength, to the MDM connecting the RPD and OLT to the OCML in order to transport downstream data destined for the plurality of devices connected to the 5$^{th}$ generation millimeter wave network and one or more devices connected to the 1×n optical splitter or beam splitter. The MDM may transmit two upstream optical data signals, each of which have a unique wavelength, to the OCML which connects the OCML to the RPD and OLT in order to transport upstream data destined for the service provider via a router (e.g., router 187 or router 185).

As illustrated in FIG. 2, the average size of a network node (i.e., node size 203) increases the number of network nodes (e.g., no. of nodes 201) decreases. For instance, in FIG. 1, there are six network nodes (i.e., millimeter wave network 114, MDU 116, enterprise network 118, aggregation device 123, device 165, 1×n 193, and OLT 195). If two network nodes are combined (e.g., MDU 116 and enterprise network 118), the number of network nodes decreases by one resulting in a total of five network nodes. Accordingly, the size of the combined network node is greater than the size of either of the uncombined individual network nodes. That is the number of endpoints in the combined network node is greater than the number of endpoints in the individual network nodes. As a result, the average size of the network node increases. The average size of the network node increases because the size of the combined network node is greater than the size of either of the individual network nodes, and the number of network nodes decreases as a result of the combination of two network nodes.

Figure 3:
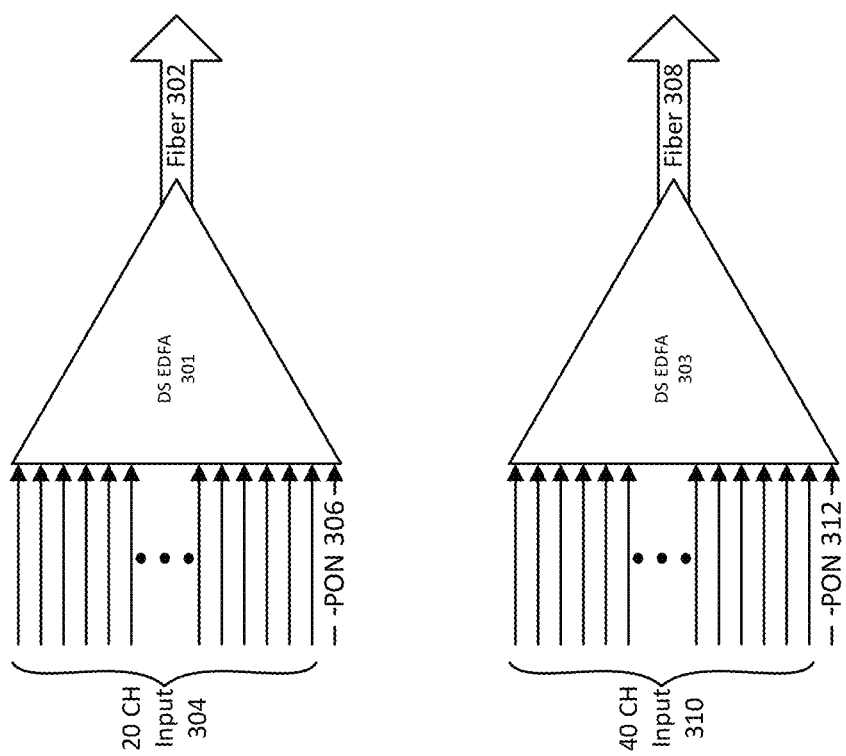
FIG. 3 depicts optical amplifiers, in accordance with the disclosure.

FIG. 3 depicts optical amplifiers, in accordance with the disclosure. In one embodiment, there may be a downstream erbium doped fiber amplifier (DS EDFA) that amplifies one or more downstream optical data signals (e.g., 20 channel (CH) input 304) each of which has a unique wavelength and outputs one or more amplified downstream optical data signals (i.e., DS EDFA 301). DS EDFA 301 may output the one or more amplified downstream optical data signals onto a fiber (i.e., fiber 302). DS EDFA 301 may also amplify a PON optical data signal (i.e., PON 306) and output the one or more amplified downstream optical data signals, in combination with the PON optical data signal, onto fiber 302. DS EDFA 301 may have an input power of 23 dBm, a gain of 15 dB, and output power of 20 dBm. In one embodiment, DS EDFA 301 may output the one or more amplified downstream optical data signals onto the fiber with a power of 17.2 dBm. DS EDFA 301 may have a gain range of 8-20 dB.

In other embodiments, there may be a downstream erbium doped fiber amplifier (DS EDFA) that amplifies one or more downstream optical data signals (e.g., 40 channel (CH) input 310) each of which has a unique wavelength and outputs one or more amplified downstream optical data signals (i.e., DS EDFA 303). DS EDFA 303 may output the one or more amplified downstream optical data signals onto a fiber (i.e., fiber 308). DS EDFA 303 may also amplify a PON optical data signal (i.e., PON 312) and output the one or more amplified downstream optical data signals, in combination with the PON optical data signal, onto fiber 308. DS EDFA 303 may have an input power of 24 dBm, a gain of 15.5 dB, and output power of 23.5 dBm. In one embodiment, DS EDFA 303 may output the one or more amplified downstream optical data signals onto the fiber with a power of 20.3 dBm. DS EDFA 303 may have a gain range of 10-22 dB.

Figure 4:
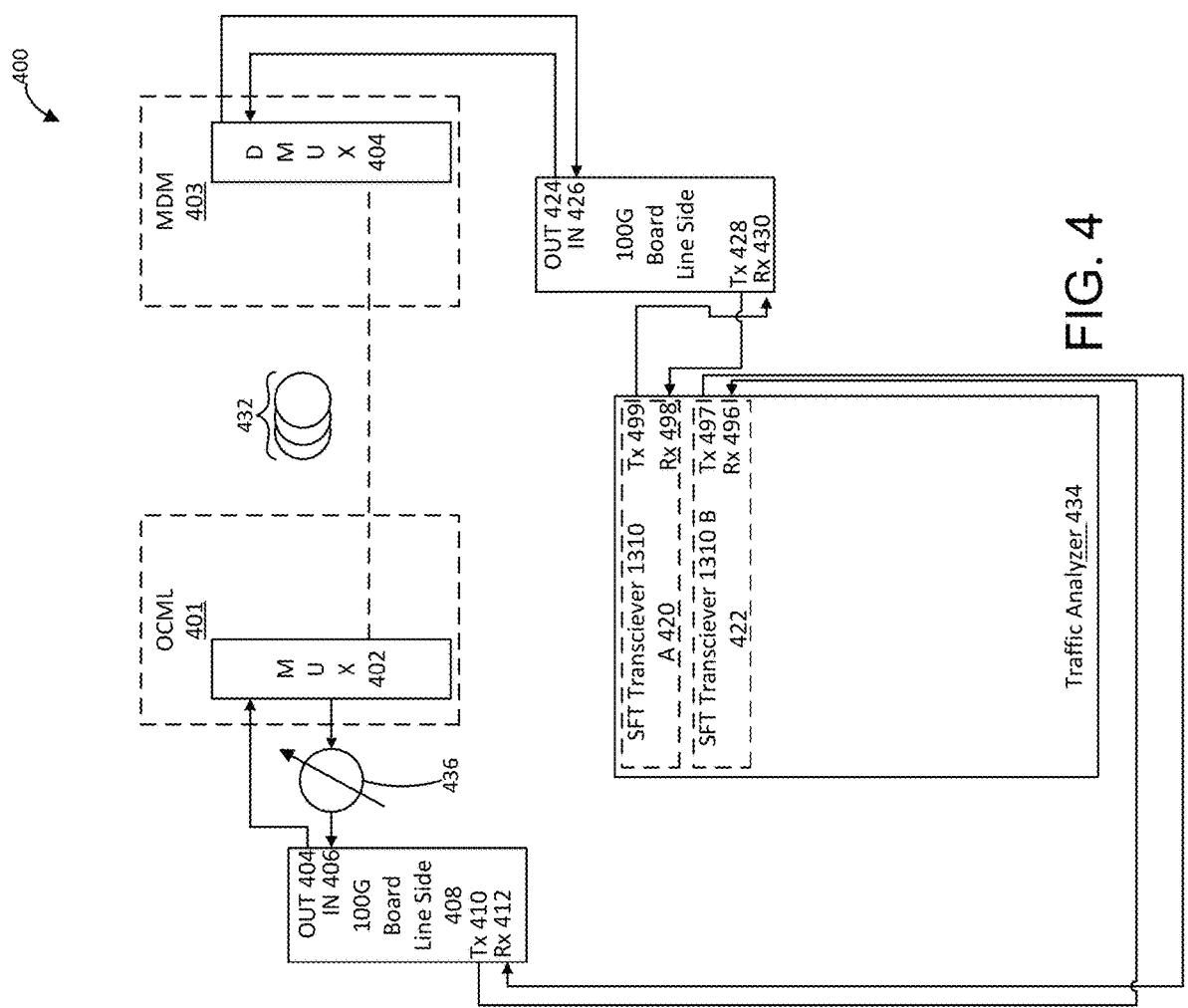
FIG. 4 depicts an access network diagram for monitoring network performance of a 40 channel optical communications module link (40 CH OCML) headend and multiplexer-demultiplexer (MDM), in accordance with the disclosure.

FIG. 4 depicts an access network diagram for monitoring network performance of a 40 channel optical communications module link (40 CH OCML) headend and multiplexer-demultiplexer (MDM), in accordance with the disclosure. OCML network 400 may comprise OCML headend 401, optical fibers 432, MDM 403, variable optical amplifier (VOA) (VOA 436), 100 G Line Side Board 408, 100 G Line Side Board 420, and Traffic Analyzer 434. OCML headend 401 may accommodate 96 channels. MDM 403 may accommodate 48 channels or 96 channels. There may be a 0.5 decibel power penalty (drop in power when an optical data signal is sent from OCML headend 401 to MDM 403 and/or when an optical data signal is sent from MDM 403 to OCML headend 401).

SFT Transceiver 1310 A 420 may comprise a transmitter (i.e., Tx 499) and a receiver (i.e., Rx 498). Tx 499 may transmit an optical data signal to Rx 430 in 100 G Line Side Board 420. Rx 430 may be a receiver that receives optical data signals from Tx 499. 100 G Line Side Board 420 may transmit an optical data signal to DMUX 404 out of interface OUT 424. This optical data signal may be an optical data signal that is used to analyze a loss or distortion in power (power penalty) of the optical data signal when it is transmitted from MDM 403 to OCML Headend 401. This optical data signal may be received my MUX 402 and MUX 402 may transmit the optical data signal to VOA 436. VOA 436 may amplify the optical data signal and transmit the optical data signal to interface IN 406 in 100 G Line Side Board 408. 100 G Line Side Board 408 may transmit the optical data signal out Tx 410 to SFT Transceiver 1310 B 422 via Rx 496. There may be one or more processors in Traffic Analyzer 434 that may compare the received optical data signal to the optical data signal transmitted from SFT Transceiver 1310 A 420 corresponding to the received optical data signal. The comparison may determine that there is a penalty factor of approximately 0.5 dB.

SFT Transceiver 1310 B 422 may comprise a transmitter (i.e., Tx 497) and a receiver (i.e., Rx 496). Tx 497 may transmit an optical data signal to Rx 412 in 100 G Line Side Board 408. Rx 412 may be a receiver that receives optical data signals from Tx 497. 100 G Line Side Board 408 may transmit an optical data signal to MUX 402 out of interface OUT 494. This optical data signal may be an optical data signal that is used to analyze a loss or distortion in power (power penalty) of the optical data signal when it is transmitted from OCML Headend 401 to MDM 403. This optical data signal may be received my DMUX 404 and DMUX 404 may transmit the optical data signal to IN 426 in 100 G Line Side Board 420. 100 G Line Side Board 420 may transmit the optical data signal out Tx 428 to SFT Transceiver 1310 A 420 via Rx 498. There may be one or more processors in Traffic Analyzer 434 that may compare the received optical data signal to the optical data signal transmitted from SFT Transceiver 1310 B 422 corresponding to the received optical data signal. The comparison may determine that there is a penalty factor of approximately 0.5 dB.

Figure 5:
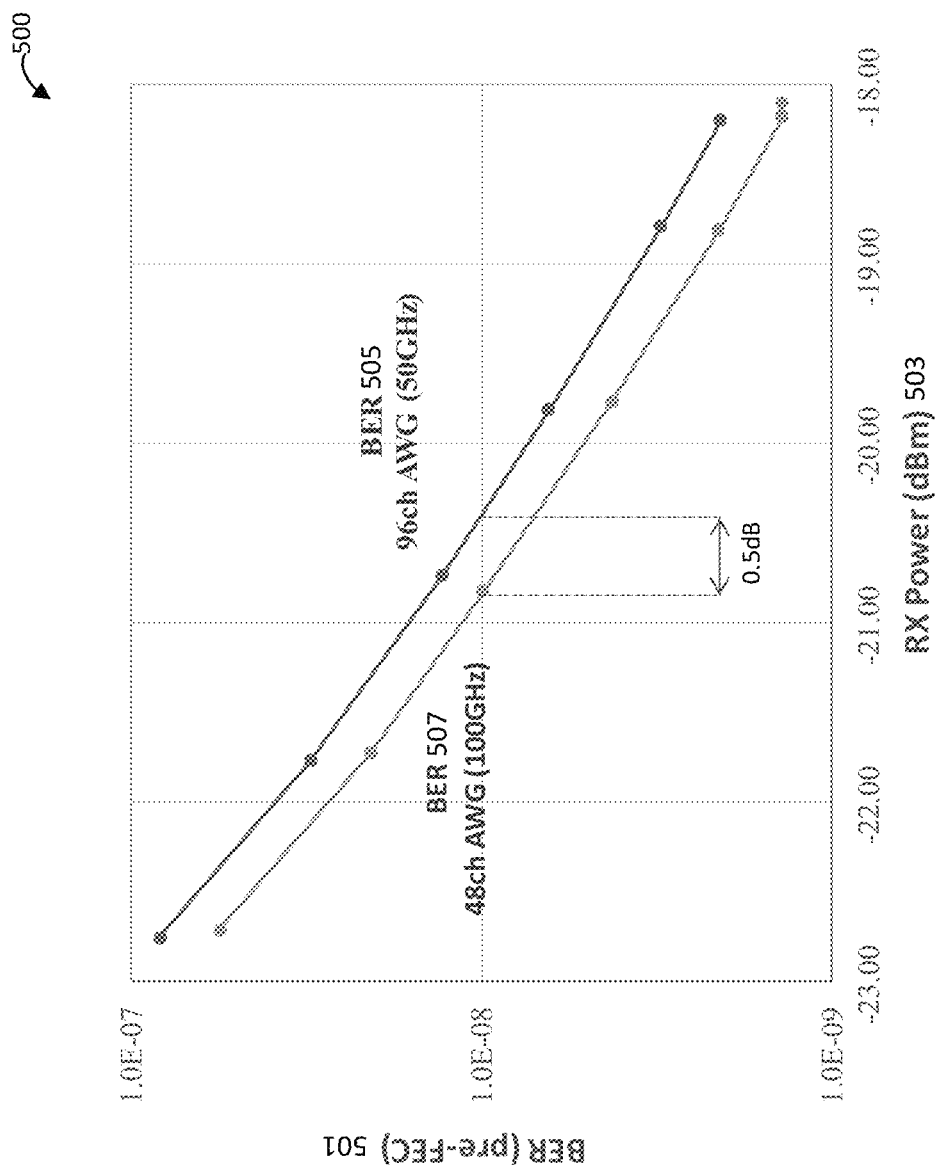
FIG. 5 depicts an illustrative diagram of a relationship between received (RX) power at a multiplexer or demultiplexer and a bit error rate (BER) of an optical data signal received at the multiplexer or demultiplexer, in accordance with the disclosure.

FIG. 5 depicts an illustrative schematic diagram of a relationship between received (RX) power at a multiplexer or demultiplexer and a bit error rate (BER) of an optical data signal received at the multiplexer or demultiplexer, in accordance with the disclosure. The 40 CH OCML may be implemented using a 96 channel AWG. In particular, 80 channels (40 downstream channels and 40 upstream channels) of the 96 channels in the 96 channel AWG may be used to transmit downstream optical data signals to an MDM and receive upstream optical data signals from the MDM. Accordingly, the 40 CH OCML may not use 16 of the 96 channels in the 96 channel AWG. There may be a separation of 50 GHz between each of the channels in the 40 CH OCML. In some embodiments, a 48 channel AWG may be used to implement a 20 CH OCML, and there may be a separation of 100 GHz between each of the channels in the 20 CH OCML.

Bit error rate graph 500 illustrates a relationship between the bit error rate without forward error correction (i.e., BER (pre-FEC) 501) and the power received (i.e., RX Power (dBm) 503) at an AWG. It should be noted that both the OCML and MDM comprise an AWG, and that the relationship between BER (pre-FEC) 501 and RX Power (dBm) 503 applies to the AWG in either the OCML or MDM. As RX Power (dBm) 503 increases in value, BER (pre-FEC) 501 may decrease in value. In other words, a greater received power at a transceiver in the AWG decreases the probability with which a binary digit (bit) will be incorrectly detected (e.g., a bit value of "1" is incorrectly detected as a bit value of "0").

Bit error rate (BER) 505 is a curve illustrating the relationship between a bit error rate (BER) and the received power, in dBm, of a 96 channel AWG. Bit error rate (BER) 507 is a curve illustrating the relationship between a bit error rate (BER) and the received power, in dBm, of a 48 channel AWG. BER 507 may have a RX Power (dBm) 503 value of −20.75 dBm and BER (pre-FEC) 501 value of $1.0E^{-8}$. BER 505 may have a RX Power (dBm) 503 value of −20.37 dBm and BER (pre-FEC) 501 value of $1.0E^{-8}$. RX Power (dBm) 503 for BER 505 is 0.5 dBm greater than RX Power (dBm) for BER 507. Thus, a 40 CH OCML, which has a greater capacity than a 20 CH OCML, will only incur a 0.5 dBm penalty in order to achieve the same BER (pre-FEC) 501 value of a 20 CH OCML. That is, the transceivers in the AWG of the 40 CH OCML will only be required to detect a binary digit at a dBm value that is 0.5 dBm greater than that of the transceivers in the AWG of the 20 CH OCML.

Figure 6:
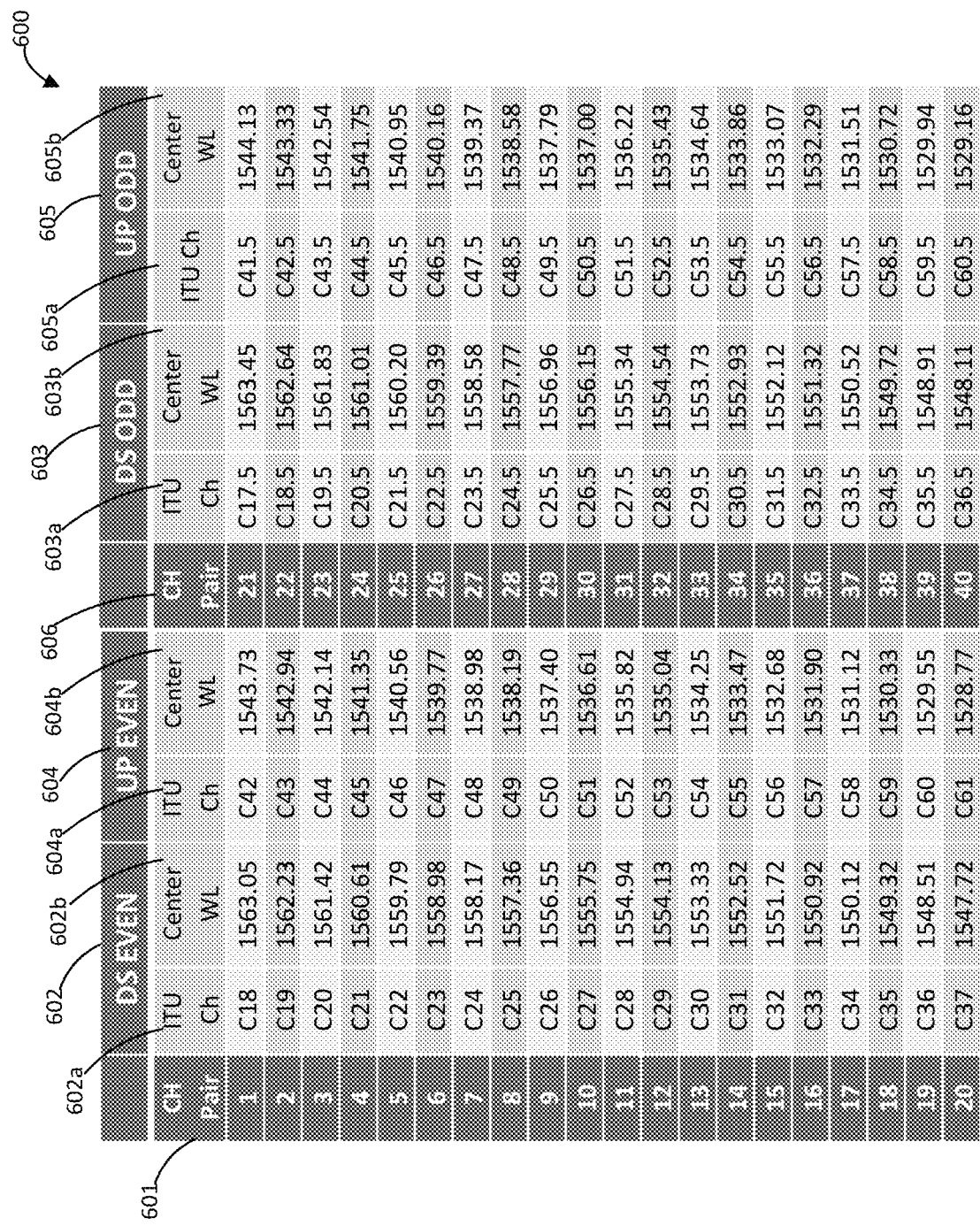
FIG. 6 depicts an illustrative diagram of even and odd downstream channels and even and odd upstream channels, in accordance with the disclosure.

FIG. 6 depicts an illustrative diagram of even and odd downstream channels and even and odd upstream channels, in accordance with the disclosure. Channel pair grid 600 may comprise even channel pairs (CH Pair 601) divided into even downstream channels (DS EVEN 602), and even upstream channels (US EVEN 604). Channel pair grid 600 may also comprise odd channel pairs (CH 606) divided into odd downstream channels (DS ODD 603), and odd upstream channel pairs (UP ODD 605). DS EVEN 602 may have an International Telecommunication Union (ITU) channel (i.e., ITU Ch 602a) and a center wavelength (i.e., Center WL 602b) associated with even downstream optical data signals sent from the 40 CH OCML to the MDM, for each CH Pair 601. UP EVEN 604 may have an ITU channel (i.e., ITU Ch 604a) and a center wavelength (i.e., Center WL 604b) associated with even upstream optical data signals received at the 40 CH OCML from the MDM, for each CH Pair 601. DS ODD 603 may have an ITU channel (i.e., ITU Ch 603a) and a center wavelength (i.e., Center WL 603b) associated with odd downstream optical data signals sent from the 40 CH OCML to the MDM, for each Ch Pair 606. UP ODD 605 may have an ITU channel (i.e., ITU Ch 605a) and a center wavelength (i.e., Center WL 605b) associated with odd upstream optical data signals received at 40 CH OCML from the MDM, for each Ch Pair 606.

CH Pair 601 may comprise twenty channel pairs. Each channel in the channel pair may be separated by twenty-four channels. For example, when CH Pair 601 is equal to four, ITU Ch 602a is C21 and ITU Ch 604a is C45. The number of channels between ITU Ch 604a and ITU Ch 602a, when CH Pair 601 is equal to four is twenty-four channels. There may be twenty-four channels between each DS EVEN 602 ITU channel and each US EVEN 604 ITU channel. That is for each Ch Pair 601, there may be twenty-four channels between ITU Ch 602a and ITU Ch 604a. When CH Pair 606 is equal to twenty-four, ITU Ch 603a is equal to C20.5 and ITU Ch 605a is C44.5. The number of channels between ITU Ch 603a and ITU Ch 605a, when CH Pair 606 is equal to twenty four is twenty-four channels. There may be twenty-four channels between each DS ODD 603 ITU channel and each US ODD 605 ITU channel. That is for each Ch Pair 606, there may be twenty-four channels between ITU Ch 603a and ITU Ch 605a.

The optical data signals associated with CH Pair 601 may oscillate at a frequency of 100 GHz, and the optical data signals associated with CH Pair 606 may oscillate at a frequency of 50 GHz. 50 GHz and 100 GHz optical data signals may be referred to as odd and even optical data signals respectively.

Figure 7:
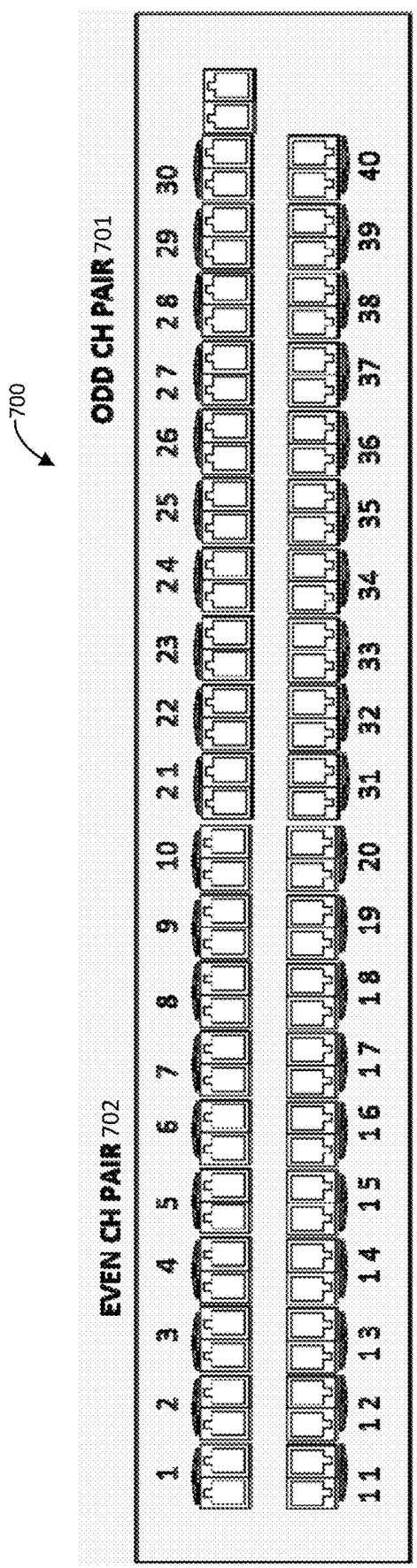
FIG. 7 depicts and illustrative diagram of even and odd downstream channel transponders and even and odd upstream channel transponders, in accordance with the disclosure.

FIG. 7 depicts and illustrative diagram of even and odd downstream channel transponders and even and odd upstream channel transponders, in accordance with the disclosure. 40 CH OCML 700 may comprise even ch pair 702 and odd ch pair 702. Even ch pair 702 may correspond to CH Pair 601. That is, even ch pair 702 values 1-20 correspond to CH pair 601 values 1-20. Odd ch pair 701 may correspond to CH Pair 606. That is, odd ch pair 701 values 21-40 may correspond to CH Pair 606 values 21-40. Each of even ch pair 702 may correspond to inputs to transponders in 40 CH OCML 700 associated with optical data signals oscillating at 100 GHz. Each of odd ch pair 701 may correspond to inputs to transponders in 40 CH OCML 70 associated with optical data signals oscillating at 50 GHz.

Figure 8:
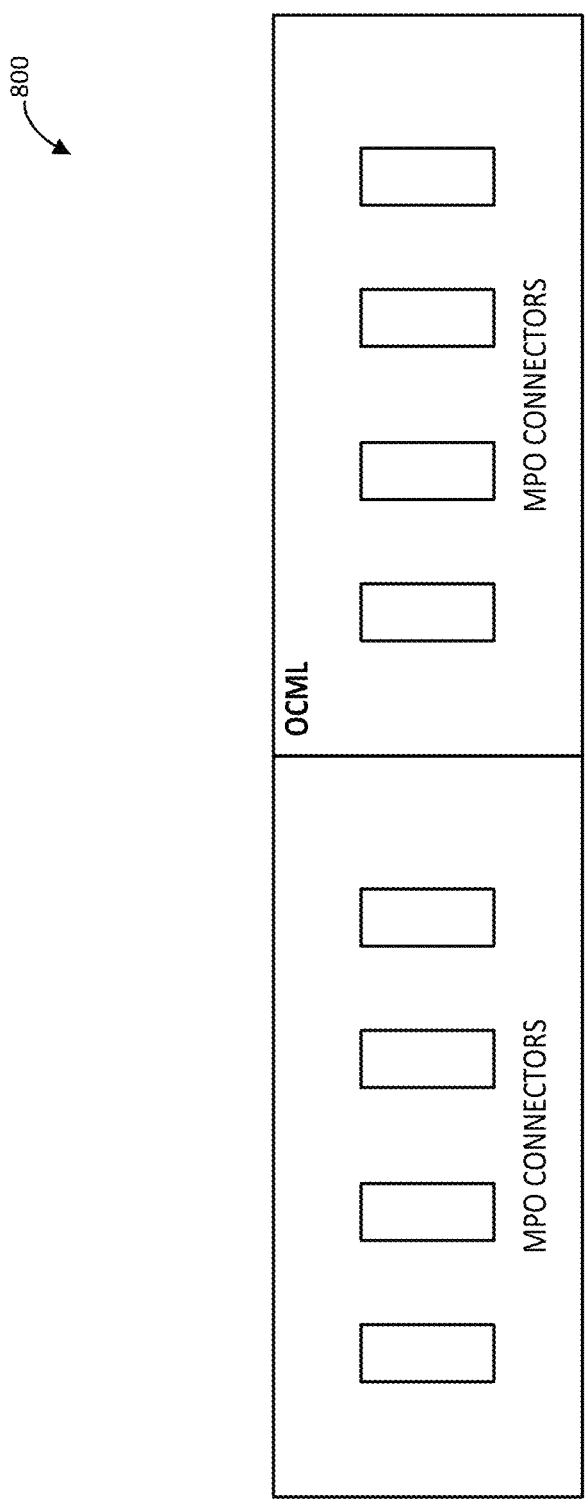
FIG. 8 depicts an multi-fiber push on (MPO) connector, in accordance with the disclosure.

FIG. 8 depicts an multi-fiber push on connector, in accordance with the disclosure. OCML 800 may include a first set of multi-fiber push on (MPO) connectors (i.e., MPO connectors 802) and a second set of MPO connectors (i.e., MPO connectors 804). MPO connectors 802 may be MPO connectors that connect cabling from a client-layer optical network to the OCML headend carrying odd downstream channels and/or odd upstream channels. MPO connectors 804 may be MPO connectors that connect cabling from a client-layer optical network to the OCML headend carrying even downstream channels and/or even upstream channels.

FIG. 9A depicts an access network diagram of a 40 CH OCML headend, in accordance with the disclosure. FIG. 9A depicts an access network diagram of a 40 CH OCML headend comprising WDMs, a DWDM, optical amplifiers, and dispersion control modules (DCMs), in accordance with the disclosure. FIG. 9A shows a schematic of an OCML headend according to at least one embodiment of the disclosure. As shown in FIG. 9A, headend 901 is a smart integrated OCML headend, which is a circuit, comprising a DWDM (e.g., DWDM 905), a first WDM (e.g., WDM 913), a second WDM (e.g., WDM 919), a third WDM (e.g., WDM 923), a GPON/EPON connector (e.g., GPON/EPON 924), a booster amplifier BOA (e.g., BOA 916), an optical preamplifier (OPA) (e.g., OPA 942), a variable optical attenuator (VOA) (e.g., VOA 921), an optical switch 926 to feed a primary optical fiber (e.g., Primary Fiber 930) or secondary (backup) optical fiber (e.g., Secondary Fiber 931), and a dispersion control module (DCM) (e.g., DCM 908). DWDM 905 may be a 96 channel AWG, and WDM 913, WDM 919, and WDM 923 may be similar in functionality to WDM 108.

The disclosure provides a method of transporting multiple 10 G NRZ, coherent 100 GbE, 200 GbE, and/or 400 GbE and GPON/EPON signals on the same optical fiber over extended links of up to 60 kms without a cable company having to put optical amplifiers between the cable's Master Terminal Center (MTC) facility and a field hub or outside plant. The MTC facility may be an inside plant facility where a cable company acquires and combines services to be offered to customers. The MTC facility provides these combined services to customers, by transmitting and receiving optical signals over a plurality of optical fibers to a field hub or outside plant which connects the plurality of optical fibers to a customer's premise. The OCML headend may be located in a secondary terminal center (STC) that connects the MTC facility to a field hub or outside plant housing a multiplexer-demultiplexer (MDM) (e.g., MDM 208 in FIG. 2).

The EPON signals may operate with the same optical frequencies as GPON and time division multiple access (TDMA). The raw line data rate is 1.25 Gbits/s in both the downstream and upstream directions. EPON is fully compatible with other Ethernet standards, so no conversion or encapsulation is necessary when connecting to Ethernet-based networks on either end. The same Ethernet frame is used with a payload of up to 1518 bytes. EPON may not use a carrier sense multiple access (CSMA)/collision detection (CD) access method used in other versions of Ethernet. There is a 10-Gbit/s Ethernet version designated as 802.3av. The line rate may be 10.3125 Gbits/s. The primary mode is 10 Gbits/s upstream as well as downstream. A variation uses 10 Gbits/s downstream and 1 Gbit/s upstream. The 10-Gbit/s versions use different optical wavelengths on the fiber, 1575 to 1591 nm downstream and 1260 to 1280 nm upstream so the 10-Gbit/s system can be wavelength multiplexed on the same fiber as a standard 1-Gbit/s system.

In one aspect, headend 901 may comprise 40 10 G NRZ downstream (DS) transponders (e.g., 40×10 G DS 903) and 40 10 G NRZ upstream (UP) transponders (e.g., 40×10 G UP 904). 40×10 G DS 903 may transmit downstream data over twenty 10 G NRZ wavelengths. 40×10 G UP 904 may receive upstream data over twenty 10 G NRZ wavelengths.

The operation of headend 901 may be described by way of the processing of downstream optical data signals transmitted from headend 901 to a field hub or outside plant, and the processing of upstream optical data signals received from the field hub or outside plant. Each of the transponders of 40×10 G DS 903 may receive a SONET/SDH optical data signal from a MTC and each of the transponders may convert the SONET/SDH optical data signal into an electrical signal. More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 40×10 G DS 903 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 40×10 G DS 903 may generate twenty corresponding second optical data signals each of which has a unique wavelength.

DWDM 905 may receive the twenty corresponding second optical data signals as an input and output a multi-wavelength downstream optical data signal (e.g., 10 G DS 907) comprising the twenty corresponding second optical data signals onto a fiber. The multi-wavelength downstream optical data signal 10 G DS 907 may be a coherent 10 G NRZ optical data signal. More specifically, DWDM 905 may multiplex the twenty corresponding second optical data signals onto the fiber, wherein the twenty multiplexed corresponding second optical data signals compose the multi-wavelength downstream optical data signal. The multi-wavelength optical data signal may have a wavelength comprising the twenty wavelengths of the twenty corresponding second optical data signals.

The multi-wavelength downstream optical data signal 10 G DS 907, may be input to DCM 908. 10 G DS 907 may be input into DCM 908 to compensate for dispersion that 10 G DS 907 may experience after being amplified by BOA 916 and multiplexed by WDM 923, with other optical data signals, that are downstream from the DCM. The amplified and multiplexed optical data signal may be referred to as an egress optical data signal, as it is the optical data signal that may be transmitted out of headend 901 over a fiber connecting headend 901 to a field hub or outside plant. In some embodiments, DCM 908 may be configured to balance positive and/or negative dispersion that may be introduced to the egress optical data signal by the fiber. In some embodiments, DCM 908 may be configured to compensate for positive (temporal broadening of the egress optical data signal) and/or negative (temporal contraction of the egress optical data signal) dispersion introduced by fiber that is 80 km or greater in length, to reduce the sensitivity or OSNR levels of a transceiver in a DWDM located at a field hub or outside plant. More specifically, DCM 908 may be configured to reduce the sensitivity or OSNR level requirement in a photodetector or fiber-optic sensor in the transceiver, which may drastically reduce the cost of the transceivers used in the DWDM located at the field hub or outside plant. DCM 908 may output a dispersion controlled version of 10 G DS 907 as 10 G DS 910.

WDM 913 may be a three port circulator, that receives multi-wavelength downstream optical data signal 10 G DS 910 on port 911, and outputs multi-wavelength downstream optical data signal 10 G DS 910, on port 914 as multi-wavelength downstream optical data signal 10 G DS 915 to BOA 916.

BOA 916 may have a gain that is based at least in part on a distance that a downstream signal has to travel. For example, the gain may be a function of a fiber attenuation coefficient α, which is a measure of the intensity of the attenuation of a beam of light as it traverses a length of an optical fiber segment. The unit of measurement of the fiber attenuation coefficient is decibels (dB) per km (dB/km). For instance, BOA 916 may be adjusted based at least in part on the attenuation coefficient and length of fiber that the egress optical data signal will travel. More specifically, the gain BOA 916 may be $G=e^{(2\alpha L)}$, where α is the fiber attenuation coefficient, as explained above, and L is the length of the fiber (e.g., the length of primary fiber 930 and/or the length of secondary fiber 931). Multi-wavelength downstream optical data signal 10 G DS 915 may be amplified by BOA 916, and BOA 916 may output multi-wavelength downstream optical data signal 10 G DS 917 to port 918 of WDM 919. WDM 919 outputs a multi-wavelength downstream optical data signal (e.g., multi-wavelength downstream optical data signal 10 G DS 940) from port 920, which may be substantially the same as multi-wavelength downstream optical data signal 10 G DS 917. Multi-wavelength downstream optical data signal 10 G DS 940 may be input to variable optical amplifier (VOA) 921.

VOA 921 may be used to reduce the power levels of Multi-wavelength downstream optical data signal 10 G DS 940. The power reduction may done by absorption, reflection, diffusion, scattering, deflection, diffraction, and dispersion, of Multi-wavelength downstream optical data signal 10 G DS 940. VOA 921 typically have a working wavelength range in which they absorb all light energy equally. In some embodiments VOA 921 utilize a length of high-loss optical fiber, that operates upon its input optical signal power level in such a way that its output signal power level is less than the input level. For example, multi-wavelength downstream optical data signal 10 G DS 940 may have an input power level to VOA 921 that may be greater than the output power level of multi-wavelength downstream optical data signal 10 G DS 939.

The variability of the output power level of VOA 921 may be achieved using a fiber coupler, where some of the power is not sent to the port that outputs, but to another port. Another possibility is to exploit variable coupling losses, which are influenced by variable positioning of a fiber end. For example, the transverse position of the output fiber or the width of an air gap between two fibers may be varied, obtaining a variable loss without a strong wavelength dependence. This principle may be used for single-mode fibers. VOA 911 may be based on some piece of doped fiber, exhibiting absorption within a certain wavelength range.

WDM 923 may multiplex multi-wavelength downstream optical data signal 10 G DS 939 and one or more EPON, and/or GPON optical data signals. The EPON and/or GPON optical data signals may be received on a GPON/EPON connector (e.g., GPON/EPON 924) from PON port 902. The resulting multiplexed optical data signal may be referred to as egress optical data signal 935.

Egress optical data signal 935 may be output by WDM 923 and optical switch 926 may switch egress optical data signal 935 onto connector 927 or connector 934 depending on the position of switch 926. In some embodiments, connector 927 may be a primary connector and connector 934 may be a secondary connector or a backup connector. Wavelength monitoring connector 928 may connect connector 927 to a first port of wavelength-monitoring ports 944, and wavelength monitoring connector 933 may connect connector 934 to a second port of wavelength-monitoring ports 944. Wavelength-monitoring ports 944 may monitor the wavelengths in egress optical data signal 935 via connector 927 or connector 934 depending on the position of switch 926. Egress optical data signal 935 may exit headend 901 via connector 927 connected to primary fiber 930, and may be received on a first connector in the field hub or outside plant. Egress optical data signal 935 may exit headend 901 via connector 934 connected to secondary fiber 931, and may be received on a second connector in the field hub or outside plant. The field hub or outside plant may include a MDM with the first connector and the second connector.

The operation of headend 901 may be described by way of the processing of upstream optical data signals received at headend 901 from a field hub or outside plant. For instance, a multi-wavelength ingress optical data signal, comprising one or more of a 10 G NRZ, coherent 100 GbE, 200 GbE, and/or 400 GbE optical data signal, EPON optical data signal, and/or GPON optical data signal or a 10 GEPN·XGPON may be an upstream optical data signal received on primary fiber 930 or secondary fiber 931 depending on the position of switch 926.

Multi-wavelength ingress optical data signal 936 may traverse connector 927 and switch 926, before entering WDM 923 via port 937 if switch 926 is connected to connector 927. Multi-wavelength ingress optical data signal 936 may traverse connector 934 and switch 926, before entering WDM 923 via port 937 if switch 926 is connected to connector 927. WDM 923 may demultiplex one or more 10 G NRZ, coherent 100 GbE, 200 GbE, and/or 400 GbE optical data signals, EPON optical data signals, and/or GPON optical data signals from multi-wavelength ingress optical data signal 936. WDM 923 may transmit the one or more EPON and/or GPON optical data signals along GPON/EPON 924 to PON connector 902 via port 925. WDM 923 may transmit the one or more 10 G optical data signals (e.g., 10 G UP 941) out of port 938 to OPA 942.

The one or more 10 G NRZ optical data signals 10 G UP 941 may be received by OPA 942. The one or more optical data signals 10 G NRZ, coherent 100 GbE, 200 GbE, and/or 400 GbE UP 941 may comprise 10 G NRZ, coherent 100 GbE, 200 GbE, and/or 400 GbE optical data signals. A gain associated OPA 942 may be based at least in part on a distance that 10 G NRZ, coherent 100 GbE, 200 GbE, and/or 400 GbE optical data signals have to travel, similar to that of BOA 916. The one or more optical data signals 10 G NRZ, coherent 100 GbE, 200 GbE, and/or 400 GbE UP 941 may be amplified by OPA 942, and OPA 942 may output multi-wavelength upstream optical data signal 943 to WDM 913.

WDM 913 may receive the multi-wavelength upstream optical data signal 943 on port 912, and may output one or more optical data signals 10 G UP 909 to DCM 908. DCM 908 may perform one or more operations on one or more optical data signals 10 G UP 909 to compensate for any dispersion that may have been introduced by circuit components (e.g., WDM 913, OPA 942, or WDM 923) or imperfections or issues with an optical fiber (e.g., primary fiber 930 or secondary fiber 931). DCM 908 may output one or more optical data signals 10 G UP 906 to DWDM 905. The one or more optical data signals 10 G NRZ, coherent 100 GbE, 200 GbE, and/or 400 GbE UP 909 are substantially the same as multi-wavelength upstream optical data signal 943. WDM 913 may function as a circulator when receiving multi-wavelength upstream optical data signal 943 on port 912. The one or more optical data signals 10 G UP 906 may be received by DWDM 905.

The one or more optical data signals 10 G UP 906 may comprise 10 G NRZ optical data signals. DWDM 905 may demultiplex the one or more optical data signals 10 G UP 906 into individual optical data signals in accordance with the individual wavelengths of the one or more optical data signals 10 G UP 906. More specifically, the one or more optical data signals 10 G UP 906 may be demultiplexed into twenty 10 G NRZ optical data signals, each of which may have a unique wavelength. DWDM 905 may output each of the forty 10 G NRZ optical data signals to each of the transponders of 40×10 G UP 904. Each of the transponders of 40×10 G NRZ 904 may convert a received corresponding 10 G NRZ optical data signal, of the 10 G NRZ optical data signals, into a corresponding electrical signal. More specifically, a first transceiver in each of the transponders may convert one of the forty 10 G NRZ optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the forty corresponding SONET/SDH optical data signals may have the same wavelength. In other embodiments, each of the forty corresponding SONET/SDH optical data signals may have unique wavelengths. The forty transponders of 40×10 G UP 904 may transmit the forty SONET/SDH optical data signals to the MTC on the SONET/SDH optical network connection.

Figure 9B:
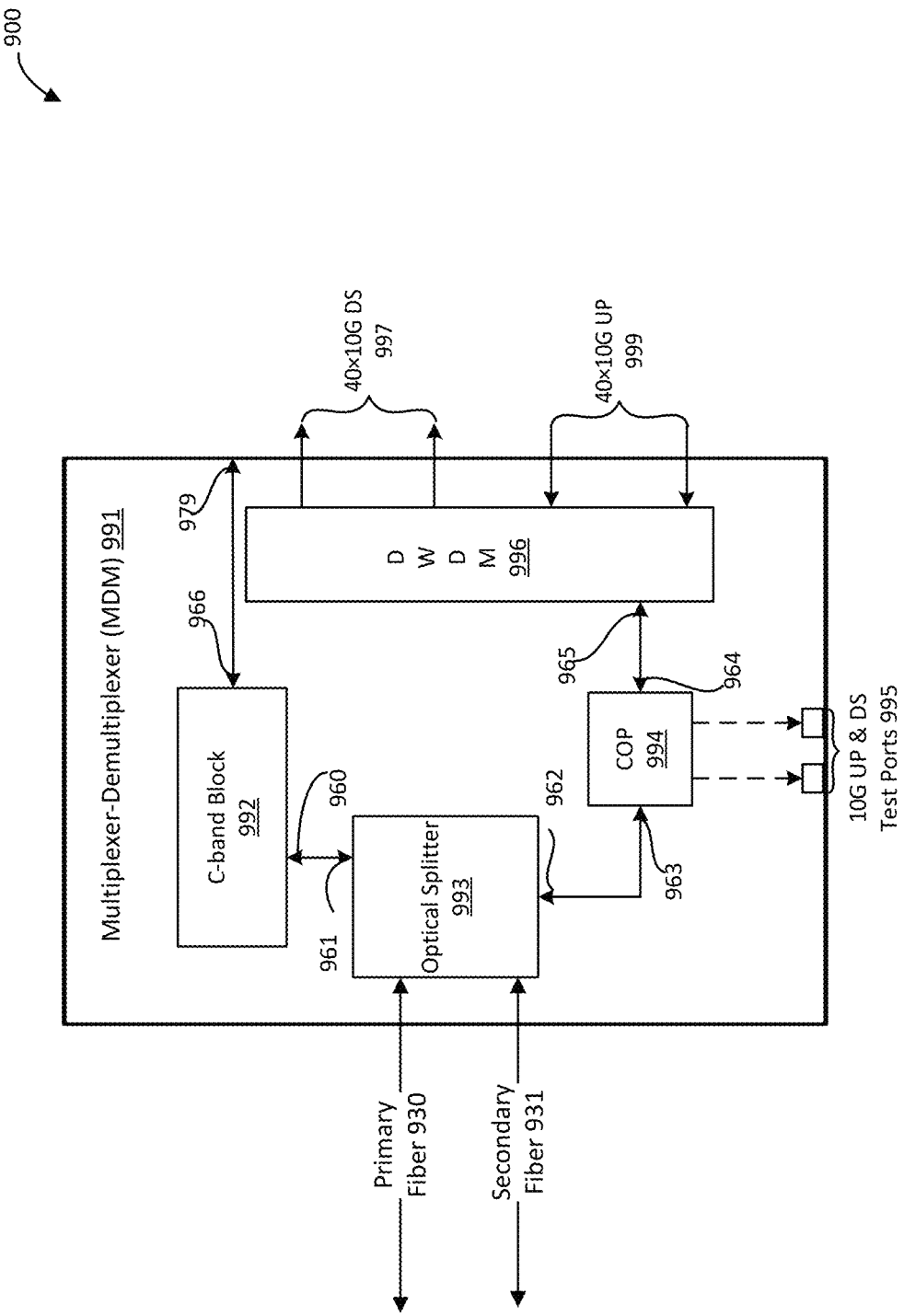
FIG. 9B depicts an access network diagram of an MDM, in accordance with the disclosure.

FIG. 9B depicts an access network diagram of an MDM, in accordance with the disclosure. Egress optical data signal 935 may be output by WDM 923 and optical switch 926 may switch egress optical data signal 935 onto connector 927 or connector 934 depending on the position of switch 926. In some embodiments, connector 927 may be a primary connector and connector 934 may be a secondary connector or a backup connector. Wavelength monitoring connector 928 may connect connector 927 to a first port of wavelength-monitoring ports 944, and wavelength monitoring connector 933 may connect connector 934 to a second port of wavelength-monitoring ports 944. Wavelength-monitoring ports 944 may monitor the wavelengths in egress optical data signal 935 via connector 927 or connector 934 depending on the position of switch 926. Egress optical data signal 935 may exit headend 901 via connector 927 connected to primary fiber 930, and may be received on a first connector in the field hub or outside plant. Egress optical data signal 935 may exit headend 901 via connector 934 connected to secondary fiber 931, and may be received on a second connector in the field hub or outside plant. The field hub or outside plant may include a MDM with the first connector and the second connector.

Egress optical data signal 935 may be received at optical splitter 993 as an ingress optical data signal. Optical splitter 993 may also be referred to as a beam splitter, and may comprise one or more quartz substrates of an integrated waveguide optical power distribution device. Optical splitter 993 may be a passive optical network device. It may be an optical fiber tandem device comprising one or more input terminals and one or more output terminals. Optical splitter 939 may be Fused Biconical Taper (FBT) splitter or Planar Lightwave Circuit (PLC) splitter. Optical splitter 993 may be a balanced splitter wherein optical splitter 993 comprises two input fibers and one or more output fibers over which the ingress optical data signal may be spread proportionally. In some embodiments, the ingress optical data signal may not be spread proportionally across the output fibers of optical splitter 993. In some embodiments, optical splitter 993 may comprise two input fibers and two output fibers. A first input fiber of optical splitter 993 may be connected to primary fiber 930 and a second input fiber of optical splitter 933 may be connected to secondary fiber 931.

A first output fiber of optical splitter 993 may be connected to a filter (e.g., C-band block 992) that filters out packets of light, in the ingress optical data signal, with wavelengths between 1530 nm and 1565 nm. This range of wavelengths may coincide with a C-band of wavelengths. In some other embodiments, the filter may filter out packets of light with wavelengths not inclusive of the wavelengths between 1260 nm and 1520 nm and not inclusive of wavelengths between 1570 nm and 1660 nm. The packets of light with wavelengths inclusive of the wavelengths between 1260 nm and 1520 nm and inclusive of wavelengths between 1570 nm and 1660 nm, may correspond to the wavelengths of the packets of light carrying the one or more EPON and/or GPON optical data signals transmitted along GPON/EPON 924. More specifically, optical splitter 993, may receive one or more downstream EPON and/or GPON optical data signals 960, in the ingress optical data signal, that corresponds to the one or more EPON and/or GPON optical data signals transmitted along GPON/EPON 924. In some embodiments, the one or more downstream EPON and/or GPON optical data signals 960 may have the same wavelength as GPON DS 806. Optical splitter 993 may output the one or more downstream EPON and/or GPON optical data signals 960, received in the ingress optical data signal, to C-band block 992.

C-band block 992 may output one or more downstream EPON and/or GPON optical data signals 979 corresponding to the one or more downstream EPON and/or GPON optical data signals 960 with wavelengths between 1260 nm and 1520 nm and wavelengths between 1570 nm and 1660 nm. The C-band block 992 may transmit the one or more downstream EPON and/or GPON optical data signals 979 to an express port (not shown in FIG. 9) collocated with, or attached to MDM 991. In some embodiments, the express port may be located within the MDM 991.

A second output fiber of optical splitter 993 may be connected to COP 994. COP 994 may be a PON device that monitors the coupled optical power between Optical Splitter 993 and DWDM 996. In some embodiments, the coupled optical power may be a percentage value. For instance, the coupled optical power may be 1%. Optical splitter 993, may receive one or more downstream 10 G NRZ optical data signals, in the ingress optical data signal, that corresponds to 10 G DS 939. In some embodiments, the one or more downstream 10 G NRZ, coherent 100 GbE, 200 GbE, and/or 400 GbE optical data signals may have a wavelength between 1530 nm and 1565 nm. Optical splitter 993 may output the one or more downstream 10 G optical data signals 963, received in the ingress optical data signal, to COP 994. COP 994 may output a first percentage of the one or more downstream 10 G optical data signals 963 to 10 G NRZ, coherent 100 GbE, 200 GbE, and/or 400 GbE upstream and downstream test ports (e.g., 10 G NRZ, coherent 100 GbE, 200 GbE, and/or 400 GbE UP & DS Test Ports 995). The first percentage may be a percentage of the one or more downstream 10 G optical data signals 963 tested by the 10 G NRZ, coherent 100 GbE, 200 GbE, and/or 400 GbE upstream and downstream test ports. The first percentage of the one or more downstream 10 G optical data signals 963 may be a monitoring signal used by a spectrum analyzer to measure optical power levels of a specific wavelength. The first percentage of the one or more downstream 10 G optical data signals 963 may also be used by the spectrum analyzer to analyze certain characteristics of the wavelengths of the first percentage of the one or more downstream 10 G optical data signals 963. COP 994 may output a second percentage of the one or more downstream 10 G optical data signals 965 to DWDM 996.

Because the one or more downstream 10 G optical data signals 965 may be a multi-wavelength downstream optical data signal DWDM 996 may demultiplex the one or more downstream 10 G optical data signals 965 into individual optical data signals in accordance with the individual wavelengths of the one or more downstream 10 G optical data signals 965. More specifically, the one or more downstream 10 G optical data signals 965 may be demultiplexed into twenty 10 G NRZ, coherent 100 GbE, 200 GbE, and/or 400 GbE optical data signals, each of which may have a unique wavelength. DWDM 996 may output each of the forty 10 G NRZ optical data signals to each of the transponders of 40×10 G DS 997. Each of the transponders of 40×10 G DS 997 may be in a transport chassis that is in a RPD (not shown) and may convert a received corresponding 10 G NRZ optical data signal, of the 10 G NRZ optical data signals, into a corresponding electrical signal. More specifically, a first transceiver in each of the transponders may convert one of the forty 10 G NRZ optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. In some embodiments, the transport chassis in the RPD may be similar in functionality to transport chassis 107. The RPD may convert the SONET/SDH optical data signals into an electrical signal that may be transmitted over one or more coaxial cables. MDM 991 may be similar in functionality to MDM 208 and may be connected to the RPD in a way similar to the connection between MDM 108 and transport chassis 107.

The operation of MDM 991 may be further described by way of the processing of an upstream optical data signal transmitted to headend 901. Each of the transponders of 40×10 G UP 999 may receive a SONET/SDH optical data signal and each of the transponders may convert the SONET/SDH optical data signal into an electrical signal. Each of the transponders of 40×10 G UP 999 may receive the SONET/SDH optical data signal from the transport chassis in the RPD. The transport chassis may also convert one or more electrical signals into the SONET/SDH optical data signal.

More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the forty transponders in 40×10 G UP 999 may each receive a SONET/SDH optical data signal, and each of the forty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 40×10 G UP 999 may generate twenty corresponding second optical data signals each of which has a unique wavelength.

DWDM 996 may receive forty corresponding second optical data signals as an input and output a multi-wavelength upstream optical data signal (e.g., multi-wavelength upstream optical data signal 964) comprising the forty corresponding second optical data signals. The multi-wavelength upstream optical data signal 964 may be a 10 G NRZ optical data signal. More specifically, DWDM 996 may multiplex the forty corresponding second optical data signals onto the fiber connecting DWDM 996 and COP 994, wherein the forty multiplexed corresponding second optical data signals compose the multi-wavelength downstream optical data signal. The multi-wavelength optical data signal may have a wavelength comprising the forty wavelengths of the forty corresponding second optical data signals.

The multi-wavelength upstream optical data signal 964, may be input to COP 994. COP 994 may output a first percentage of the multi-wavelength upstream optical data signal 964 to 10 G NRZ upstream and downstream test ports (e.g., 10 G UP & DS Test Ports 995). The first percentage may be a percentage of the multi-wavelength upstream optical data signal 964 tested by the 10 G NRZ, coherent 100 GbE, 200 GbE, and/or 400 GbE upstream and downstream test ports. The first percentage of the multi-wavelength upstream optical data signal 964 may be a monitoring signal used by a spectrum analyzer to measure optical power levels of a specific wavelength in the multi-wavelength upstream optical data signal 964. The first percentage of the multi-wavelength upstream optical data signal 964 may also be used by the spectrum analyzer to analyze certain characteristics of the wavelengths of the first percentage of the multi-wavelength upstream optical data signal 964. COP 994 may output a second percentage of the multi-wavelength upstream optical data signal 964 to optical splitter 993 as the multi-wavelength upstream optical data signal 962.

C-band block 992 may receive one or more upstream EPON and/or GPON optical data signals 966 from an express port (not shown in FIG. 9) collocated with, or attached to MDM 991. In some embodiments, the express port may be located within the MDM 991. C-band block 992 may filter out packets of light, in the one or more upstream EPON and/or GPON optical data signals 966, with wavelengths between 1530 nm and 1565 nm. Thus C-band block 992 may output one or more upstream EPON and/or GPON optical data signals 961 with wavelengths between 1260 nm and 1520 nm and wavelengths between 1570 nm and 1660 nm.

Optical splitter 993 may receive one or more upstream EPON and/or GPON optical data signals 961, and may also receive the multi-wavelength upstream optical data signal 962, and may multiplex the multi-wavelength one or more upstream EPON and/or GPON optical data signals 961 with the multi-wavelength upstream optical data signal 962. Optical splitter 993 outputs an egress optical data signal, which may be a multi-wavelength optical data signal comprising 10 G NRZ optical data signals corresponding to the multiplexed multi-wavelength one or more upstream EPON and/or GPON optical data signals 961 and multi-wavelength upstream optical data signal 962. Optical splitter 993 may output the egress optical data signal onto primary fiber 930 connecting the optical splitter 993 to port 929. Optical splitter 993 may also output the egress optical data signal onto secondary fiber 931 connecting the optical splitter 993 to port 932. The egress optical data signal may be received at headend 901 as multi-wavelength ingress optical data signal 936.

FIG. 10 depicts an access link loss budget of 20 CH OCML passive circuit and a 40 CH OCML passive circuit, in accordance with the disclosure. Access link loss budget 1000 comprises loss budgets for a 20 CH OCML and a 40 CH OCML transmitting optical data signals between a MDM that is 60 Kilometers (Km) and a headend associated with the 20 CH OCML and a headend associated with a 40 CH OCML.

The 20 CH OCML may comprise a 10 Gigabit transceiver may have a 10 G Txcvr Output Power of 1 dBm. The 20 CH OCML may comprise a downstream (DS) EDFA with a DS EDFA gain of 15 dB, and a maximum (Max.) DS EDFA saturated output power of 20 dBm. The loss between the DS EDFA and the output port of the 20 CH OCML may be 3.5 dB. The total power output from the 20 CH OCML to the fiber, inclusive of 10 GbE, GPON, and 10 GEPON optical data signals, 17.2 dBm. The 20 CH OCML may output a 10 GbE downstream optical data signal to fiber with a power of 3.5 dBm. The fiber may experience a 13.2 dBm loss in power over 60 Km. A MDM connected to the 20 CH OCML may reduce the power of a downstream optical data signal received at the MDM by 7.5 dB. The MDM may comprise a DWDM and interleaver, and the reduction in power at the MDM may be due to a loss in power of the downstream optical data signal due to electronics in the DWDM and the interleaver. The link loss budget may also include a 3.6 dB reduction in power due to connectors connecting a headend of the 20 CH OCML to the MDM of the 20 CH OCML. The total loss budget of the 20 CH OCML may be 24.3 dB. The transceivers used in the 20 CH OCML may be small form-factor pluggable (SFP+) transceivers. The SFP+ transceivers may have a downstream (DS) receive power of −20.8 dBm and a SFP+ upstream (UP) receive power of −17.8 dBm. The upstream OSNR from the MDM to the headend of the 20 CH OCML may be 25.7 dB.

The 40 CH OCML may comprise a 10 Gigabit transceiver may have a 10 G Txcvr Output Power of 1 dBm. The 40 CH OCML may comprise a downstream (DS) EDFA with a DS EDFA gain of 15.5 dB, and a maximum (Max.) DS EDFA saturated output power of 23.5 dBm. The loss between the DS EDFA and the output port of the 40 CH OCML may be 3.5 dB. The total power output from the 40 CH OCML to the fiber, inclusive of 10 GbE, GPON, and 10 GEPON optical data signals, 20.3 dBm. The 40 CH OCML may output a 10 GbE downstream optical data signal to fiber with a power of 4 dBm. The fiber may experience a 13.2 dBm loss in power over 60 Km. A MDM connected to the 40 CH OCML may reduce the power of a downstream optical data signal received at the MDM by 9.5 dB. The MDM may comprise a DWDM and interleaver, and the reduction in power at the MDM may be due to a loss in power of the downstream optical data signal due to electronics in the DWDM and the interleaver. The link loss budget may also include a 3.6 dB reduction in power due to connectors connecting a headend of the 40 CH OCML to the MDM of the 40 CH OCML. The total loss budget of the 40 CH OCML may be 26.3 dB. The transceivers used in the 40 CH OCML may be small form-factor pluggable (SFP+) transceivers. The SFP+ transceivers may have a downstream (DS) receive power of −22.3 dBm and a SFP+ upstream (UP) receive power of −19.8 dBm. The upstream OSNR from the MDM to the headend of the 40 CH OCML may be 23.7 dB.

FIG. 11 depicts an access link loss budget of a 20 CH OCML passive circuit and a 40 CH OCML passive circuit, in accordance with the disclosure. Access link loss budget 1000 comprises loss budgets for a 20 CH OCML and a 40 CH OCML transmitting optical data signals between a MDM that is 40 Kilometers (Km) and a headend associated with the 20 CH OCML and a headend associated with a 40 CH OCML The 20 CH OCML may comprise a 10 Gigabit transceiver may have a 10 G Txcvr Output Power of 1 dBm. The 20 CH OCML may comprise a downstream (DS) EDFA with a DS EDFA gain of 10 dB, and a maximum (Max.) DS EDFA saturated output power of 18 dBm. The loss between the DS EDFA and the output port of the 20 CH OCML may be 3.5 dB. The total power output from the 20 CH OCML to the fiber, inclusive of 10 GbE, GPON, and 10 GEPON optical data signals, 15.5 dBm. The 20 CH OCML may output a 10 GbE downstream optical data signal to fiber with a power of 1.5 dBm. The fiber may experience a 8.8 dBm loss in power over 40 Km. A MDM connected to the 20 CH OCML may reduce the power of a downstream optical data signal received at the MDM by 7.5 dB. The MDM may comprise a DWDM and interleaver, and the reduction in power at the MDM may be due to a loss in power of the downstream optical data signal due to electronics in the DWDM and the interleaver. The link loss budget may also include a 3.6 dB reduction in power due to connectors connecting a headend of the 20 CH OCML to the MDM of the 20 CH OCML. The total loss budget of the 20 CH OCML may be 19.9 dB. The transceivers used in the 20 CH OCML may be small form-factor pluggable (SFP+) transceivers. The SFP+ transceivers may have a downstream (DS) receive power of −18.4 dBm and a SFP+ upstream (UP) receive power of −12.4 dBm. The upstream OSNR from the MDM to the headend of the 20 CH OCML may be 30.1 dB.

The 40 CH OCML may comprise a 10 Gigabit transceiver may have a 10 G Txcvr Output Power of 1 dBm. The 40 CH OCML may comprise a downstream (DS) EDFA with a DS EDFA gain of 10.5 dB, and a maximum (Max.) DS EDFA saturated output power of 21.5 dBm. The loss between the DS EDFA and the output port of the 40 CH OCML may be 3.5 dB. The total power output from the 40 CH OCML to the fiber, inclusive of 10 GbE, GPON, and 10 GEPON optical data signals, 18.5 dBm. The 40 CH OCML may output a 10 GbE downstream optical data signal to fiber with a power of 2 dBm. The fiber may experience a 8.8 dBm loss in power over 40 Km. A MDM connected to the 40 CH OCML may reduce the power of a downstream optical data signal received at the MDM by 9.5 dB. The MDM may comprise a DWDM and interleaver, and the reduction in power at the MDM may be due to a loss in power of the downstream optical data signal due to electronics in the DWDM and the interleaver. The link loss budget may also include a 3.6 dB reduction in power due to connectors connecting a headend of the 40 CH OCML to the MDM of the 40 CH OCML. The total loss budget of the 40 CH OCML may be 21.9 dB. The transceivers used in the 40 CH OCML may be small form-factor pluggable (SFP+) transceivers. The SFP+ transceivers may have a downstream (DS) receive power of −19.9 dBm and a SFP+ upstream (UP) receive power of −14.4 dBm. The upstream OSNR from the MDM to the headend of the 40 CH OCML may be 28.1 dB.

Figure 12:
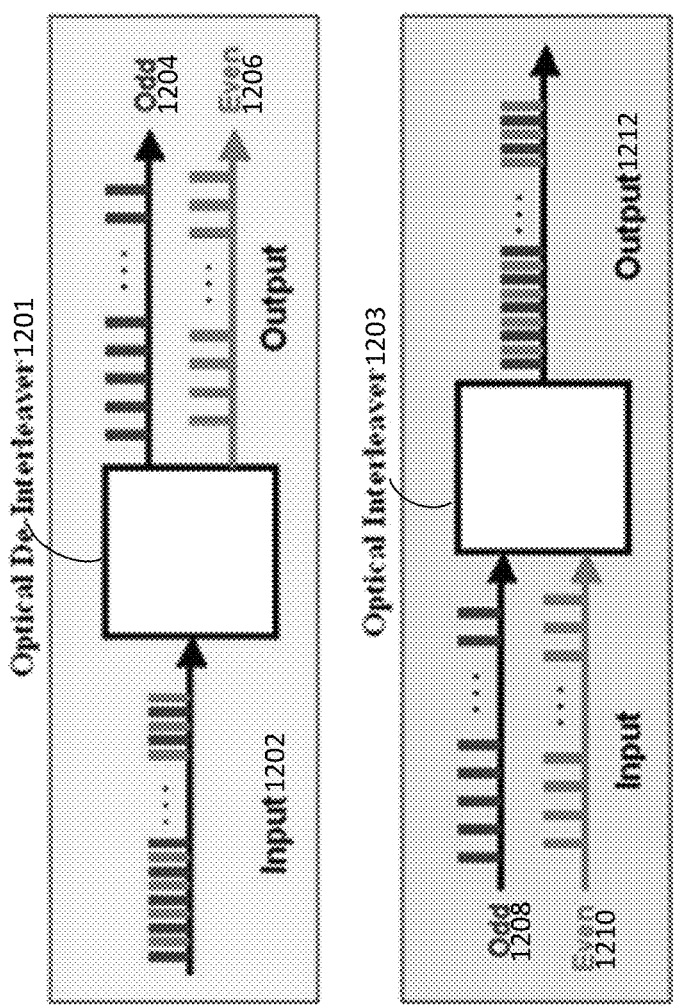
FIG. 12 depicts an optical de-interleaver and optical interleaver, in accordance with the disclosure.

FIG. 12 depicts an optical de-interleaver and optical interleaver, in accordance with the disclosure. Optical de-interleaver 1201 may receive an interleaved input optical data signal (i.e., input 1202) and may de-interleave the interleaved input optical data signal into a first de-interleaved optical data signal and a second de-interleaved optical data signal. The first de-interleaved optical data signal may be associated with an odd downstream channel (i.e., odd 1204) and the second de-interleaved optical data signal may be associated with an even downstream channel (i.e., even 1206). The first de-interleaved optical data signal may be any of DS ODD 603, and may oscillate at a frequency of 100 GHz. The second de-interleaved optical data signal may be any of DS EVEN 602, and may oscillate at a frequency of 50 GHz.

In some embodiments, optical de-interleaver 1201 may be implemented in a MDM. For example, de-interleaver 1480 may be implemented as optical de-interleaver 1201. In other embodiments, optical de-interleaver 1201 may be implemented in a MDM expansion module. For example, de-interleaver 1380 may be implemented as optical de-interleaver 1201.

Optical interleaver 1203 may receive a first optical data signal (i.e., odd 1208) and a second optical data signal (i.e., even 1210) as input, and may interleave the first optical data signal and the second optical data signal, producing an interleaved output data signal (i.e., output 1212). The first optical data signal may be any of DS ODD 603, and may oscillate at a frequency of 100 GHz. The second optical data signal may be any of DS EVEN 602, and may oscillate at a frequency of 50 GHz.

In some embodiments, optical interleaver 1203 may be implemented in a 40 CH OCML headend. For example, interleaver 1350 may be implemented as optical interleaver 1203. In other embodiments, optical interleaver 1203 may be implemented in a 40 CH OCML expansion module. For example, interleaver 1450 may be implemented as optical interleaver 1203.

Output 1212 may be an downstream optical data signal transmitted from a 40 CH OCML headend to a MDM, and input 1202 may be the downstream optical data signal corresponding output 1212 received at the MDM.

Figure 13A:
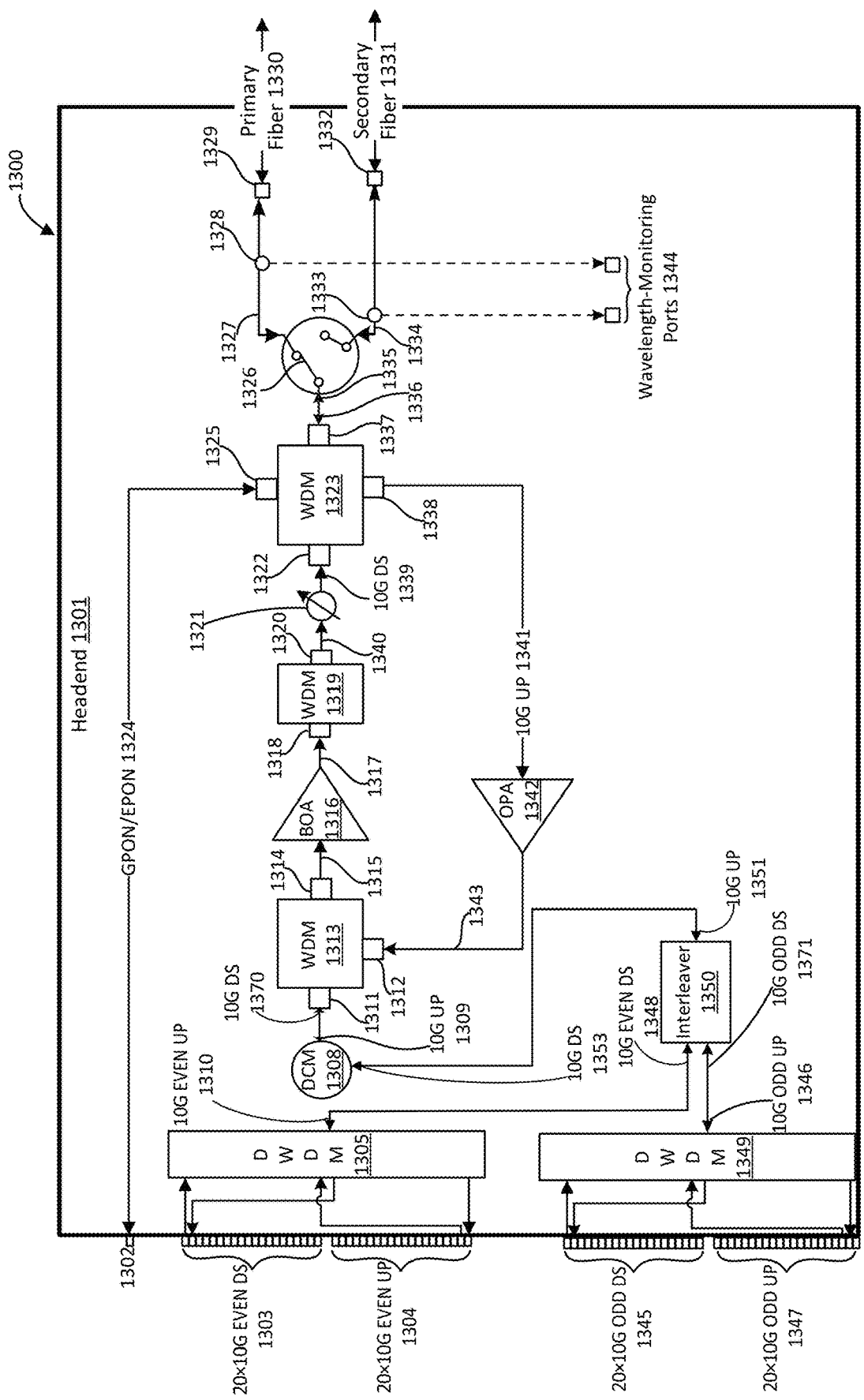
FIG. 13A depicts an access network diagram of an 40 CH OCML headend, in accordance with the disclosure.

FIG. 13A depicts an access network diagram of a 40 CH OCML headend, in accordance with the disclosure. FIG. 13A shows a schematic of an OCML headend according to at least one embodiment of the disclosure. As shown in FIG. 13A, headend 1301 is a smart integrated OCML headend, which is a circuit, comprising a first DWDM (e.g., DWDM 1305), a second DWDM (e.g., DWDM 1349), an interleaver (e.g., interleaver 1350), a first WDM (e.g., WDM 1313), a second WDM (e.g., WDM 1319), a third WDM (e.g., WDM 1323), a GPON/EPON connector (e.g., GPON/EPON 1324), a booster amplifier BOA (e.g., BOA 1316), an optical pre-amplifier (OPA) (e.g., OPA 1342), a variable optical attenuator (VOA) (e.g., VOA 1321), an optical switch 1326 to feed a primary optical fiber (e.g., Primary Fiber 1330) or secondary (backup) optical fiber (e.g., Secondary Fiber 1331), and a dispersion control module (DCM) (e.g., DCM 1308). DWDM 1305 and DWDM 1349 may be similar in functionality to DWDM 905. DWDM 1305 and DWDM 1349 may be different from DWDM 905, in that DWDM 1305 and DWDM 1349 may comprise twenty downstream (DS) 10 G NRZ transponders (e.g., 20×10 G EVEN DS 1303 for DWDM 1305 and 20×10 G ODD DS 1345 for DWDM 1349) and twenty upstream (UP) 10 G NRZ transponders (e.g., 20×10 G EVEN UP 1304 for DWDM 1305 and 20×10 G ODD UP 1347 for DWDM 1349). WDM 1313, WDM 1319, and WDM 1323 may be similar in functionality to WDM 913.

The disclosure provides a method of transporting multiple 10 G NRZ, coherent 100 GbE, 200 GbE, and/or 400 GbE and GPON/EPON signals on the same optical fiber over extended links of up to 60 kms without a cable company having to put optical amplifiers between the cable's Master Terminal Center (MTC) facility and a field hub or outside plant. The MTC facility may be an inside plant facility where a cable company acquires and combines services to be offered to customers. The MTC facility provides these combined services to customers, by transmitting and receiving optical signals over a plurality of optical fibers to a field hub or outside plant which connects the plurality of optical fibers to a customer's premise. The OCML headend may be located in a secondary terminal center (STC) that connects the MTC facility to a field hub or outside plant housing a multiplexer-demultiplexer (MDM) (e.g., MDM 108 in FIG. 1).

The EPON signals may operate with the same optical frequencies as GPON and time division multiple access (TDMA). The raw line data rate is 1.25 Gbits/s in both the downstream and upstream directions. EPON is fully compatible with other Ethernet standards, so no conversion or encapsulation is necessary when connecting to Ethernet-based networks on either end. The same Ethernet frame is used with a payload of up to 1518 bytes. EPON may not use a carrier sense multiple access (CSMA)/collision detection (CD) access method used in other versions of Ethernet. There is a 10-Gbit/s Ethernet version designated as 802.3av. The line rate may be 10.3125 Gbits/s. The primary mode is 10 Gbits/s upstream as well as downstream. A variation uses 10 Gbits/s downstream and 1 Gbit/s upstream. The 10-Gbit/s versions use different optical wavelengths on the fiber, 1575 to 1591 nm downstream and 1260 to 1280 nm upstream so the 10-Gbit/s system can be wavelength multiplexed on the same fiber as a standard 1-Gbit/s system.

In one aspect, headend 1301 may comprise a first set of twenty 10 G NRZ even DS transponders (e.g., 20×10 G EVEN DS 1303), and a second set of twenty 10 G NRZ odd DS transponders (e.g., 20×10 G ODD DS 1345). Headend 1301 may comprise a third set of twenty 10 G NRZ even UP transponders (e.g., 20×10 G EVEN UP 1304) and a fourth set of 10 G NRZ odd UP transponders (e.g., 20×10 G ODD 1347).

20×10 G EVEN DS 1303 may transmit downstream data over twenty 10 G NRZ wavelengths. 20×10 G ODD UP 1304 may receive upstream data over twenty 10 G NRZ wavelengths. 20×10 G ODD DS 1345 may transmit downstream data over twenty 10 G NRZ wavelengths. 20×10 G EVEN UP 1347 may receive upstream data over twenty 10 G NRZ wavelengths.

The operation of headend 1301 may be described by way of the processing of downstream optical data signals transmitted from headend 1301 to a MDM, and the processing of upstream optical data signals received from the MDM. Each of the transponders of 20×10 G EVEN DS 1303 and 20×10 G ODD DS 1345 may receive a SONET/SDH optical data signal from a MTC and each of the transponders may convert the SONET/SDH optical data signal into an electrical signal. More specifically, a first transceiver in each of the transponders may convert the SONET/SDH optical data signal into an electrical signal. A second transceiver in each of the transponders may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10 G EVEN DS 1303 and 20×10 G ODD DS 1345 may each receive a SONET/SDH optical data signal, and each of the transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10 G EVEN DS 1303 and 20×10 G ODD DS 1345 may each generate twenty corresponding second optical data signals each of which has a unique wavelength.

DWDM 1305 may receive a first set of twenty corresponding second optical data signals as an input and output a first multi-wavelength downstream optical data signal (e.g., 10 G NRZ) comprising the twenty corresponding second optical data signals onto a fiber. The first multi-wavelength downstream optical data signal 10 G NRZ may be a coherent 10 G NRZ optical data signal. More specifically, DWDM 1305 may multiplex the first set of twenty corresponding second optical data signals onto the fiber, wherein the first set of twenty multiplexed corresponding second optical data signals compose the first multi-wavelength downstream optical data signal. The first multi-wavelength optical data signal may have a wavelength comprising the twenty wavelengths of the first set of the twenty corresponding second optical data signals. The first set of twenty corresponding second optical data signals may be even downstream optical data signals.

DWDM 1345 may receive a second set of twenty corresponding second optical data signals as an input and output a second multi-wavelength downstream optical data signal (e.g., 10 G NRZ) comprising the twenty corresponding second optical data signals onto a fiber. The second multi-wavelength downstream optical data signal 10 G NRZ may be a coherent 10 G NRZ optical data signal. More specifically, DWDM 1345 may multiplex the second set of twenty corresponding second optical data signals onto the fiber, wherein the second set of twenty multiplexed corresponding second optical data signals compose the second multi-wavelength downstream optical data signal. The second multi-wavelength optical data signal may have a wavelength comprising the twenty wavelengths of the second set of the twenty corresponding second optical data signals.

The first multi-wavelength downstream optical data signal (e.g., 10 G EVEN DS 1348), may be input to interleaver 1350. The second multi-wavelength downstream optical data signal (e.g., 10 G ODD DS 1371), may be input to interleaver 1350. 10 G EVEN DS 1348 and 10 G ODD DS 1371 may be interleaved in accordance with optical interleaver 1203. Interleaver 1350 may output an interleaved downstream 10 G NRZ optical data signal (e.g., 10 G DS 1353). 10 G DS 1353 may be input into DCM 1308 to compensate for dispersion that 10 G DS 1370 may experience after it is amplified by BOA 1316 and multiplexed by WDM 1323, with other optical data signals, that are downstream from the DCM. The amplified and multiplexed optical data signal may be referred to as an egress optical data signal, as it is the optical data signal that may be transmitted out of headend 1301 over a fiber connecting headend 1301 to a field hub or outside plant. In some embodiments, DCM 1308 may be configured to balance positive and/or negative dispersion that may be introduced to the egress optical data signal by the fiber. In some embodiments, DCM 1308 may be configured to compensate for positive (temporal broadening of the egress optical data signal) and/or negative (temporal contraction of the egress optical data signal) dispersion introduced by fiber that is 80 km or greater in length, to reduce the sensitivity or OSNR levels of a transceiver in a DWDM located at a field hub or outside plant. More specifically, DCM 1308 may be configured to reduce the sensitivity or OSNR level requirement in a photodetector or fiber-optic sensor in the transceiver, which may drastically reduce the cost of the transceivers used in the DWDM located at the field hub or outside plant. DCM 1308 may output a dispersion controlled version of 10 G DS 1353 as 10 G DS 1370.

WDM 1313 may be a three port circulator, that receives multi-wavelength downstream optical data signal 10 G DS 1317 on port 1311, and outputs multi-wavelength downstream optical data signal 10 G DS 1370, on port 1314 as multi-wavelength downstream optical data signal 10 G DS 1315 to BOA 1316.

BOA 1316 may have a gain that is based at least in part on a distance that a downstream signal has to travel. For example, the gain may be a function of a fiber attenuation coefficient α, which is a measure of the intensity of the attenuation of a beam of light as it traverses a length of an optical fiber segment. The unit of measurement of the fiber attenuation coefficient is decibels (dB) per km (dB/km). For instance, BOA 1316 may be adjusted based at least in part on the attenuation coefficient and length of fiber that the egress optical data signal will travel. More specifically, the gain BOA 1316 may be $G=e^{(2\alpha L)}$, where α is the fiber attenuation coefficient, as explained above, and L is the length of the fiber (e.g., the length of primary fiber 1330 and/or the length of secondary fiber 1331). Multi-wavelength downstream optical data signal 10 G DS 1315 may be amplified by BOA 1316, and BOA 1316 may output multi-wavelength downstream optical data signal 10 G DS 1317 to port 1318 of WDM 1319. WDM 1319 outputs a multi-wavelength downstream optical data signal (e.g., multi-wavelength downstream optical data signal 10 G DS 1340) from port 1320, which may be substantially the same as multi-wavelength downstream optical data signal 10 G DS 1317. Multi-wavelength downstream optical data signal 10 G DS 1340 may be input to variable optical amplifier (VOA) 1321.

VOA 1321 may be used to reduce the power levels of multi-wavelength downstream optical data signal 10 G DS 1340. The power reduction may done by absorption, reflection, diffusion, scattering, deflection, diffraction, and dispersion, of multi-wavelength downstream optical data signal 10 G DS 1340. VOA 1321 typically have a working wavelength range in which they absorb all light energy equally. In some embodiments VOA 1321 utilize a length of high-loss optical fiber, that operates upon its input optical signal power level in such a way that its output signal power level is less than the input level. For example, multi-wavelength downstream optical data signal 10 G DS 1340 may have an input power level to VOA 1321 that may be greater than the output power level of multi-wavelength downstream optical data signal 10 G DS 1339.

The variability of the output power level of VOA 1321 may be achieved using a fiber coupler, where some of the power is not sent to the port that outputs, but to another port. Another possibility is to exploit variable coupling losses, which are influenced by variable positioning of a fiber end. For example, the transverse position of the output fiber or the width of an air gap between two fibers may be varied, obtaining a variable loss without a strong wavelength dependence. This principle may be used for single-mode fibers. VOA 13211 may be based on some piece of doped fiber, exhibiting absorption within a certain wavelength range.

WDM 1323 may multiplex multi-wavelength downstream optical data signal 10 G DS 1339 and one or more EPON, and/or GPON optical data signals. The EPON and/or GPON optical data signals may be received on a GPON/EPON connector (e.g., GPON/EPON 1324) from PON port 1302. The resulting multiplexed optical data signal may be referred to as egress optical data signal 1335.

Egress optical data signal 1335 may be output by WDM 1323 and optical switch 1326 may switch egress optical data signal 1335 onto connector 1327 or connector 1334 depending on the position of switch 1326. In some embodiments, connector 1327 may be a primary connector and connector 1334 may be a secondary connector or a backup connector. Wavelength monitoring connector 1328 may connect connector 1327 to a first port of wavelength-monitoring ports 1344, and wavelength monitoring connector 1333 may connect connector 1334 to a second port of wavelength-monitoring ports 1344. Wavelength-monitoring ports 1344 may monitor the wavelengths in egress optical data signal 1335 via connector 1327 or connector 1334 depending on the position of switch 1326. Egress optical data signal 1335 may exit headend 1301 via connector 1327 connected to primary fiber 1330, and may be received on a first connector in the field hub or outside plant. Egress optical data signal 1335 may exit headend 1301 via connector 1334 connected to secondary fiber 1331, and may be received on a second connector in the field hub or outside plant. The field hub or outside plant may include a MDM with the first connector and the second connector.

The operation of headend 1301 may be described by way of the processing of upstream optical data signals received at headend 1301 from a field hub or outside plant. For instance, a multi-wavelength ingress optical data signal (i.e., multi-wavelength ingress optical data signal 1336) comprising, one or more of a 10 G NRZ, coherent 100 GbE, 200 GbE, 400 GbE, EPON, GPON, 10 GEPON, or XGPON optical data signals, may be an upstream optical data signal received on primary fiber 1330 or secondary fiber 1331 depending on the position of switch 1326. The multi-wavelength ingress optical data signal is an egress optical data signal, output by MDM 1391 in FIG. 13B. The egress optical data signal, may be a multi-wavelength optical data signal comprising 10 G NRZ, coherent 100 GbE, 200 GbE, 400 GbE optical data signals corresponding to the multiplexed multi-wavelength one or more upstream EPON and/or GPON optical data signals 1361 and multi-wavelength upstream optical data signal 1362.

Multi-wavelength ingress optical data signal 1336 may traverse connector 1327 and switch 1326, before entering WDM 1323 via port 1337 if switch 1326 is connected to connector 1327. Multi-wavelength ingress optical data signal 1336 may traverse connector 1334 and switch 1326, before entering WDM 1323 via port 1337 if switch 1326 is connected to connector 1327. WDM 1323 may demultiplex one or more 10 G NRZ optical data signals, EPON optical data signals, and/or GPON optical data signals from multi-wavelength ingress optical data signal 1336. WDM 1323 may transmit the one or more EPON and/or GPON optical data signals along GPON/EPON 1324 to PON connector 1302 via port 1325. WDM 1323 may transmit the one or more 10 G NRZ, optical data signals (e.g., 10 G UP 1341) out of port 1338 to OPA 1342.

The one or more 10 G UP 1341 may be received by OPA 1342. The one or more optical data signals 10 G UP 1341 may comprise 10 G optical data signals. A gain associated OPA 1342 may be based at least in part on a distance that 10 G NRZ optical data signals have to travel, similar to that of BOA 1316. The one or more optical data signals 10 G UP 1341 may be amplified by OPA 1342, and OPA 1342 may output multi-wavelength upstream optical data signal 1343 to WDM 1313.

WDM 1313 may receive the multi-wavelength upstream optical data signal 1343 on port 1312, and may output one or more optical data signals 10 G UP 1309 to DCM 1308. DCM 1308 may perform one or more operations on one or more optical data signals 10 G UP 1309 to compensate for any dispersion that may have been introduced by circuit components (e.g., WDM 1313, OPA 1342, or WDM 1323) or imperfections or issues with an optical fiber (e.g., primary fiber 1330 or secondary fiber 1331). DCM 1308 may output one or more optical data signals 10 G UP 1351 to interleaver 1350. Interleaver 1350 may de-interleave the one or more optical data signals 10 G UP 1351 into one or more even upstream optical data signals (e.g., 10 G EVEN UP 1310) and one or more odd upstream optical data signals (e.g., 10 G ODD UP 1346). Interleaver 1350 may de-interleave the one or more optical data signals 10 G UP 1351 using the same process as optical de-interleaver 1201. The one or more optical data signals 10 G UP 1309 are substantially the same as multi-wavelength upstream optical data signal 1343. WDM 1313 may function as a circulator when receiving multi-wavelength upstream optical data signal 1343 on port 1312. The one or more optical data signals 10 G EVEN UP 1310 may be received by DWDM 1305.

The one or more optical data signals 10 G EVEN UP 1310 may comprise 10 G NRZ optical data signals. DWDM 1305 may demultiplex the one or more optical data signals 10 G EVEN UP 1310 into individual optical data signals in accordance with the individual wavelengths of the one or more optical data signals 10 G EVEN UP 1310. More specifically, the one or more optical data signals 10 G EVEN UP 1310 may be demultiplexed into twenty 10 G NRZ optical data signals, each of which may have a unique wavelength. DWDM 1305 may output each of the twenty 10 G NRZ optical data signals to each of the transponders of 20×10 G EVEN UP 1304. Each of the transponders of 20×10 G EVEN UP 1304 may convert a received corresponding 10 G NRZ optical data signal, of the 10 G NRZ optical data signals, into a corresponding electrical signal. More specifically, a first transceiver in each of the transponders may convert one of the corresponding twenty 10 G NRZ optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. The twenty transponders of 20×10 G EVEN UP 1304 may transmit the twenty SONET/SDH optical data signals to the MTC on the SONET/SDH optical network connection.

The one or more optical data signals 10 G ODD UP 1346 may comprise 10 G NRZ optical data signals. DWDM 1349 may demultiplex the one or more optical data signals 10 G ODD UP 1346 into individual optical data signals in accordance with the individual wavelengths of the one or more optical data signals 10 G ODD UP 1346. More specifically, the one or more optical data signals 10 G ODD UP 1346 may be demultiplexed into twenty 10 G NRZ optical data signals, each of which may have a unique wavelength. DWDM 1349 may output each of the twenty 10 G NRZ optical data signals to each of the transponders of 20×10 G ODD UP 1347. Each of the transponders of 20×10 G ODD UP 1347 may convert a received corresponding 10 G NRZ optical data signal, of the 10 G NRZ optical data signals, into a corresponding electrical signal. More specifically, a first transceiver in each of the transponders may convert one of the corresponding twenty 10 G NRZ optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. The twenty transponders of 20×10 G EVEN UP 1304 may transmit the twenty SONET/SDH optical data signals to the MTC on the SONET/SDH optical network connection.

Figure 13B:
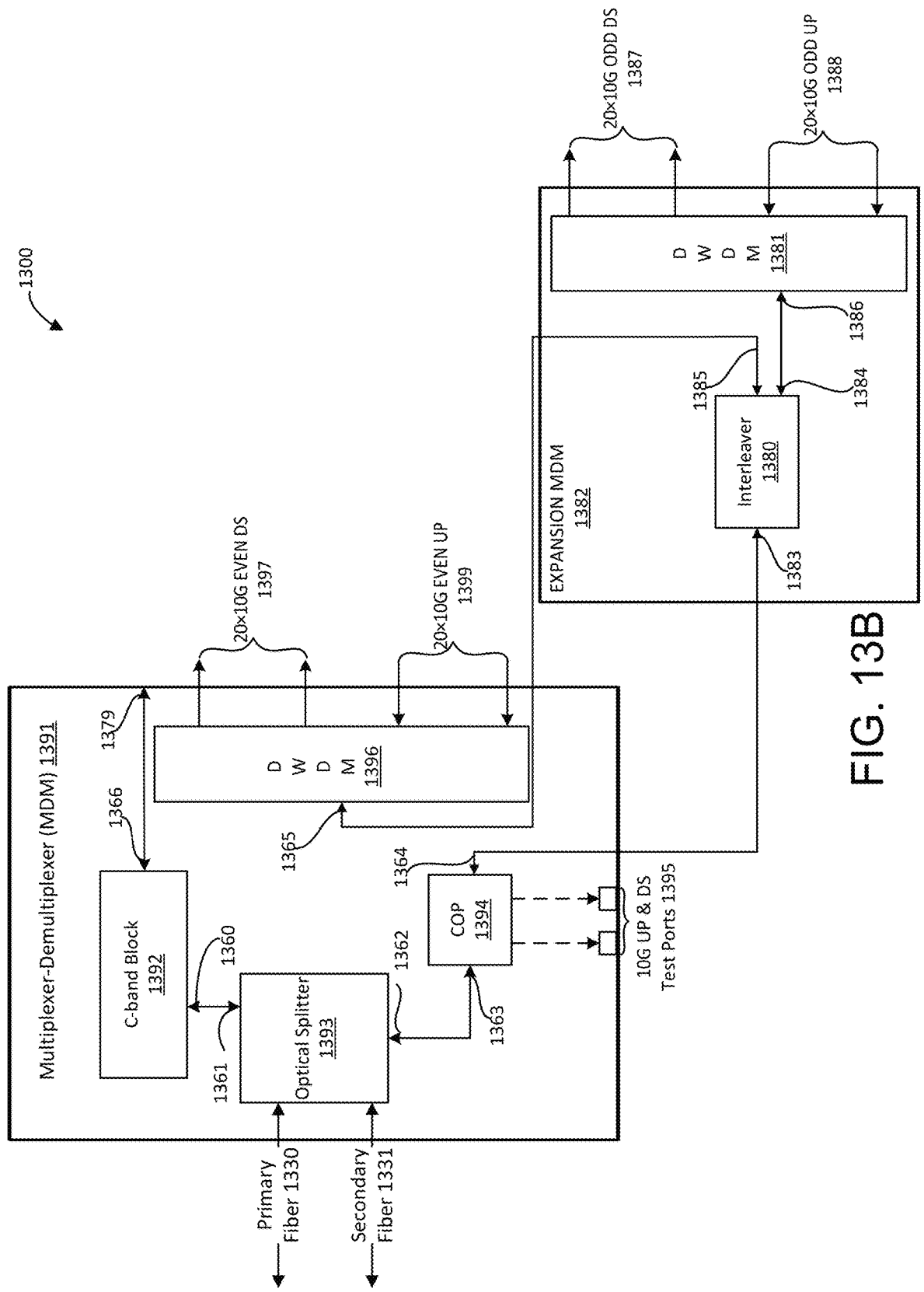
FIG. 13B depicts an ac multiplexer-demultiplexer (MDM) and an expansion MDM, in accordance with the disclosure.

FIG. 13B depicts an ac multiplexer-demultiplexer (MDM) and an expansion MDM, in accordance with the disclosure. Egress optical data signal 1335 may be received at optical splitter 1393 as an ingress optical data signal. Optical splitter 1393 may also be referred to as a beam splitter, and may comprise one or more quartz substrates of an integrated waveguide optical power distribution device. Optical splitter 1393 may be a passive optical network device. It may be an optical fiber tandem device comprising one or more input terminals and one or more output terminals. Optical splitter 1339 may be Fused Biconical Taper (FBT) splitter or Planar Lightwave Circuit (PLC) splitter. Optical splitter 1393 may be a balanced splitter wherein optical splitter 1393 comprises two input fibers and one or more output fibers over which the ingress optical data signal may be spread proportionally. In some embodiments, the ingress optical data signal may not be spread proportionally across the output fibers of optical splitter 1393. In some embodiments, optical splitter 1393 may comprise two input fibers and two output fibers. A first input fiber of optical splitter 1393 may be connected to primary fiber 1330 and a second input fiber of optical splitter 1393 may be connected to secondary fiber 1331.

A first output fiber of optical splitter 1393 may be connected to a filter (e.g., C-band block 1392) that filters out packets of light, in the ingress optical data signal, with wavelengths between 1530 nm and 1565 nm. This range of wavelengths may coincide with a C-band of wavelengths. In some other embodiments, the filter may filter out packets of light with wavelengths not inclusive of the wavelengths between 1260 nm and 1520 nm and not inclusive of wavelengths between 1570 nm and 1660 nm. The packets of light with wavelengths inclusive of the wavelengths between 1260 nm and 1520 nm and inclusive of wavelengths between 1570 nm and 1660 nm, may correspond to the wavelengths of the packets of light carrying the one or more EPON and/or GPON optical data signals transmitted along GPON/EPON 1324. More specifically, optical splitter 1393, may receive one or more downstream EPON and/or GPON optical data signals 1360, in the ingress optical data signal, that corresponds to the one or more EPON and/or GPON optical data signals transmitted along GPON/EPON 1324. In some embodiments, the one or more downstream EPON and/or GPON optical data signals 1360 may have a wavelength of 1490 nm. Optical splitter 1393 may output the one or more downstream EPON and/or GPON optical data signals 1360, received in the ingress optical data signal, to C-band block 1392.

C-band block 1392 may output one or more downstream EPON and/or GPON optical data signals 1379 corresponding to the one or more downstream EPON and/or GPON optical data signals 1360 with wavelengths between 1260 nm and 1520 nm and wavelengths between 1570 nm and 1660 nm. The C-band block 1392 may transmit the one or more downstream EPON and/or GPON optical data signals 1379 to an express port (not shown in FIG. 13B) collocated with, or attached to MDM 1391. In some embodiments, the express port may be located within the MDM 1391.

A second output fiber of optical splitter 1393 may be connected to COP 1394. COP 1394 may be a PON device that monitors the coupled optical power between Optical Splitter 1393 and interleaver 1380. In some embodiments, the coupled optical power may be a percentage value. For instance, the coupled optical power may be 1%. Optical splitter 1393, may receive one or more downstream 10 G NRZ optical data signals, in the ingress optical data signal, that corresponds to egress optical data signal 1335. In some embodiments, the one or more downstream 10 G NRZ, optical data signals may have a wavelength between 1530 nm and 1565 nm. Optical splitter 1393 may output the one or more downstream 10 G optical data signals 1363, received in the ingress optical data signal, to COP 1394. COP 1394 may output a first percentage of the one or more downstream 10 G 1363 to 10 G NRZ upstream and downstream test ports (e.g., 10 G UP & DS Test Ports 1395). The first percentage may be a percentage of the one or more downstream 10 G optical data signals 1363 tested by the 10 G upstream and downstream test ports. The first percentage of the one or more downstream 10 G optical data signals 1363 may be a monitoring signal used by a spectrum analyzer to measure optical power levels of a specific wavelength. The first percentage of the one or more downstream 10 G optical data signals 1363 may also be used by the spectrum analyzer to analyze certain characteristics of the wavelengths of the first percentage of the one or more downstream 10 G optical data signals 1363. COP 1394 may output a second percentage of the one or more downstream 10 G optical data signals 1383 to intereleaver 1380.

Expansion MDM 1382 may comprise interleaver 1380 and DWDM 1381. Interleaver 1380 may de-interleave the one or more downstream 10 G optical data signals 1383 into one or more even optical data signals (e.g., downstream 10 G EVEN DS 1365) and one or more odd optical data signals (e.g., downstream 10 G ODD UP 1386). Interleaver 1380 may de-interleave the one or more downstream 10 G optical data signals 1383 using the same process as optical de-interleaver 1201. Interleaver 1380 may output downstream 10 G EVEN DS 1365 to DWDM 1396, and may output downstream 10 G ODD UP 1386 to DWDM 1381.

Because downstream 10 G EVEN DS 1365 may be a multi-wavelength downstream optical data signal, DWDM 1396 may demultiplex downstream 10 G EVEN DS 1365 into individual optical data signals in accordance with the individual wavelengths of the one or more downstream 10 G EVEN DS 1365. More specifically, downstream 10 G EVEN DS 1365 may be demultiplexed into twenty 10 G NRZ optical data signals, each of which may have a unique wavelength. DWDM 1396 may output each of the twenty 10 G NRZ optical data signals to each of the transponders of 20×10 G EVEN DS 1397. Each of the transponders of 20×10 G EVEN DS 1397 may be in a transport chassis that is inside a RPD (not shown) and may convert a received corresponding 10 G NRZ optical data signal, of the 10 G NRZ optical data signals, into a corresponding electrical signal. More specifically, a first transceiver in each of the transponders may convert one of the corresponding twenty 10 G NRZ, optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. In some embodiments, the RPD may be similar in functionality to a transport chassis 107. The transport chassis may convert the SONET/SDH optical data signals into an electrical signal that may be transmitted over one or more coaxial cables. MDM 1391 may be similar in functionality to MDM 108 and may be connected to the transport chassis in a way similar to the connection between MDM 108 and transport chassis 107.

Because downstream 10 G ODD DS 1386 may be a multi-wavelength downstream optical data signal, DWDM 1381 may demultiplex downstream 10 G ODD DS 1386 into individual optical data signals in accordance with the individual wavelengths of the one or more downstream 10 G ODD DS 1386. More specifically, downstream 10 G ODD DS 1386 may be demultiplexed into twenty 10 G NRZ optical data signals, each of which may have a unique wavelength. DWDM 1381 may output each of the twenty 10 G NRZ optical data signals to each of the transponders of 20×10 G ODD DS 1387. Each of the transponders of 20×10 G ODD DS 1387 may be in a transport chassis that is inside a RPD (not shown) and may convert a received corresponding 10 G NRZ optical data signal, of the 10 G NRZ optical data signals, into a corresponding electrical signal. More specifically, a first transceiver in each of the transponders may convert one of the corresponding twenty 10 G NRZ, optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. In some embodiments, the RPD may be similar in functionality to a transport chassis 107. The transport chassis may convert the SONET/SDH optical data signals into an electrical signal that may be transmitted over one or more coaxial cables. MDM 1391 may be similar in functionality to MDM 108 and may be connected to the transport chassis in a way similar to the connection between MDM 108 and transport chassis 107.

The operation of MDM 1391 may be further described by way of the processing of an upstream optical data signal transmitted to headend 1301. Each of the transponders of 20×10 G EVEN UP 1399 may receive a SONET/SDH optical data signal and each of the transponders may convert the SONET/SDH optical data signal into an electrical signal. Each of the transponders of 20×10 G EVEN UP 1399 may receive the SONET/SDH optical data signal from a transport chassis in the RPD. The transport chassis in the RPD may also convert one or more electrical signals into the SONET/SDH optical data signal.

More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10 G EVEN UP 1399 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10 G EVEN UP 1399 may generate twenty corresponding second optical data signals each of which has a unique wavelength.

Each of the transponders of 20×10 G ODD UP 1388 may receive a SONET/SDH optical data signal and each of the transponders may convert the SONET/SDH optical data signal into an electrical signal. Each of the transponders of 20×10 G ODD UP 1388 may receive the SONET/SDH optical data signal from a transport chassis in the RPD. The transport chassis in the RPD may also convert one or more electrical signals into the SONET/SDH optical data signal.

More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10 G EVEN UP 1388 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10 G ODD UP 1388 may generate twenty corresponding second optical data signals each of which has a unique wavelength.

DWDM 1381 may receive twenty corresponding second optical data signals as an input and output a multi-wavelength upstream optical data signal (e.g., multi-wavelength upstream optical data signal 1384) comprising the twenty corresponding second optical data signals. The multi-wavelength upstream optical data signal 1384 may be a 10 G NRZ optical data signal. More specifically, DWDM 1381 may multiplex the twenty corresponding second optical data signals onto the fiber connecting DWDM 1381 and interleaver 1380.

The multi-wavelength upstream optical data signal 1384, may be input to interleaver 1380. The multi-wavelength upstream optical data signal 1385, may be input to interleaver 1380. Interleaver 1380 may interleave multi-wavelength upstream optical data signal 1384 and multi-wavelength upstream optical data signal 1385 in accordance with optical interleaver 1203. Interleaver 1380 may output a multi-wavelength interleaved upstream 10 G NRZ optical data signal (e.g., multi-wavelength interleaved upstream 10 G optical data signal 1364) to COP 1394.

The multi-wavelength interleaved upstream 10 G NRZ optical data signal may have a wavelength comprising the twenty wavelengths of multi-wavelength upstream optical data signal 1384 and the twenty wavelengths of multi-wavelength upstream optical data signal 1385.

The multi-wavelength upstream optical data signal 1364, may be input to COP 1394. COP 1394 may output a first percentage of the multi-wavelength upstream optical data signal 1364 to 10 G NRZ upstream and downstream test ports (e.g., 10 G UP & DS Test Ports 1395). The first percentage may be a percentage of the multi-wavelength upstream optical data signal 1364 tested by the 10 G NRZ upstream and downstream test ports. The first percentage of the multi-wavelength upstream optical data signal 1364 may be a monitoring signal used by a spectrum analyzer to measure optical power levels of a specific wavelength in the multi-wavelength upstream optical data signal 1364. The first percentage of the multi-wavelength upstream optical data signal 1364 may also be used by the spectrum analyzer to analyze certain characteristics of the wavelengths of the first percentage of the multi-wavelength upstream optical data signal 1364. COP 1394 may output a second percentage of the multi-wavelength upstream optical data signal 1364 to optical splitter 1393 as the multi-wavelength upstream optical data signal 1362.

C-band block 1392 may receive one or more upstream EPON and/or GPON optical data signals 1366 from an express port (not shown in FIG. 13B) collocated with, or attached to MDM 1391. In some embodiments, the express port may be located within the MDM 1391. C-band block 1392 may filter out packets of light, in the one or more upstream EPON and/or GPON optical data signals 1366, with wavelengths between 1530 nm and 1565 nm. Thus C-band block 1392 may output one or more upstream EPON and/or GPON optical data signals 1361 with wavelengths between 1260 nm and 1520 nm and wavelengths between 1570 nm and 1660 nm.

Optical splitter 1393 may receive one or more upstream EPON and/or GPON optical data signals 1361, and may also receive the multi-wavelength upstream optical data signal 1362, and may multiplex the multi-wavelength one or more upstream EPON and/or GPON optical data signals 1361 with the multi-wavelength upstream optical data signal 1362. Optical splitter 1393 outputs an egress optical data signal, which may be a multi-wavelength optical data signal comprising 10 G NRZ optical data signals corresponding to the multiplexed multi-wavelength one or more upstream EPON and/or GPON optical data signals 1361 and multi-wavelength upstream optical data signal 1362. Optical splitter 1393 may output the egress optical data signal onto primary fiber 1330 connecting the optical splitter 1393 to port 1329. Optical splitter 1393 may also output the egress optical data signal onto secondary fiber 1331 connecting the optical splitter 1393 to port 1332.

Figure 14A:
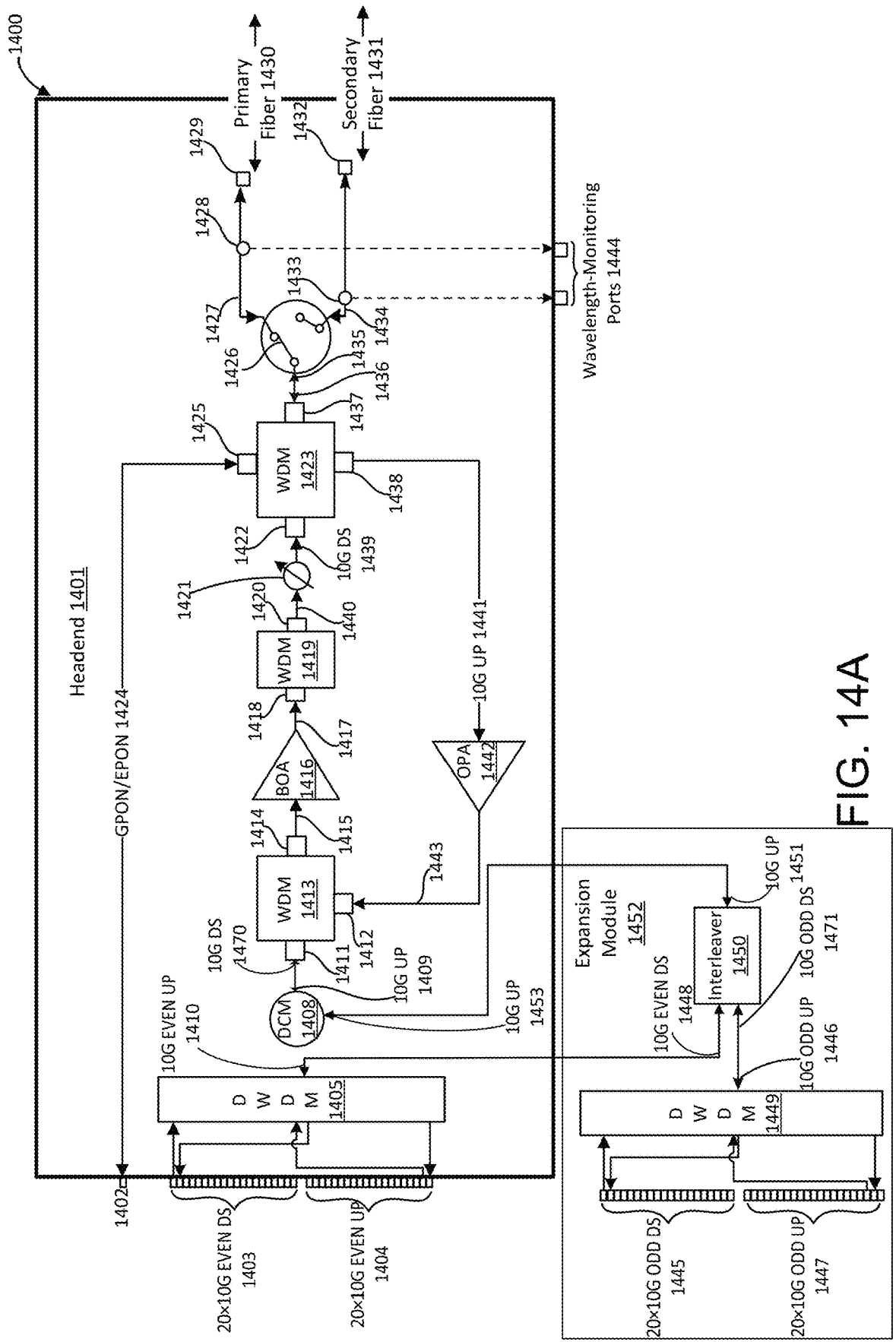
FIG. 14A depicts an access network diagram of an 40 CH OCML headend and an expansion 40 CH OCML module, in accordance with the disclosure.

FIG. 14A depicts an access network diagram of an 40 CH OCML headend and an expansion 40 CH OCML module, in accordance with the disclosure. FIG. 14A depicts an access network diagram of a 40 CH OCML headend, in accordance with the disclosure. FIG. 14A shows a schematic of an OCML headend according to at least one embodiment of the disclosure. As shown in FIG. 14A, headend 1401 is a smart integrated OCML headend, which is a circuit, comprising a first DWDM (e.g., DWDM 1405), an interleaver (e.g., interleaver 1450), a first WDM (e.g., WDM 1413), a second WDM (e.g., WDM 1419), a third WDM (e.g., WDM 1423), a GPON/EPON connector (e.g., GPON/EPON 1424), a booster amplifier BOA (e.g., BOA 1416), an optical pre-amplifier (OPA) (e.g., OPA 1442), a variable optical attenuator (VOA) (e.g., VOA 1421), an optical switch 1426 to feed a primary optical fiber (e.g., Primary Fiber 1430) or secondary (backup) optical fiber (e.g., Secondary Fiber 1431), and a dispersion control module (DCM) (e.g., DCM 1408). DWDM 1405 and DWDM 1449 may be similar in functionality to DWDM 905. DWDM 1405 and DWDM 1449 may be different from DWDM 905, in that DWDM 1405 and DWDM 1449 may comprise twenty downstream (DS) 10 G NRZ transponders (e.g., 20×10 G EVEN DS 1403 for DWDM 1405 and 20×10 G ODD DS 1445 for DWDM 1449) and twenty upstream (UP) 10 G NRZ transponders (e.g., 20×10 G EVEN UP 1404 for DWDM 1405 and 20×10 G ODD UP 1447 for DWDM 1449). WDM 1313, WDM 1319, and WDM 1323 may be similar in functionality to WDM 913.

The disclosure provides a method of transporting multiple 10 G NRZ, coherent 100 GbE, 200 GbE, and/or 400 GbE and GPON/EPON signals on the same optical fiber over extended links of up to 60 kms without a cable company having to put optical amplifiers between the cable's Master Terminal Center (MTC) facility and a field hub or outside plant. The MTC facility may be an inside plant facility where a cable company acquires and combines services to be offered to customers. The MTC facility provides these combined services to customers, by transmitting and receiving optical signals over a plurality of optical fibers to a field hub or outside plant which connects the plurality of optical fibers to a customer's premise. The OCML headend may be located in a secondary terminal center (STC) that connects the MTC facility to a field hub or outside plant housing a multiplexer-demultiplexer (MDM) (e.g., MDM 108 in FIG. 1).

The EPON signals may operate with the same optical frequencies as GPON and time division multiple access (TDMA). The raw line data rate is 1.25 Gbits/s in both the downstream and upstream directions. EPON is fully compatible with other Ethernet standards, so no conversion or encapsulation is necessary when connecting to Ethernet-based networks on either end. The same Ethernet frame is used with a payload of up to 1518 bytes. EPON may not use a carrier sense multiple access (CSMA)/collision detection (CD) access method used in other versions of Ethernet. There is a 10-Gbit/s Ethernet version designated as 802.3av. The line rate may be 10.3125 Gbits/s. The primary mode is 10 Gbits/s upstream as well as downstream. A variation uses 10 Gbits/s downstream and 1 Gbit/s upstream. The 10-Gbit/s versions use different optical wavelengths on the fiber, 1575 to 1591 nm downstream and 1260 to 1280 nm upstream so the 10-Gbit/s system can be wavelength multiplexed on the same fiber as a standard 1-Gbit/s system.

In one aspect, headend 1401 may comprise a first set of twenty 10 G NRZ even DS transponders (e.g., 20×10 G EVEN DS 1403), and a second set of twenty 10 G NRZ odd DS transponders (e.g., 20×10 G ODD DS 1445). Headend 1401 may comprise a third set of twenty 10 G NRZ even UP transponders (e.g., 20×10 G EVEN UP 1404) and a fourth set of 10 G NRZ odd UP transponders (e.g., 20×10 G ODD UP 1447).

20×10 G EVEN DS 1403 may transmit downstream data over twenty 10 G NRZ wavelengths. 20×10 G ODD UP 1404 may receive upstream data over twenty 10 G NRZ wavelengths. 20×10 G ODD DS 1445 may transmit downstream data over twenty 10 G NRZ wavelengths. 20×10 G EVEN UP 1447 may receive upstream data over twenty 10 G NRZ wavelengths.

The operation of headend 1401 may be described by way of the processing of downstream optical data signals transmitted from headend 1401 to a MDM, and the processing of upstream optical data signals received from the MDM. Each of the transponders of 20×10 G EVEN DS 1403 and 20×10 G ODD DS 1445 may receive a SONET/SDH optical data signal from a MTC and each of the transponders may convert the SONET/SDH optical data signal into an electrical signal. More specifically, a first transceiver in each of the transponders may convert the SONET/SDH optical data signal into an electrical signal. A second transceiver in each of the transponders may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10 G EVEN DS 1403 and 20×10 G ODD DS 1445 may each receive a SONET/SDH optical data signal, and each of the transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10 G EVEN DS 1403 and 20×10 G ODD DS 1445 may each generate twenty corresponding second optical data signals each of which has a unique wavelength.

DWDM 1405 may receive a first set of twenty corresponding second optical data signals as an input and output a first multi-wavelength downstream optical data signal (e.g., 10 G NRZ) comprising the twenty corresponding second optical data signals onto a fiber. The first multi-wavelength downstream optical data signal 10 G NRZ may be a coherent 10 G NRZ optical data signal. More specifically, DWDM 1405 may multiplex the first set of twenty corresponding second optical data signals onto the fiber, wherein the first set of twenty multiplexed corresponding second optical data signals compose the first multi-wavelength downstream optical data signal. The first multi-wavelength optical data signal may have a wavelength comprising the twenty wavelengths of the first set of the twenty corresponding second optical data signals. The first set of twenty corresponding second optical data signals may be even downstream optical data signals.

DWDM 1449 may receive a second set of twenty corresponding second optical data signals as an input and output a second multi-wavelength downstream optical data signal (e.g., 10 G NRZ) comprising the twenty corresponding second optical data signals onto a fiber. The second multi-wavelength downstream optical data signal 10 G NRZ may be a coherent 10 G NRZ optical data signal. More specifically, DWDM 1449 may multiplex the second set of twenty corresponding second optical data signals onto the fiber, wherein the second set of twenty multiplexed corresponding second optical data signals compose the second multi-wavelength downstream optical data signal. The second multi-wavelength optical data signal may have a wavelength comprising the twenty wavelengths of the second set of the twenty corresponding second optical data signals.

The first multi-wavelength downstream optical data signal (e.g., 10 G EVEN DS 1448), may be input to interleaver 1450. The second multi-wavelength downstream optical data signal (e.g., 10 G ODD DS 1471), may be input to interleaver 1450. 10 G EVEN DS 1448 and 10 G ODD DS 1471 may be interleaved in accordance with optical interleaver 1203. Interleaver 1450 may output an interleaved downstream 10 G NRZ optical data signal (e.g., 10 G DS 1453). Expansion module 1452 may include DWDM 1449 and interleaver 1450.

10 G DS 1453 may be input into DCM 1408 to compensate for dispersion that 10 G DS 1470 may experience after it is amplified by BOA 1416 and multiplexed by WDM 1423, with other optical data signals, that are downstream from the DCM. The amplified and multiplexed optical data signal may be referred to as an egress optical data signal, as it is the optical data signal that may be transmitted out of headend 1401 over a fiber connecting headend 1401 to a field hub or outside plant. In some embodiments, DCM 1408 may be configured to balance positive and/or negative dispersion that may be introduced to the egress optical data signal by the fiber. In some embodiments, DCM 1408 may be configured to compensate for positive (temporal broadening of the egress optical data signal) and/or negative (temporal contraction of the egress optical data signal) dispersion introduced by fiber that is 80 km or greater in length, to reduce the sensitivity or OSNR levels of a transceiver in a DWDM located at a field hub or outside plant. More specifically, DCM 1408 may be configured to reduce the sensitivity or OSNR level requirement in a photodetector or fiber-optic sensor in the transceiver, which may drastically reduce the cost of the transceivers used in the DWDM located at the field hub or outside plant. DCM 1408 may output a dispersion controlled version of 10 G DS 1453 as 10 G DS 1470.

WDM 1413 may be a three port circulator, that receives multi-wavelength downstream optical data signal 10 G DS 1470 on port 1411, and outputs multi-wavelength downstream optical data signal 10 G DS 1415, on port 1414 as multi-wavelength downstream optical data signal 10 G DS 1415 to BOA 1416.

BOA 1416 may have a gain that is based at least in part on a distance that a downstream signal has to travel. For example, the gain may be a function of a fiber attenuation coefficient α, which is a measure of the intensity of the attenuation of a beam of light as it traverses a length of an optical fiber segment. The unit of measurement of the fiber attenuation coefficient is decibels (dB) per km (dB/km). For instance, BOA 1416 may be adjusted based at least in part on the attenuation coefficient and length of fiber that the egress optical data signal will travel. More specifically, the gain BOA 1416 may be $G=e^{(2\alpha L)}$, where α is the fiber attenuation coefficient, as explained above, and L is the length of the fiber (e.g., the length of primary fiber 1430 and/or the length of secondary fiber 1431). Multi-wavelength downstream optical data signal 10 G DS 1415 may be amplified by BOA 1416, and BOA 1416 may output multi-wavelength downstream optical data signal 10 G DS 1417 to port 1418 of WDM 1419. WDM 1419 outputs a multi-wavelength downstream optical data signal (e.g., multi-wavelength downstream optical data signal 10 G DS 1440) from port 1420, which may be substantially the same as multi-wavelength downstream optical data signal 10 G DS 1417. Multi-wavelength downstream optical data signal 10 G DS 1440 may be input to variable optical amplifier (VOA) 1421.

VOA 1421 may be used to reduce the power levels of multi-wavelength downstream optical data signal 10 G DS 1440. The power reduction may done by absorption, reflection, diffusion, scattering, deflection, diffraction, and dispersion, of multi-wavelength downstream optical data signal 10 G DS 1440. VOA 1421 typically have a working wavelength range in which they absorb all light energy equally. In some embodiments VOA 1421 utilize a length of high-loss optical fiber, that operates upon its input optical signal power level in such a way that its output signal power level is less than the input level. For example, multi-wavelength downstream optical data signal 10 G DS 1440 may have an input power level to VOA 1421 that may be greater than the output power level of multi-wavelength downstream optical data signal 10 G DS 1439.

The variability of the output power level of VOA 1421 may be achieved using a fiber coupler, where some of the power is not sent to the port that outputs, but to another port. Another possibility is to exploit variable coupling losses, which are influenced by variable positioning of a fiber end. For example, the transverse position of the output fiber or the width of an air gap between two fibers may be varied, obtaining a variable loss without a strong wavelength dependence. This principle may be used for single-mode fibers. VOA 1421 may be based on some piece of doped fiber, exhibiting absorption within a certain wavelength range.

WDM 1423 may multiplex multi-wavelength downstream optical data signal 10 G DS 1439 and one or more EPON, and/or GPON optical data signals. The EPON and/or GPON optical data signals may be received on a GPON/EPON connector (e.g., GPON/EPON 1424) from PON port

1402. The resulting multiplexed optical data signal may be referred to as egress optical data signal 1435.

Egress optical data signal 1435 may be output by WDM 1423 and optical switch 1426 may switch egress optical data signal 1435 onto connector 1427 or connector 1434 depending on the position of switch 1426. In some embodiments, connector 1427 may be a primary connector and connector 1434 may be a secondary connector or a backup connector. Wavelength monitoring connector 1428 may connect connector 1427 to a first port of wavelength-monitoring ports 1444, and wavelength monitoring connector 1433 may connect connector 1434 to a second port of wavelength-monitoring ports 1444. Wavelength-monitoring ports 1444 may monitor the wavelengths in egress optical data signal 1435 via connector 1427 or connector 1434 depending on the position of switch 1426. Egress optical data signal 1435 may exit headend 1401 via connector 1427 connected to primary fiber 1430, and may be received on a first connector in the field hub or outside plant. Egress optical data signal 1435 may exit headend 1401 via connector 1434 connected to secondary fiber 1431, and may be received on a second connector in the field hub or outside plant. The field hub or outside plant may include a MDM with the first connector and the second connector.

The operation of headend 1401 may be described by way of the processing of upstream optical data signals received at headend 1401 from a field hub or outside plant. For instance, a multi-wavelength ingress optical data signal, may comprise one or more of a 10 G NRZ, coherent 100 GbE, 200 GbE, 400 GbE, EPON, GPON, 10 GEPON, and/or XGPON optical data signal. The multi-wavelength ingress optical data signal may be an upstream optical data signal received on primary fiber 1430 or secondary fiber 1431 depending on the position of switch 1426.

Multi-wavelength ingress optical data signal 1436 may traverse connector 1427 and switch 1426, before entering WDM 1423 via port 1437 if switch 1426 is connected to connector 1427. Multi-wavelength ingress optical data signal 1436 may traverse connector 1434 and switch 1426, before entering WDM 1423 via port 1437 if switch 1426 is connected to connector 1427. WDM 1423 may demultiplex one or more 10 G NRZ optical data signals, EPON optical data signals, and/or GPON optical data signals from multi-wavelength ingress optical data signal 1436. Multi-wavelength ingress optical data signal 1436 is an egress optical data signal, output from MDM 1491. The egress optical data signal may be a multi-wavelength optical data signal comprising 10 G NRZ, coherent 100 GbE, 200 GbE, 400 GbE, EPON, GPON, 10 GEPON, and/or XGPON optical data signals corresponding to the multiplexed multi-wavelength one or more upstream EPON and/or GPON optical data signals 1461 and multi-wavelength upstream optical data signal 1462

WDM 1423 may transmit the one or more EPON and/or GPON optical data signals along GPON/EPON 1424 to PON connector 1402 via port 1425. WDM 1423 may transmit the one or more 10 G NRZ, optical data signals (e.g., 10 G UP 1441) out of port 1438 to OPA 1442.

The one or more 10 G UP 1441 may be received by OPA 1442. The one or more optical data signals 10 G UP 1441 may comprise 10 G optical data signals. A gain associated OPA 1442 may be based at least in part on a distance that 10 G NRZ optical data signals have to travel, similar to that of BOA 1416. The one or more optical data signals 10 G UP 1441 may be amplified by OPA 1442, and OPA 1442 may output multi-wavelength upstream optical data signal 1443 to WDM 1413.

WDM 1413 may receive the multi-wavelength upstream optical data signal 1443 on port 1412, and may output one or more optical data signals 10 G UP 1409 to DCM 1408. DCM 1408 may perform one or more operations on one or more optical data signals 10 G UP 1409 to compensate for any dispersion that may have been introduced by circuit components (e.g., WDM 1413, OPA 1442, or WDM 1423) or imperfections or issues with an optical fiber (e.g., primary fiber 1430 or secondary fiber 1431). DCM 1408 may output one or more optical data signals 10 G UP 1451 to interleaver 1450. Interleaver 1450 may de-interleave the one or more optical data signals 10 G UP 1451 into one or more even upstream optical data signals (e.g., 10 G EVEN UP 1410) and one or more odd upstream optical data signals (e.g., 10 G ODD UP 1446). Interleaver 1450 may de-interleave the one or more optical data signals 10 G UP 1451 using the same process as optical de-interleaver 1201. The one or more optical data signals 10 G UP 1409 are substantially the same as multi-wavelength upstream optical data signal 1443. WDM 1413 may function as a circulator when receiving multi-wavelength upstream optical data signal 1443 on port 1412. The one or more optical data signals 10 G EVEN UP 1410 may be received by DWDM 1405.

The one or more optical data signals 10 G EVEN UP 1410 may comprise 10 G NRZ optical data signals. DWDM 1405 may demultiplex the one or more optical data signals 10 G EVEN UP 1410 into individual optical data signals in accordance with the individual wavelengths of the one or more optical data signals 10 G EVEN UP 1410. More specifically, the one or more optical data signals 10 G EVEN UP 1410 may be demultiplexed into twenty 10 G NRZ optical data signals, each of which may have a unique wavelength. DWDM 1405 may output each of the twenty 10 G NRZ optical data signals to each of the transponders of 20×10 G EVEN UP 1404. Each of the transponders of 20×10 G EVEN UP 1404 may convert a received corresponding 10 G NRZ optical data signal, of the 10 G NRZ optical data signals, into a corresponding electrical signal. More specifically, a first transceiver in each of the transponders may convert one of the corresponding twenty 10 G NRZ optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. The twenty transponders of 20×10 G EVEN UP 1404 may transmit the twenty SONET/SDH optical data signals to the MTC on the SONET/SDH optical network connection.

The one or more optical data signals 10 G ODD UP 1446 may comprise 10 G NRZ optical data signals. DWDM 1449 may demultiplex the one or more optical data signals 10 G ODD UP 1446 into individual optical data signals in accordance with the individual wavelengths of the one or more optical data signals 10 G ODD UP 1446. More specifically, the one or more optical data signals 10 G ODD UP 1446 may be demultiplexed into twenty 10 G NRZ optical data signals, each of which may have a unique wavelength. DWDM 1449 may output each of the twenty 10 G NRZ optical data signals to each of the transponders of 20×10 G ODD UP 1447. Each of the transponders of 20×10 G ODD UP 1447 may convert a received corresponding 10 G NRZ optical data signal, of the 10 G NRZ optical data signals, into a corresponding electrical signal. More specifically, a first transceiver in each of the transponders may convert one of the corresponding twenty 10 G NRZ optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. The twenty transponders of 20×10 G EVEN UP 1404 may transmit the twenty SONET/SDH optical data signals to the MTC on the SONET/SDH optical network connection.

Figure 14B:
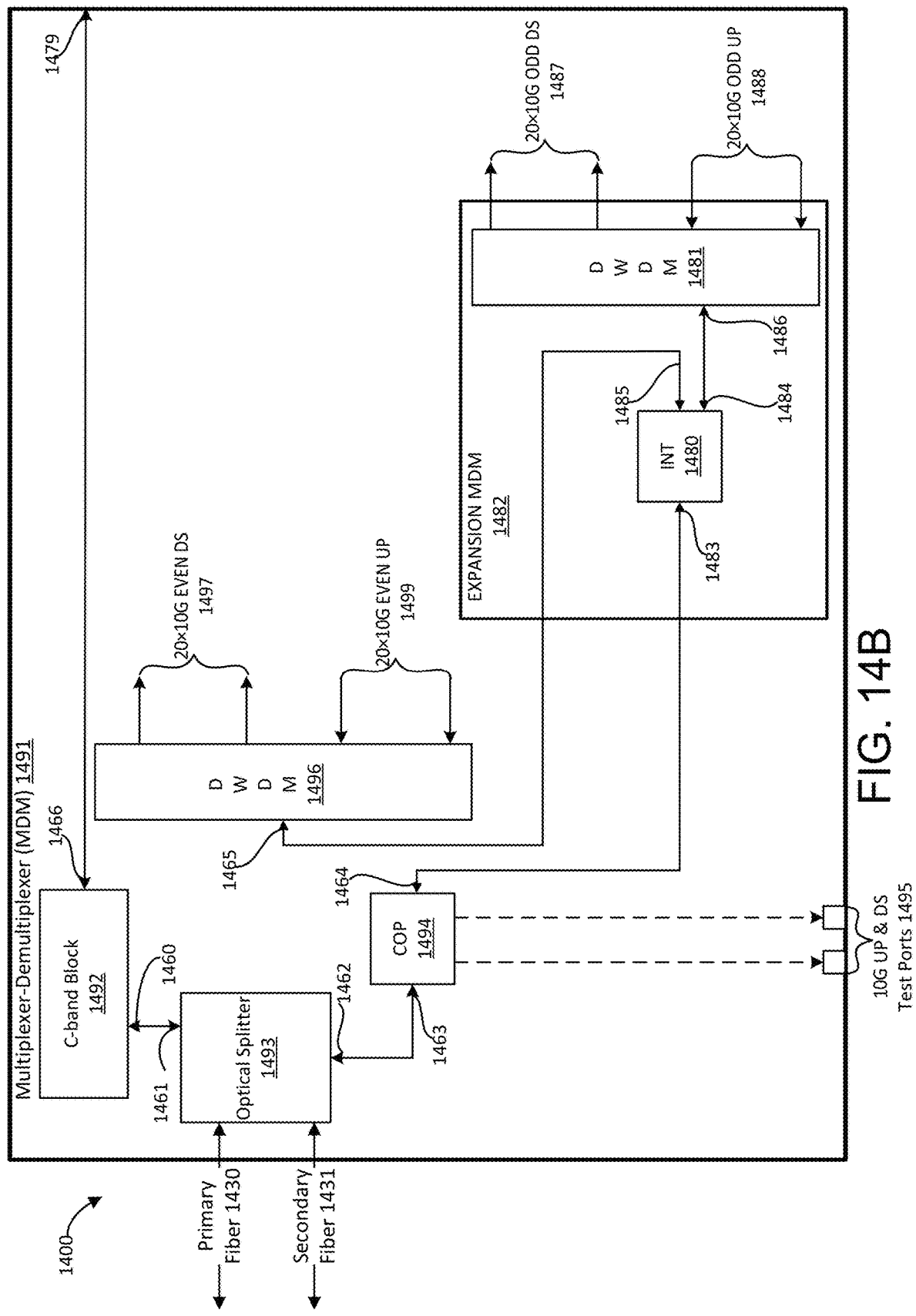
FIG. 14B depicts an ac multiplexer-demultiplexer (MDM) and an expansion MDM, in accordance with the disclosure.

FIG. 14B depicts an ac multiplexer-demultiplexer (MDM) and an expansion MDM, in accordance with the disclosure. Egress optical data signal 1435 may be received at optical splitter 1493 as an ingress optical data signal. Optical splitter 1493 may also be referred to as a beam splitter, and may comprise one or more quartz substrates of an integrated waveguide optical power distribution device. Optical splitter 1493 may be a passive optical network device. It may be an optical fiber tandem device comprising one or more input terminals and one or more output terminals. Optical splitter 1439 may be Fused Biconical Taper (FBT) splitter or Planar Lightwave Circuit (PLC) splitter. Optical splitter 1493 may be a balanced splitter wherein optical splitter 1493 comprises two input fibers and one or more output fibers over which the ingress optical data signal may be spread proportionally. In some embodiments, the ingress optical data signal may not be spread proportionally across the output fibers of optical splitter 1493. In some embodiments, optical splitter 1493 may comprise two input fibers and two output fibers. A first input fiber of optical splitter 1493 may be connected to primary fiber 1430 and a second input fiber of optical splitter 1493 may be connected to secondary fiber 1431.

A first output fiber of optical splitter 1493 may be connected to a filter (e.g., C-band block 1492) that filters out packets of light, in the ingress optical data signal, with wavelengths between 1530 nm and 1565 nm. This range of wavelengths may coincide with a C-band of wavelengths. In some other embodiments, the filter may filter out packets of light with wavelengths not inclusive of the wavelengths between 1260 nm and 1520 nm and not inclusive of wavelengths between 1570 nm and 1660 nm. The packets of light with wavelengths inclusive of the wavelengths between 1260 nm and 1520 nm and inclusive of wavelengths between 1570 nm and 1660 nm, may correspond to the wavelengths of the packets of light carrying the one or more EPON and/or GPON optical data signals transmitted along GPON/EPON 1424. More specifically, optical splitter 1493, may receive one or more downstream EPON and/or GPON optical data signals 1360, in the ingress optical data signal, that corresponds to the one or more EPON and/or GPON optical data signals transmitted along GPON/EPON 1324. In some embodiments, the one or more downstream EPON and/or GPON optical data signals 1360 may have a wavelength of 1490 nm. Optical splitter 1393 may output the one or more downstream EPON and/or GPON optical data signals 1460, received in the ingress optical data signal, to C-band block 1492.

C-band block 1492 may output one or more downstream EPON and/or GPON optical data signals 1479 corresponding to the one or more EPON and/or GPON optical data signals 1460 with wavelengths between 1260 nm and 1520 nm and wavelengths between 1570 nm and 1660 nm. The C-band block 1492 may transmit the one or more downstream EPON and/or GPON optical data signals 1479 to an express port (not shown in FIG. 14B) collocated with, or attached to MDM 1491. In some embodiments, the express port may be located within the MDM 1491.

A second output fiber of optical splitter 1493 may be connected to COP 1494. COP 1494 may be a PON device that monitors the coupled optical power between Optical Splitter 1493 and interleaver 1480. In some embodiments, the coupled optical power may be a percentage value. For instance, the coupled optical power may be 1%. Optical splitter 1493, may receive one or more downstream 10 G NRZ optical data signals, in the ingress optical data signal, that corresponds to egress optical data signal 1435. In some embodiments, the one or more downstream 10 G NRZ, optical data signals may have a wavelength between 1530 nm and 1565 nm. Optical splitter 1493 may output the one or more downstream 10 G optical data signals 1463, received in the ingress optical data signal, to COP 1494. COP 1494 may output a first percentage of the one or more downstream 10 G 1463 to 10 G NRZ upstream and downstream test ports (e.g., 10 G UP & DS Test Ports 1495). The first percentage may be a percentage of the one or more downstream 10 G optical data signals 1463 tested by the 10 G upstream and downstream test ports. The first percentage of the one or more downstream 10 G optical data signals 1463 may be a monitoring signal used by a spectrum analyzer to measure optical power levels of a specific wavelength. The first percentage of the one or more downstream 10 G optical data signals 1463 may also be used by the spectrum analyzer to analyze certain characteristics of the wavelengths of the first percentage of the one or more downstream 10 G optical data signals 1463. COP 1494 may output a second percentage of the one or more downstream 10 G optical data signals 1483 to intereleaver 1480.

Expansion MDM 1482 may comprise interleaver 1480 and DWDM 1481. Expansion MDM 1482 may be in MDM 1491. Interleaver 1480 may de-interleave the one or more downstream 10 G optical data signals 1483 into one or more even optical data signals (e.g., downstream 10 G EVEN DS 1465) and one or more odd optical data signals (e.g., downstream 10 G ODD UP 1486). Interleaver 1480 may de-interleave the one or more downstream 10 G optical data signals 1483 using the same process as optical de-interleaver 1201. Interleaver 1480 may output downstream 10 G EVEN DS 1465 to DWDM 1496, and may output downstream 10 G ODD UP 1486 to DWDM 1481.

Because downstream 10 G EVEN DS 1465 may be a multi-wavelength downstream optical data signal, DWDM 1496 may demultiplex downstream 10 G EVEN DS 1465 into individual optical data signals in accordance with the individual wavelengths of the one or more downstream 10 G EVEN DS 1465. More specifically, downstream 10 G EVEN DS 1465 may be demultiplexed into twenty 10 G NRZ optical data signals, each of which may have a unique wavelength. DWDM 1496 may output each of the twenty 10 G NRZ optical data signals to each of the transponders of 20×10 G EVEN DS 1497. Each of the transponders of 20×10 G EVEN DS 1497 may be in a transport chassis that is inside a RPD (not shown) and may convert a received corresponding 10 G NRZ optical data signal, of the 10 G NRZ optical data signals, into a corresponding electrical signal. More specifically, a first transceiver in each of the transponders may convert one of the corresponding twenty 10 G NRZ, optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. In some embodiments, the RPD may be similar in functionality to a transport chassis 107. The transport chassis may convert the SONET/SDH optical data signals into an electrical signal that may be transmitted over one or more coaxial cables. MDM 1491 may be similar in functionality to MDM 108 and may be connected to the transport chassis in a way similar to the connection between MDM 108 and transport chassis 107.

Because downstream 10 G ODD DS 1486 may be a multi-wavelength downstream optical data signal, DWDM 1481 may demultiplex downstream 10 G ODD DS 1486 into individual optical data signals in accordance with the individual wavelengths of the one or more downstream 10 G ODD DS 1486. More specifically, downstream 10 G ODD DS 1486 may be demultiplexed into twenty 10 G NRZ optical data signals, each of which may have a unique wavelength. DWDM 1481 may output each of the twenty 10 G NRZ optical data signals to each of the transponders of 20×10 G ODD DS 1487. Each of the transponders of 20×10 G ODD DS 1487 may be in a transport chassis that is inside a RPD (not shown) and may convert a received corresponding 10 G NRZ optical data signal, of the 10 G NRZ optical data signals, into a corresponding electrical signal. More specifically, a first transceiver in each of the transponders may convert one of the corresponding twenty 10 G NRZ, optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. In some embodiments, the RPD may be similar in functionality to a transport chassis 107. The transport chassis may convert the SONET/SDH optical data signals into an electrical signal that may be transmitted over one or more coaxial cables. MDM 1491 may be similar in functionality to MDM 108 and may be connected to the transport chassis in a way similar to the connection between MDM 108 and transport chassis 107.

The operation of MDM 1491 may be further described by way of the processing of an upstream optical data signal transmitted to headend 1401. Each of the transponders of 20×10 G EVEN UP 1499 may receive a SONET/SDH optical data signal and each of the transponders may convert the SONET/SDH optical data signal into an electrical signal. Each of the transponders of 20×10 G EVEN UP 1499 may receive the SONET/SDH optical data signal from a transport chassis in the RPD. The transport chassis in the RPD may also convert one or more electrical signals into the SONET/SDH optical data signal.

More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10 G EVEN UP 1499 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10 G EVEN UP 1499 may generate twenty corresponding second optical data signals each of which has a unique wavelength.

Each of the transponders of 20×10 G ODD UP 1488 may receive a SONET/SDH optical data signal and each of the transponders may convert the SONET/SDH optical data signal into an electrical signal. Each of the transponders of 20×10 G ODD UP 1488 may receive the SONET/SDH optical data signal from a transport chassis in the RPD. The transport chassis in the RPD may also convert one or more electrical signals into the SONET/SDH optical data signal.

More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10 G EVEN UP 1488 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10 G ODD UP 1488 may generate twenty corresponding second optical data signals each of which has a unique wavelength.

DWDM 1481 may receive twenty corresponding second optical data signals as an input and output a multi-wavelength upstream optical data signal (e.g., multi-wavelength upstream optical data signal 1484) comprising the twenty corresponding second optical data signals. The multi-wavelength upstream optical data signal 1484 may be a 10 G NRZ optical data signal. More specifically, DWDM 1481 may multiplex the twenty corresponding second optical data signals onto the fiber connecting DWDM 1481 and interleaver 1480.

The multi-wavelength upstream optical data signal 1484, may be input to interleaver 1480. The multi-wavelength upstream optical data signal 1485, may be input to interleaver 1480. Interleaver 1480 may interleave multi-wavelength upstream optical data signal 1484 and multi-wavelength upstream optical data signal 1485 in accordance with optical interleaver 1203. Interleaver 1480 may output a multi-wavelength interleaved upstream 10 G NRZ optical data signal (e.g., multi-wavelength interleaved upstream 10 G optical data signal 1464) to COP 1494.

The multi-wavelength interleaved upstream 10 G NRZ optical data signal may have a wavelength comprising the twenty wavelengths of multi-wavelength upstream optical data signal 1484 and the twenty wavelengths of multi-wavelength upstream optical data signal 1485.

The multi-wavelength upstream optical data signal 1464, may be input to COP 1494. COP 1494 may output a first percentage of the multi-wavelength upstream optical data signal 1464 to 10 G NRZ upstream and downstream test ports (e.g., 10 G UP & DS Test Ports 1495). The first percentage may be a percentage of the multi-wavelength upstream optical data signal 1464 tested by the 10 G NRZ upstream and downstream test ports. The first percentage of the multi-wavelength upstream optical data signal 1464 may be a monitoring signal used by a spectrum analyzer to measure optical power levels of a specific wavelength in the multi-wavelength upstream optical data signal 1464. The first percentage of the multi-wavelength upstream optical data signal 1464 may also be used by the spectrum analyzer to analyze certain characteristics of the wavelengths of the first percentage of the multi-wavelength upstream optical data signal 1464. COP 1494 may output a second percentage of the multi-wavelength upstream optical data signal 1464 to optical splitter 1493 as the multi-wavelength upstream optical data signal 1462.

C-band block 1492 may receive one or more upstream EPON and/or GPON optical data signals 1466 from an express port (not shown in FIG. 14B) collocated with, or attached to MDM 1491. In some embodiments, the express port may be located within the MDM 1491. C-band block 1492 may filter out packets of light, in the one or more upstream EPON and/or GPON optical data signals 1466, with wavelengths between 1530 nm and 1565 nm. Thus C-band block 1492 may output one or more upstream EPON and/or GPON optical data signals 1461 with wavelengths between 1260 nm and 1520 nm and wavelengths between 1570 nm and 1660 nm.

Optical splitter 1493 may receive one or more upstream EPON and/or GPON optical data signals 1461, and may also receive the multi-wavelength upstream optical data signal 1462, and may multiplex the multi-wavelength one or more upstream EPON and/or GPON optical data signals 1461 with the multi-wavelength upstream optical data signal 1462. Optical splitter 1493 outputs an egress optical data signal, which may be a multi-wavelength optical data signal comprising 10 G NRZ optical data signals corresponding to the multiplexed multi-wavelength one or more upstream EPON and/or GPON optical data signals 1461 and multi-wavelength upstream optical data signal 1462. Optical splitter 1493 may output the egress optical data signal onto primary fiber 1430 connecting the optical splitter 1493 to port 1429. Optical splitter 1493 may also output the egress optical data signal onto secondary fiber 1431 connecting the optical splitter 1493 to port 1432.

Figure 15:
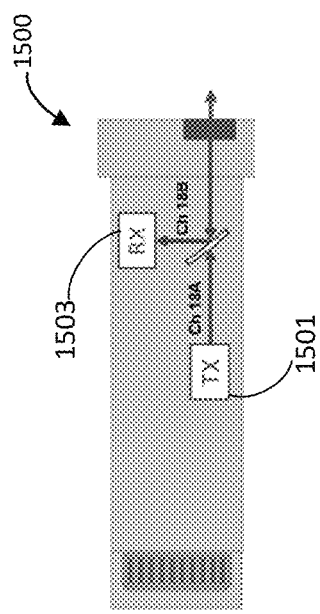
FIG. 15 depicts a schematic diagram of a transceiver, in accordance with the disclosure.

FIG. 15 depicts a schematic diagram of a transceiver, in accordance with the disclosure. Transceiver 1500 may be a 10 G SFP+ transceiver. Transceiver 1500 may comprise a transmitter (e.g., TX 1501) and a receiver (e.g., RX 1503). Transceiver 1500 may be a dual frequency band transceiver. Transceiver 1500 may receive upstream optical data signals with wavelengths that correspond to frequencies in the 100 GHz frequency band. In some embodiments, the upstream optical data signals may have a 50 GHz frequency offset. Channel 18B may correspond to a channel associated with the upstream optical data signals. Transceiver 1500 may transmit downstream optical data signals with wavelengths that correspond to frequencies in the 100 GHz frequency band. In some embodiments, the downstream optical data signals may have a 50 GH frequency offset. Channel 18A may correspond to a channel associated with the downstream optical data signals. Transceiver 1500 may be tunable, and may operate within the range between minus five degrees Celsius and eighty-five degrees Celsius. In some embodiments, transceiver 1500 may be able to start functioning at minus forty degrees Celsius. Transceiver 1500 may transmit downstream 10 GNRZ, coherent 100 GbE, 200 GbE, and/or 400 GbE optical data signals over in a channel in the 100 GHz frequency band. Transceiver 1500 may receive upstream coherent 100 Gigabit Ethernet (100 GbE), 200 GbE, and/or 400 GbE, gigabit passive optical network (GPON), and/or 10 Gigabit PON (XGPON)/10 Gigabit Ethernet PON (10 GEPON) optical data signals over in a channel in the 100 GHz frequency band.

Figure 16:
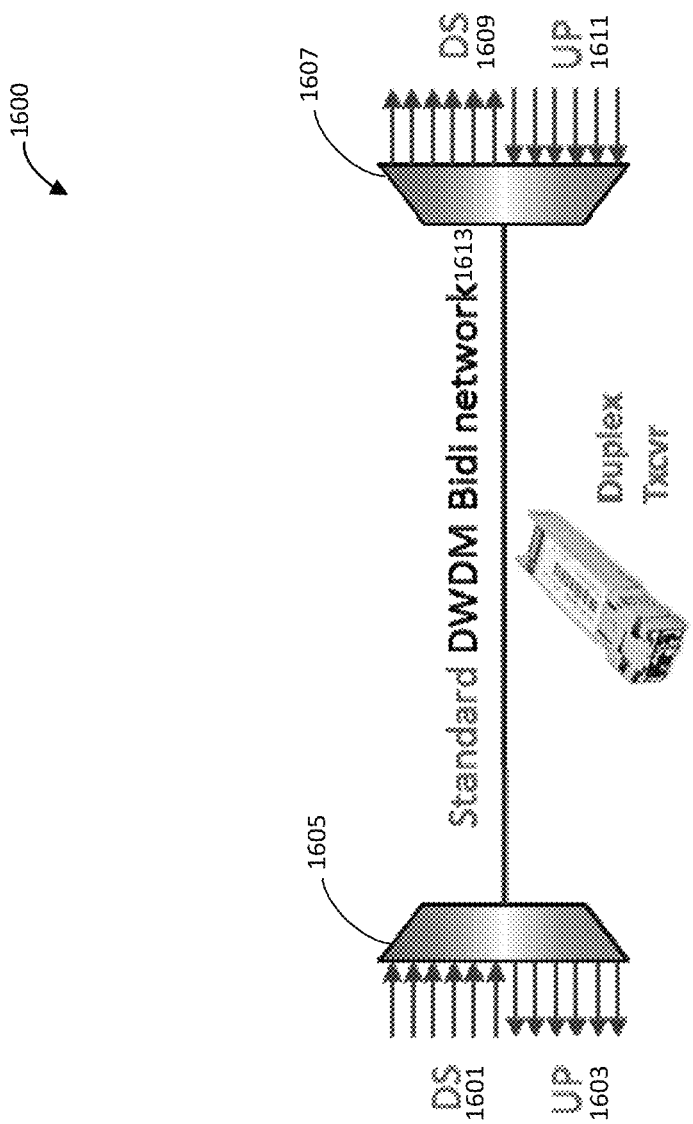
FIG. 16 depicts a standard DWDM bidi network, in accordance with the disclosure.

FIG. 16 depicts a standard DWDM bidi network, in accordance with the disclosure. OCML 1600 depicts a headend DWDM (i.e., DWDM 1605) connected to a MDM DWDM (e.g., 1607) via Standard DWDM Bidi network 1613. The headend DWDM may receive downstream 10 GNRZ, coherent 100 GbE, 200 GbE, and/or 400 GbE optical data signals from one or more first transceivers (not shown) as downstream optical data signals (e.g., DS 1601). Each of the one or more first transceivers may be a transceiver such as transceiver 1500, and may be a duplex transceiver (Duplex Txcvr). The headend DWDM may transmit upstream 10 GNRZ, coherent 100 GbE, 200 GbE, and/or 400 GbE optical data signals to the one or more first transceivers (e.g., UP 1603), received as a combined upstream 10 GNRZ, coherent 100 GbE, 200 GbE, and/or 400 GbE optical data signal from DWDM 1607 via standard DWDM bidi network 1613. DWDM 1605 may be in a 40 CH OCML headend, and the one or more first transceivers may be connected to DWDM 1605. DWDM 1605 may transmit a combined downstream optical data signal comprising the downstream 10 GNRZ, coherent 100 GbE, 200 GbE, and/or 400 GbE optical data signals to DWDM 1607, via standard DWDM Bidi network 1613. Standard DWDM Bidi network 1613 may be an optical fiber connecting DWDM 1605 to DWDM 1607.

The MDM DWDM (e.g., DWDM 1607) may receive the combined downstream optical data signal via standard DWDM Bidi network 1613. DWDM 1607 may receive the combined downstream signal and may transmit the downstream 10 GNRZ, coherent 100 GbE, 200 GbE, and/or 400 GbE optical data signals to one or more second transceivers (not shown) as DS 1609. Each of the one or more second transceivers may be a transceiver such as transceiver 1500, and may be a duplex transceiver. The MDM DWDM may receive upstream 10 GNRZ, coherent 100 GbE, 200 GbE, and/or 400 GbE optical data signals from the one or more second transceivers as upstream optical data signals (e.g., UP 1611). DWDM 1607 may transmit a combined upstream optical data signal comprising the upstream 10 GNRZ, coherent 100 GbE, 200 GbE, and/or 400 GbE optical data signals to DWDM 1605, via standard DWDM Bidi network 1613.

Figure 17:
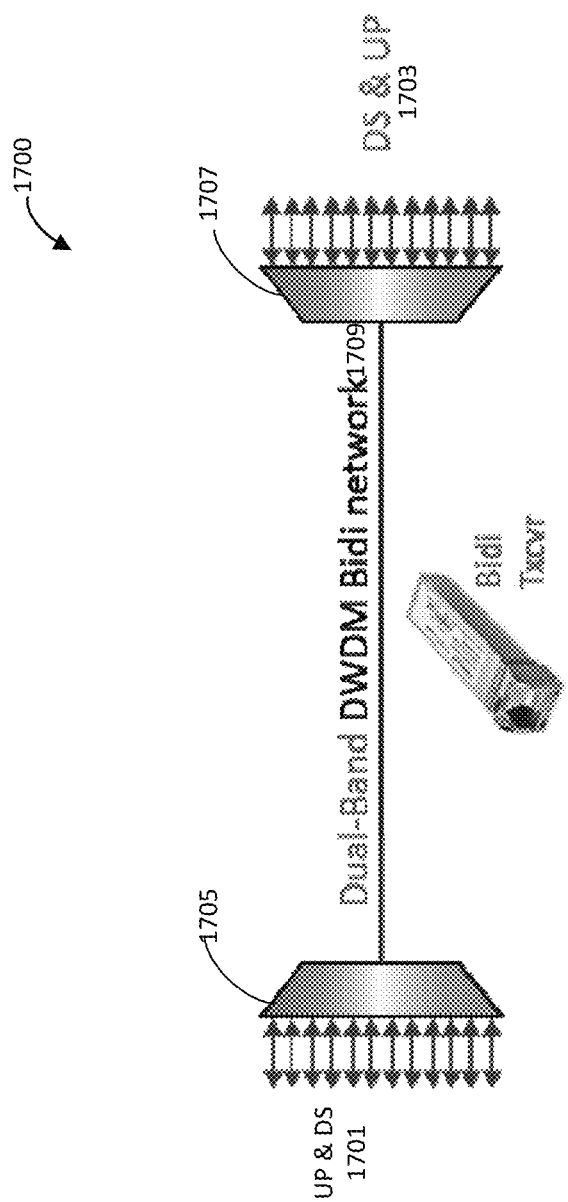
FIG. 17 depicts a dual band DWDM bidi network, in accordance with the disclosure.

FIG. 17 depicts a dual-band DWDM bidi network, in accordance with the disclosure. OCML 1700 depicts a headend DWDM (i.e., DWDM 1705) connected to a MDM DWDM (e.g., 1707) via Standard DWDM Bidi network 1709. The headend DWDM may receive downstream 10 GNRZ, coherent 100 GbE, 200 GbE, and/or 400 GbE optical data signals from one or more first transceivers (not shown) as downstream optical data signals (e.g., UP & DS 1701). Each of the one or more first transceivers may be a transceiver such as transceiver 1500, and may be a bidirectional (bidi) transceiver. The headend DWDM may transmit upstream 10 GNRZ, coherent 100 GbE, 200 GbE, and/or 400 GbE optical data signals to the one or more first transceivers (e.g., UP & DS 1701), received as a combined upstream 10 GNRZ, coherent 100 GbE, 200 GbE, and/or 400 GbE optical data signal from DWDM 1707 via standard DWDM bidi network 1709. DWDM 1705 may be in a 40 CH OCML headend, and the one or more first transceivers may be connected to DWDM 1705. DWDM 1705 may transmit a combined downstream optical data signal comprising the downstream 10 GNRZ, coherent 100 GbE, 200 GbE, and/or 400 GbE optical data signals to DWDM 1707, via standard DWDM Bidi network 1709. Standard DWDM Bidi network 1709 may be an optical fiber connecting DWDM 1705 to DWDM 1707.

The MDM DWDM (e.g., DWDM 1707) may receive the combined downstream optical data signal via standard DWDM Bidi network 1709. DWDM 1707 may receive the combined downstream signal and may transmit the downstream 10 GNRZ, coherent 100 GbE, 200 GbE, and/or 400 GbE optical data signals to one or more second transceivers (not shown) as DS & up 1703. Each of the one or more second transceivers may be a transceiver such as transceiver 1500, and may be a bidi transceiver (Bidi Txcvr). The MDM DWDM may receive upstream 10 GNRZ, coherent 100 GbE, 200 GbE, and/or 400 GbE optical data signals from the one or more second transceivers as upstream optical data signals (e.g., DS & UP 1703). DWDM 1707 may transmit a combined upstream optical data signal comprising the upstream 10 GNRZ, coherent 100 GbE, 200 GbE, and/or 400 GbE optical data signals to DWDM 1705, via standard DWDM Bidi network 1709.

Because the one or more first transceivers and one or more second transceivers, in OCML 1700 are bidi transceivers, the optical data signals transmitted between the one or more first transceivers and the headend DWDM may be transmitted with a 50 GHz offset between their corresponding center frequencies. For example, the one or more first transceivers may transmit downstream optical data signals at a first frequency and may receive upstream optical data signals at a second frequency, and the frequency offset between the first frequency and the second frequency may be 50 GHz. The optical data signals transmitted between the one or more second transceivers and the MDM DWDM may be transmitted with a 50 GHz offset between their corresponding center frequencies. For example, the one or more second transceivers may transmit downstream optical data signals at a third frequency and may receive upstream optical data signals at a fourth frequency, and the frequency offset between the first frequency and the second frequency may be 50 GHz.

Figure 18:
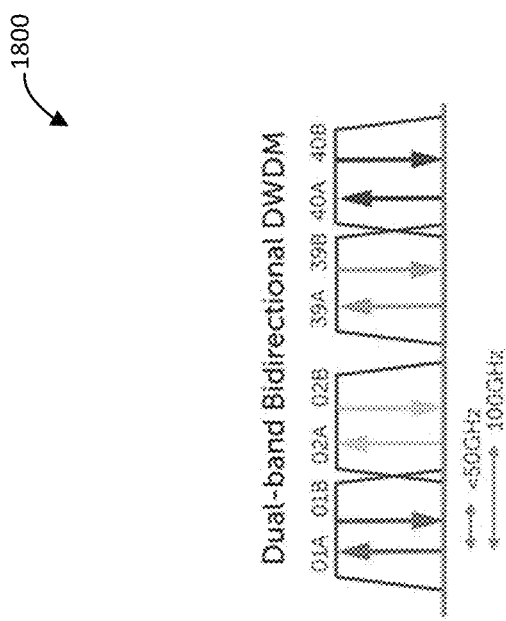
FIG. 18 depicts a frequency spectrum diagram corresponding to a DWDM passive circuit.

FIG. 18 depicts a frequency spectrum diagram corresponding to a DWDM passive circuit. Frequency spectrum 1800 includes a plurality of channels (i.e., channel 01, channel 02 . . . channel 40). A first frequency and a second frequency are associated with each of the channels. The offset between the first frequency and the second frequency may be less than or equal to 50 GHz. The first frequency may be a frequency corresponding to an upstream optical data signal, and the second frequency may be a frequency corresponding to a downstream optical data signal. For example, there may be a first frequency, frequency 01A, associated with channel 01, and there may be a second frequency, frequency 01B, associated with channel 01. The first frequency may be a frequency used to transmit upstream optical data signals from a headend DWDM to one or more first transceivers connected to the headend DWDM. For example, DWDM 1705 may transmit upstream 10 GNRZ, coherent 100 GbE, 200 GbE, and/or 400 GbE optical data signals to the one or more first transceivers on frequency 01A. The second frequency may be a frequency used to transmit downstream optical data signals from the one or more first transceivers to the headend DWDM. For example, the one or more first transceivers may transmit downstream 10 GNRZ, coherent 100 GbE, 200 GbE, and/or 400 GbE optical data signals to DWDM 1705 on frequency 01B.

The second frequency may be used to transmit the downstream optical data signals from a MDM DWDM to one or more second transceivers connected to the MDM DWDM. For example, DWDM 1707 may transmit the downstream 10 GNRZ, coherent 100 GbE, 200 GbE, and/or 400 GbE optical data signals to the one or more second transceivers on frequency 01B. The first frequency may be used to transmit the upstream optical data signals from the one or more second transceivers to the MDM DWDM. For example, the one or more second transceivers may transmit the upstream 10 GNRZ, coherent 100 GbE, 200 GbE, and/or 400 GbE optical data signals 01A.

There may be a 100 GHz frequency offset between a first frequency (e.g., frequency 01A) in a first channel (e.g., channel 01), and a first frequency (e.g., frequency 02A) in a second channel (e.g., channel 02). There may be a 100 GHz frequency offset between a second frequency (e.g., frequency 01B) in the first channel (e.g., channel 01), and a second frequency (e.g., frequency 02B) in the second channel.

Figure 19:
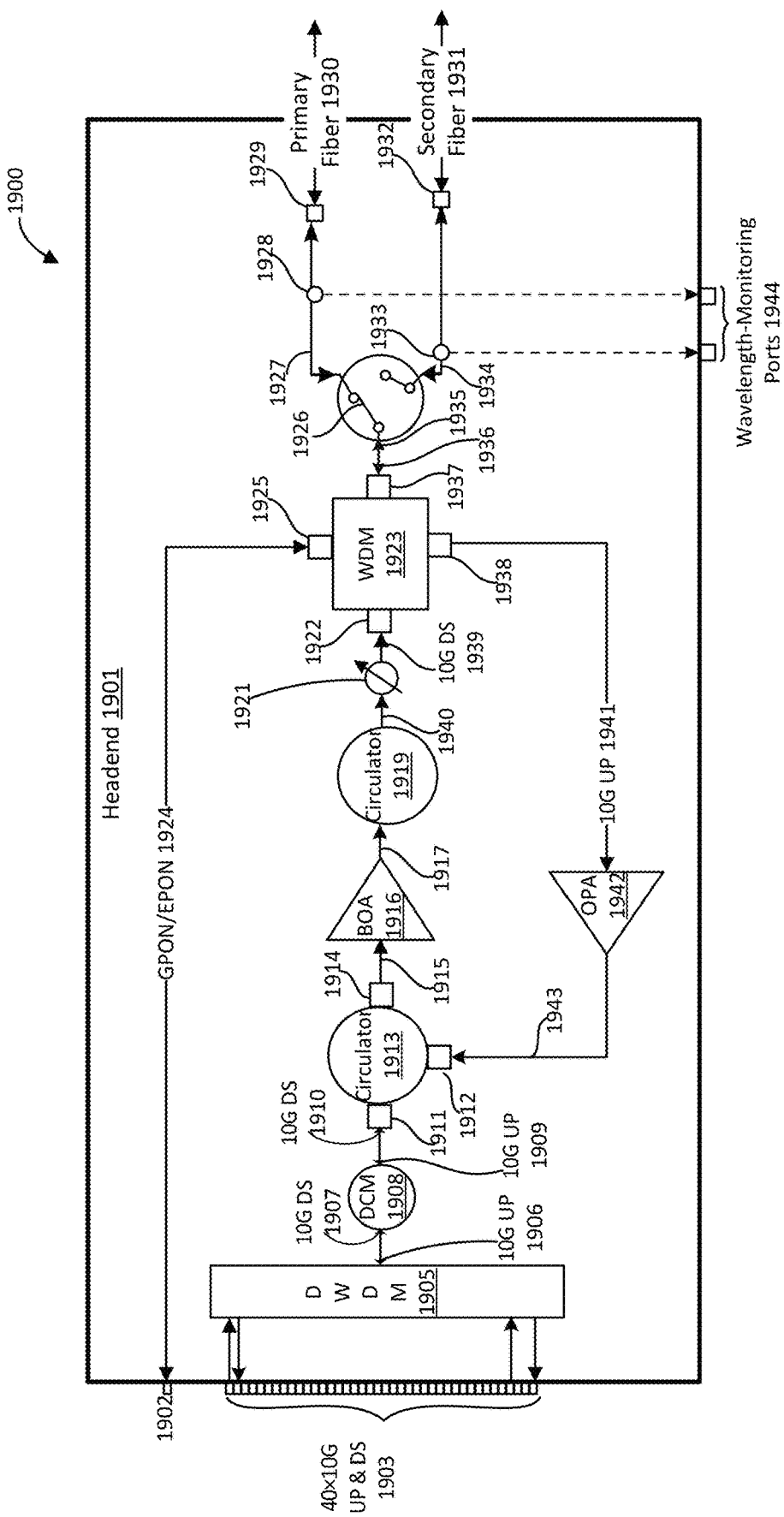
FIG. 19 depicts an access network diagram of an 40 CH OCML headend, in accordance with the disclosure.

FIG. 19 depicts an access network diagram of a 40 CH OCML headend, in accordance with the disclosure. FIG. 19 depicts an access network diagram of a 40 CH OCML headend comprising WDMs, a DWDM, optical amplifiers, and dispersion control modules (DCMs), in accordance with the disclosure. FIG. 19 shows a schematic of an OCML headend according to at least one embodiment of the disclosure. As shown in FIG. 19, headend 1901 is a smart integrated OCML headend, which is a circuit, comprising a DWDM (e.g., DWDM 1905), a first circulator (e.g., circulator 1913), a second circulator (e.g., circulator 919), a first WDM (e.g., WDM 1923), a GPON/EPON connector (e.g., GPON/EPON 1924), a booster amplifier BOA (e.g., BOA 1916), an optical pre-amplifier (OPA) (e.g., OPA 1942), a variable optical attenuator (VOA) (e.g., VOA 1921), an optical switch 1926 to feed a primary optical fiber (e.g., Primary Fiber 1930) or secondary (backup) optical fiber (e.g., Secondary Fiber 1931), and a dispersion control module (DCM) (e.g., DCM 1908). DWDM 1905 may be a 96 channel AWG, and circulator 1913 may be similar in functionality to circulator 1919. The disclosure provides a method of transporting multiple 10 G NRZ, coherent 100 GbE, 200 GbE, and/or 400 GbE and GPON/EPON signals on the same optical fiber over extended links of up to 60 kms without a cable company having to put optical amplifiers between the cable's Master Terminal Center (MTC) facility and a field hub or outside plant. The MTC facility may be an inside plant facility where a cable company acquires and combines services to be offered to customers. The MTC facility provides these combined services to customers, by transmitting and receiving optical signals over a plurality of optical fibers to a field hub or outside plant which connects the plurality of optical fibers to a customer's premise. The OCML headend may be located in a secondary terminal center (STC) that connects the MTC facility to a field hub or outside plant housing a multiplexer-demultiplexer (MDM) (e.g., MDM 991 in FIG. 9).

The EPON signals may operate with the same optical frequencies as GPON and time division multiple access (TDMA). The raw line data rate is 1.25 Gbits/s in both the downstream and upstream directions. EPON is fully compatible with other Ethernet standards, so no conversion or encapsulation is necessary when connecting to Ethernet-based networks on either end. The same Ethernet frame is used with a payload of up to 1518 bytes. EPON may not use a carrier sense multiple access (CSMA)/collision detection (CD) access method used in other versions of Ethernet. There is a 10-Gbit/s Ethernet version designated as 802.3av. The line rate may be 10.3125 Gbits/s. The primary mode is 10 Gbits/s upstream as well as downstream. A variation uses 10 Gbits/s downstream and 1 Gbit/s upstream. The 10-Gbit/s versions use different optical wavelengths on the fiber, 1575 to 1591 nm downstream and 1260 to 1280 nm upstream so the 10-Gbit/s system can be wavelength multiplexed on the same fiber as a standard 1-Gbit/s system.

In one aspect, headend 1901 may comprise 40 10 G NRZ bi-directional, or bidi, downstream (DS) and upstream (UP) transponders (e.g., 40×10 G UP & DS 1903). 40×10 G UP & DS 1903 may transmit downstream data over forty 10 G NRZ wavelengths. 40×10 G UP & DS 1903 may receive upstream data over forty 10 G NRZ wavelengths.

The operation of headend 1901 may be described by way of the processing of downstream optical data signals transmitted from headend 1901 to a field hub or outside plant, and the processing of upstream optical data signals received from the field hub or outside plant. Each of the transponders of 40×10 G UP & DS 1903 may receive a SONET/SDH optical data signal from a MTC and each of the transponders may convert the SONET/SDH optical data signal into an electrical signal. More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 40×10 G UP & DS 1903 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 40×10 G UP & DS 1903 may generate forty corresponding second optical data signals each of which has a unique wavelength.

DWDM 1905 may receive the forty corresponding second optical data signals as an input and output a multi-wavelength downstream optical data signal (e.g., 10 G DS 1907) comprising the twenty corresponding second optical data signals onto a fiber. The multi-wavelength downstream optical data signal 10 G DS 1907 may be a coherent 10 G NRZ optical data signal. More specifically, DWDM 1905 may multiplex the forty corresponding second optical data signals onto the fiber, wherein the forty multiplexed corresponding second optical data signals compose the multi-wavelength downstream optical data signal. The multi-wavelength optical data signal may have a wavelength comprising the forty wavelengths of the twenty corresponding second optical data signals.

The multi-wavelength downstream optical data signal 10 G DS 1907, may be input to DCM 1908. 10 G DS 1907 may be input into DCM 1908 to compensate for dispersion that 10 G DS 1907 may experience after being amplified by BOA 1916 and multiplexed by WDM 1923, with other optical data signals, that are downstream from the DCM. The amplified and multiplexed optical data signal may be referred to as an egress optical data signal, as it is the optical data signal that may be transmitted out of headend 1901 over a fiber connecting headend 1901 to a field hub or outside plant (e.g., MDM 991 inside a field hub or outside plant). In some embodiments, DCM 1908 may be configured to balance positive and/or negative dispersion that may be introduced to the egress optical data signal by the fiber. In some embodiments, DCM 1908 may be configured to compensate for positive (temporal broadening of the egress optical data signal) and/or negative (temporal contraction of the egress optical data signal) dispersion introduced by fiber that is 80 km or greater in length, to reduce the sensitivity or OSNR levels of a transceiver in a DWDM located at a field hub or outside plant. More specifically, DCM 1908 may be configured to reduce the sensitivity or OSNR level requirement in a photodetector or fiber-optic sensor in the transceiver, which may drastically reduce the cost of the transceivers used in the DWDM located at the field hub or outside plant. DCM 1908 may output a dispersion controlled version of 10 G DS 1907 as 10 G DS 1910.

Circulator 1913 may be a three port circulator, that receives multi-wavelength downstream optical data signal 10 G DS 1910 on port 1911, and outputs multi-wavelength downstream optical data signal 10 G DS 1910, on port 1914 as multi-wavelength downstream optical data signal 10 G DS 1915 to BOA 1916.

BOA 1916 may have a gain that is based at least in part on a distance that a downstream signal has to travel. For example, the gain may be a function of a fiber attenuation coefficient α, which is a measure of the intensity of the attenuation of a beam of light as it traverses a length of an optical fiber segment. The unit of measurement of the fiber attenuation coefficient is decibels (dB) per km (dB/km). For instance, BOA 1916 may be adjusted based at least in part on the attenuation coefficient and length of fiber that the egress optical data signal will travel. More specifically, the gain BOA 1916 may be $G=e^{(2\alpha L)}$, where α is the fiber attenuation coefficient, as explained above, and L is the length of the fiber (e.g., the length of primary fiber 1930 and/or the length of secondary fiber 1931). Multi-wavelength downstream optical data signal 10 G DS 1915 may be amplified by BOA 1916, and BOA 1916 may output multi-wavelength downstream optical data signal 10 G DS 1917 to circulator 1919. Circulator 1919 outputs a multi-wavelength downstream optical data signal (e.g., multi-wavelength downstream optical data signal 10 G DS 1940), which may be substantially the same as multi-wavelength downstream optical data signal 10 G DS 1917. Multi-wavelength downstream optical data signal 10 G DS 1940 may be input to variable optical amplifier (VOA) 1921.

VOA 1921 may be used to reduce the power levels of Multi-wavelength downstream optical data signal 10 G DS 1940. The power reduction may done by absorption, reflection, diffusion, scattering, deflection, diffraction, and dispersion, of Multi-wavelength downstream optical data signal 10 G DS 1940. VOA 1921 typically have a working wavelength range in which they absorb all light energy equally. In some embodiments VOA 1921 utilize a length of high-loss optical fiber, that operates upon its input optical signal power level in such a way that its output signal power level is less than the input level. For example, multi-wavelength downstream optical data signal 10 G DS 1940 may have an input power level to VOA 1921 that may be greater than the output power level of multi-wavelength downstream optical data signal 10 G DS 1939.

The variability of the output power level of VOA 1921 may be achieved using a fiber coupler, where some of the power is not sent to the port that outputs, but to another port. Another possibility is to exploit variable coupling losses, which are influenced by variable positioning of a fiber end. For example, the transverse position of the output fiber or the width of an air gap between two fibers may be varied, obtaining a variable loss without a strong wavelength dependence. This principle may be used for single-mode fibers. VOA 1911 may be based on some piece of doped fiber, exhibiting absorption within a certain wavelength range.

WDM 1923 may multiplex multi-wavelength downstream optical data signal 10 G DS 1939 and one or more EPON, and/or GPON optical data signals. The EPON and/or GPON optical data signals may be received on a GPON/EPON connector (e.g., GPON/EPON 1924) from PON port 1902. The resulting multiplexed optical data signal may be referred to as egress optical data signal 1935.

Egress optical data signal 1935 may be output by WDM 1923 and optical switch 1926 may switch egress optical data signal 1935 onto connector 1927 or connector 1934 depending on the position of switch 1926. In some embodiments, connector 1927 may be a primary connector and connector 1934 may be a secondary connector or a backup connector. Wavelength monitoring connector 1928 may connect connector 1927 to a first port of wavelength-monitoring ports 1944, and wavelength monitoring connector 1933 may connect connector 1934 to a second port of wavelength-monitoring ports 1944. Wavelength-monitoring ports 1944 may monitor the wavelengths in egress optical data signal 1935 via connector 1927 or connector 1934 depending on the position of switch 1926. Egress optical data signal 1935 may exit headend 1901 via connector 1927 connected to primary fiber 1930, and may be received on a first connector in the field hub or outside plant. Egress optical data signal 1935 may exit headend 1901 via connector 1934 connected to secondary fiber 1931, and may be received on a second connector in the field hub or outside plant. The field hub or outside plant may include a MDM with the first connector and the second connector.

The operation of headend 1901 may be described by way of the processing of upstream optical data signals received at headend 1901 from a field hub or outside plant. For instance, a multi-wavelength ingress optical data signal, comprising one or more of a 10 G NRZ, coherent 100 GbE, 200 GbE, and/or 400 GbE optical data signal, EPON optical data signal, and/or GPON optical data signal or a 10 GEPN·XGPON may be an upstream optical data signal received on primary fiber 1930 or secondary fiber 1931 depending on the position of switch 1926.

Multi-wavelength ingress optical data signal 1936 may traverse connector 1927 and switch 1926, before entering WDM 1923 via port 1937 if switch 1926 is connected to connector 1927. Multi-wavelength ingress optical data signal 1936 may traverse connector 1934 and switch 1926, before entering WDM 1923 via port 1937 if switch 1926 is connected to connector 1927. WDM 1923 may demultiplex one or more 10 G NRZ, coherent 100 GbE, 200 GbE, and/or 400 GbE optical data signals, EPON optical data signals, and/or GPON optical data signals from multi-wavelength ingress optical data signal 1936. WDM 1923 may transmit the one or more EPON and/or GPON optical data signals along GPON/EPON 1924 to PON connector 1902 via port 1925. WDM 1923 may transmit the one or more 10 G optical data signals (e.g., 10 G UP 1941) out of port 1938 to OPA 1942.

The one or more 10 G NRZ optical data signals 10 G UP 1941 may be received by OPA 1942. The one or more optical data signals 10 G NRZ, coherent 100 GbE, 200 GbE, and/or 400 GbE UP 1941 may comprise 10 GNRZ, coherent 100 GbE, 200 GbE, and/or 400 GbE optical data signals. A gain associated OPA 1942 may be based at least in part on a distance that 10 G NRZ, coherent 100 GbE, 200 GbE, and/or 400 GbE optical data signals have to travel, similar to that of BOA 1916. The one or more optical data signals 10 G NRZ, coherent 100 GbE, 200 GbE, and/or 400 GbE UP 1941 may be amplified by OPA 1942, and OPA 1942 may output multi-wavelength upstream optical data signal 1943 to circulator 1913.

Circulator 1913 may receive the multi-wavelength upstream optical data signal 1943 on port 1912, and may output one or more optical data signals 10 G UP 1909 to DCM 1908. DCM 1908 may perform one or more operations on one or more optical data signals 10 G UP 1909 to compensate for any dispersion that may have been introduced by circuit components (e.g., circulator 1913, OPA 1942, or WDM 1923) or imperfections or issues with an optical fiber (e.g., primary fiber 1930 or secondary fiber 1931). DCM 1908 may output one or more optical data signals 10 G UP 1906 to DWDM 1905. The one or more optical data signals 10 G NRZ, coherent 100 GbE, 200 GbE, and/or 400 GbE UP 1909 are substantially the same as multi-wavelength upstream optical data signal 1943. Circulator 1913 may function as a circulator when receiving multi-wavelength upstream optical data signal 1943 on port 1912. The one or more optical data signals 10 G UP 1906 may be received by DWDM 1905.

The one or more optical data signals 10 G UP 1906 may comprise 10 G NRZ optical data signals. DWDM 1905 may demultiplex the one or more optical data signals 10 G UP 1906, into individual optical data signals in accordance with the individual wavelengths of the one or more optical data signals 10 G UP 1906. More specifically, the one or more optical data signals 10 G UP 1906 may be demultiplexed into forty 10 G NRZ optical data signals, each of which may have a unique wavelength. DWDM 1905 may output each of the forty 10 G NRZ optical data signals to each of the transponders of 40×10 G UP 1903. Each of the transponders of 40×10 G UP 1903 may convert a received corresponding 10 G NRZ optical data signal, of the 10 G NRZ optical data signals, into a corresponding electrical signal. More specifically, a first transceiver in each of the transponders may convert one of the forty 10 G NRZ optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the forty corresponding SONET/SDH optical data signals may have the same wavelength. In other embodiments, each of the forty corresponding SONET/SDH optical data signals may have unique wavelengths. The forty transponders of 40×10 G UP 1903 may transmit the twenty SONET/SDH optical data signals to the MTC on the SONET/SDH optical network connection.

Figure 20:
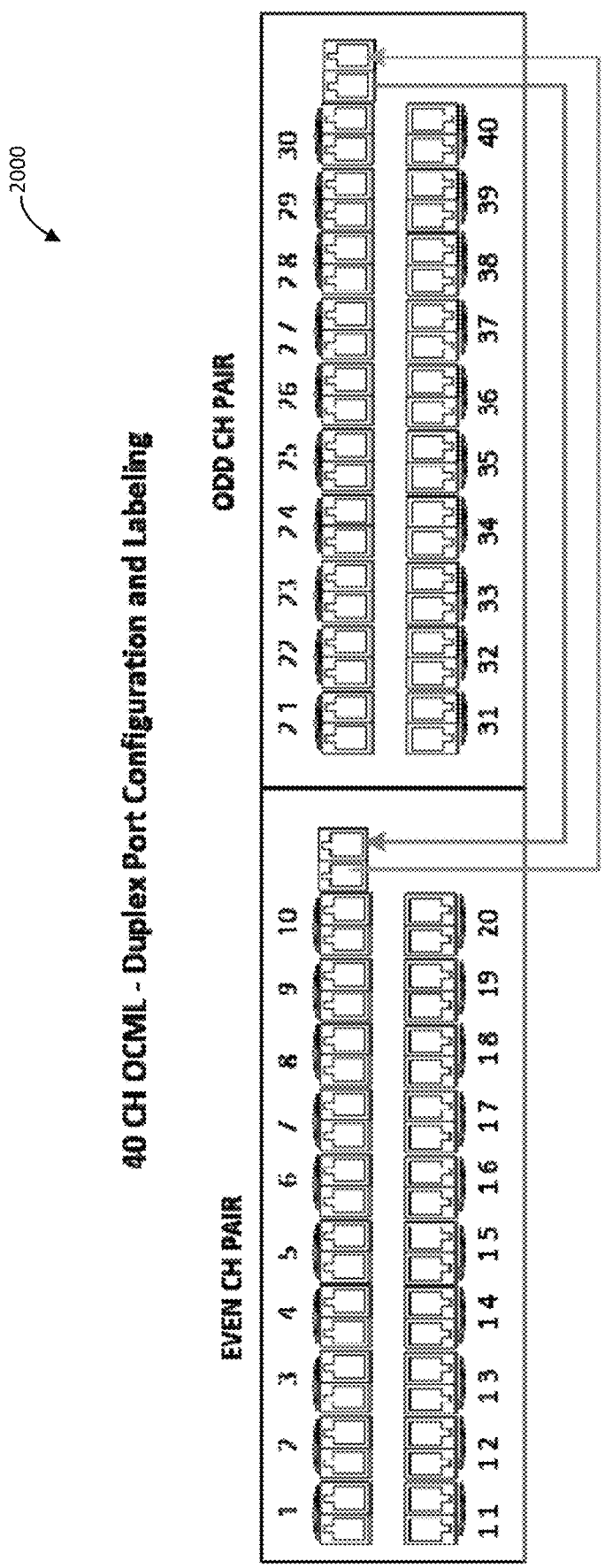
FIG. 20 depicts a schematic of a port configuration of an 40 CH OCML, in accordance with the disclosure.

FIG. 20 depicts a schematic of a port configuration of an 40 CH OCML, in accordance with the disclosure. Even CH Pair 2002 include ports carrying even channel optical data signals. Odd CH Pair 2004 include ports carrying odd channel optical data signals. In some embodiments, a port in the Even CH Pair 2002 may connected to a port in Odd CH Pair 2004 in order to conduct an upgrade to the software or firmware of 40 CH OCML.

What is claimed is:

1. An optical communication module link extender comprising:
   a dense wave division multiplexer (DWDM) configured to receive one or more downstream optical data signals from a network, combine the one or more downstream optical data signals into a combined optical data signal, and output the combined optical data signal;
   a first WDM communicatively coupled to the DWDM and a booster optical amplifier, the booster optical amplifier being configured to amplify the combined optical data signal and output a first amplified optical data signal;
   a second WDM that is communicatively coupled to the booster optical amplifier, the second WDM configured to receive the first amplified optical data signal and output a second optical data signal;
   a third WDM configured to combine the second optical data signal and one or more third signals and output an egress optical data signal, wherein the second optical data signal comprises a non- return-to-zero (NRZ) optical data signal, a coherent optical data signal, a quasi-coherent optical data signal, a duo-binary optical data signal, or a pulse amplitude modulated (PAM) optical data signal, and wherein the one or more third signals comprises a gigabit passive optical network (GPON) optical data signal, or an ethernet passive optical network (EPON) optical data signal;
   an optical switch communicatively coupled to the third WDM, the optical switch configured to receive the egress optical data signal and output the egress optical data signal on a primary fiber;
   an optical preamplifier configured to receive an upstream optical data signal, amplify the upstream optical data signal, and output the amplified upstream optical data signal to the first WDM, wherein the first WDM is further configured to receive the amplified upstream optical data signal, and output the amplified upstream optical data signal to the DWDM; and
   an expansion module communicatively coupled to the DWDM and the first WDM, wherein the expansion module comprises a second DWDM similar to the DWDM and an interleaver for interleaving the combined optical data signal and the amplified upstream optical data signal.

2. The optical communication module link extender of claim 1, wherein the forty channel DWDM comprises a ninety-six channel array waveguide device.

3. The optical communication module link extender of claim 1, wherein the booster optical amplifier is an erbium doped fiber amplifier (EDFA) or a semiconductor optical amplifier (SOA).

4. The optical communication module link extender of claim 1, wherein the forty channel DWDM comprises a modulated laser, and 10 gigabit non-return-to-zero (G NRZ) transceiver comprising one or more PIN diodes or one or more avalanche photodiodes (APDs).

5. The optical communication module link extender of claim 1, wherein the optical switch is further configured to change the output the egress optical data signal from the primary fiber to a secondary fiber, based at least in part on an impairment to the primary fiber.

6. The optical communication module link extender of claim 1, further comprising:
   a variable optical attenuator (VOA) communicatively coupled to the second WDM, the VOA configured to receive the amplified first optical data signal, adjust a power of the first amplified optical data signal to a first level, and output a second optical data signal to the WDM.

7. The optical communication module link extender of claim 6, further comprising a dispersion compensation module (DCM), wherein the DCM is configured to:
   receive the combined optical data signal and remove interference between adjacent symbols in the combined optical data signal, and
   transmit a the combined optical data signal to the first WDM, wherein the combined optical data signal is without interference between the adjacent symbols.

8. A method for multiplexing one or more optical data signals, the method comprising:
   receiving, by a dense wave division multiplexer (DWDM), one or more downstream optical data signals;
   combining, by the DWDM, the one or more optical data signals into a combined optical data signal;
   outputting, by the DWDM, the combined one or more optical data signals to a first wave division multiplexer (WDM);
   outputting, by the first WDM, the combined optical data signal to a booster optical amplifier;
   amplifying, by the booster optical amplifier, the combined optical data signal and outputting a first amplified optical data signal;
   receiving, by a second WDM, the first amplified optical data signal; outputting, by the second WDM, a second optical data signal based on the first amplified optical data signal;
   combining, by a third WDM, the second optical data signal and one or more third signals, and outputting an egress optical data signal to an optical switch, wherein the second optical data signal comprises a non-return-to- zero (NRZ) optical data signal, a coherent optical data signal, a quasi-coherent optical data signal, a duo-binary optical data signal, or a pulse amplitude modulated (PAM) optical data signal, and wherein the one or more third signals comprises a gigabit passive optical network (GPON) optical data signal, or an ethernet passive optical network (EPON) optical data signal;
   outputting, by the optical switch, the egress optical data signal on a primary fiber;
   receiving, by an optical preamplifier, an upstream optical data signal, amplifying, by the optical preamplifier, the upstream optical data signal, outputting, by the optical preamplifier, the amplified upstream optical data signal to the first WDM;
   receiving, by the first WDM, the amplified upstream optical data signal;
   outputting, by the first WDM, the amplified upstream optical data signal to the DWDM; and
   an expansion module communicatively coupling to the DWDM and the first WDM, wherein the expansion module comprises a second DWDM similar to the DWDM and an interleaver for interleaving the combined optical data signal and the amplified upstream optical data signal.

9. The method of claim 8, further comprising outputting the egress optical data signal on a secondary fiber, based at least in part on an impairment to the primary fiber.

10. The method of claim 8, further comprising:
receiving, by a dispersion compensation module (DCM), the combined optical data signal,
remove, by the DCM, interference between adjacent symbols in the combined optical data signal, and
transmit, by the DCM, a the combined optical data signal to the first WDM, wherein the combined optical data signal is without interference between the adjacent symbols.

11. The method of claim 8, wherein the forty channel DWDM comprises a ninety-six channel array waveguide device.

12. The method of claim 8, wherein the second optical data signal have a wavelength of 1530-1565 nanonmeters.

* * * * *